(12) United States Patent
Nomura et al.

(10) Patent No.: US 7,920,156 B2
(45) Date of Patent: Apr. 5, 2011

(54) IMAGE FORMING APPARATUS, IMAGE FORMING METHOD AND DATA CONTROL DEVICE

(75) Inventors: Yujiro Nomura, Nagano-ken (JP); Ken Ikuma, Nagano-ken (JP); Hiroshi Toyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 12/245,524

(22) Filed: Oct. 3, 2008

(65) Prior Publication Data
US 2009/0034026 A1 Feb. 5, 2009

Related U.S. Application Data

(62) Division of application No. 11/179,043, filed on Jul. 11, 2005, now abandoned.

(30) Foreign Application Priority Data

Jul. 26, 2004 (JP) .................. 2004-216859
Jul. 26, 2004 (JP) .................. 2004-216861
Jul. 26, 2004 (JP) .................. 2004-216862
Jun. 1, 2005 (JP) .................. 2005-161343

(51) Int. Cl.
*B41J 15/14* (2006.01)
*B41J 27/00* (2006.01)
(52) U.S. Cl. ........................ 347/243; 347/259
(58) Field of Classification Search .............. 347/116, 347/229, 234, 248, 249, 235, 243, 259, 260; 359/196.1–199.1, 213.1, 214.1
See application file for complete search history.

(56) References Cited

U.S. PATENT DOCUMENTS

| 4,578,689 A | 3/1986 | Spencer et al. ............... 347/129 |
| 5,260,751 A | 11/1993 | Inomata .......................... 399/68 |
| 5,373,368 A | 12/1994 | Taniguro |
| 5,633,663 A | 5/1997 | Matsubara et al. |
| 5,946,537 A * | 8/1999 | Nakayasu et al. ............. 399/301 |
| 6,134,020 A | 10/2000 | Masumoto et al. .......... 358/1.16 |
| 6,213,584 B1 | 4/2001 | Noyes et al. |
| 6,483,529 B1 | 11/2002 | Ito et al. |
| 6,607,260 B1 | 8/2003 | Ikeda |
| 6,870,560 B2 | 3/2005 | Bush et al. ..................... 347/259 |
| 7,031,040 B2 * | 4/2006 | Fujii et al. ................... 359/199.1 |

(Continued)

FOREIGN PATENT DOCUMENTS

EP 0 475 696 3/1992

(Continued)

*Primary Examiner* — Hai C Pham
(74) *Attorney, Agent, or Firm* — DLA Piper LLP (US)

(57) ABSTRACT

The apparatus is adapted to deflect a light beam from a laser light source for each of the color components by means of a deflection mirror surface which oscillates, thereby making the light beam reciprocally scan in a main scanning direction. In this apparatus, however, only a light beam SL which scans in a first direction (+X) of the main scanning direction is irradiated in an effective image region on a photosensitive member, so as to form a latent image thereon. The resultant latent image is developed to form a toner image. Since image formation is performed using only the light beam SL which scans in the first direction (+X), the images may be formed at the consistent density irrespective of the image types. Furthermore, the scanning directions of the light beams SL for all the color components are uniformly defined to be the first direction (+X), so that the toner images of the respective colors may maintain the consistent density.

16 Claims, 42 Drawing Sheets

U.S. PATENT DOCUMENTS

| | | |
|---|---|---|
| 7,068,296 B2 | 6/2006 | Hayashi et al. |
| 7,187,400 B2 | 3/2007 | Bush .............................. 347/250 |
| 7,423,787 B2 | 9/2008 | Nakajima |
| 2002/0085082 A1 | 7/2002 | Takeuchi et al. .............. 347/129 |
| 2002/0122217 A1 | 9/2002 | Nakajima |
| 2002/0163702 A1 | 11/2002 | Hori et al. |
| 2002/0164157 A1 | 11/2002 | Hori et al. |
| 2003/0072066 A1 | 4/2003 | Hayashi et al. |
| 2004/0036760 A1 | 2/2004 | Yoo .............................. 347/241 |
| 2004/0120023 A1 | 6/2004 | Bush et al. |
| 2005/0163525 A1 | 7/2005 | Watabe .......................... 399/70 |

FOREIGN PATENT DOCUMENTS

| | | |
|---|---|---|
| EP | 0 564 252 | 10/1993 |
| EP | 1 046 510 | 10/2000 |
| JP | 55023719 U | 2/1980 |
| JP | 57160662 A | 10/1982 |
| JP | 62245211 A | 10/1987 |
| JP | 01-170958 | 7/1989 |
| JP | 07-154557 | 6/1995 |
| JP | 08-286459 | 11/1996 |
| JP | 09-230276 | 9/1997 |
| JP | 11-235834 | 8/1999 |
| JP | 2001-002279 | 1/2001 |
| JP | 2001215426 A | 8/2001 |
| JP | 2002258183 A | 9/2002 |
| JP | 2002-296534 | 10/2002 |
| JP | 2002341285 A | 11/2002 |
| JP | 2003098459 A | 4/2003 |
| JP | 2003-202777 | 7/2003 |
| JP | 2005-037629 | 2/2005 |

* cited by examiner

FIG. 6

| | YELLOW Y | MAGENTA M | CYAN C | BLACK K |
|---|---|---|---|---|
| | IN CASE WHERE PATTERN OF 2-LINE-ON and 2-LINE-OFF IS REPEATEDLY FORMED | | | |
| CONVEN-TIONAL APPARATUS | | | | |
| EMBODIMENT | | | | |

FIG. 13A: LATENT IMAGE FORMING BY LIGHT BEAM IN FIRST DIRECTION
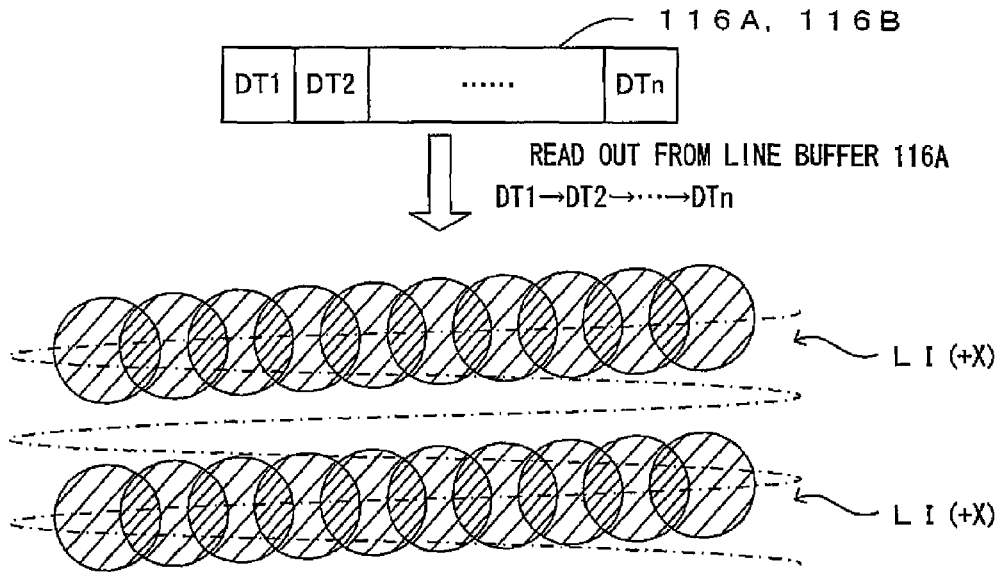
FIG. 13B: LATENT IMAGE FORMING BY LIGHT BEAM IN SECOND DIRECTION
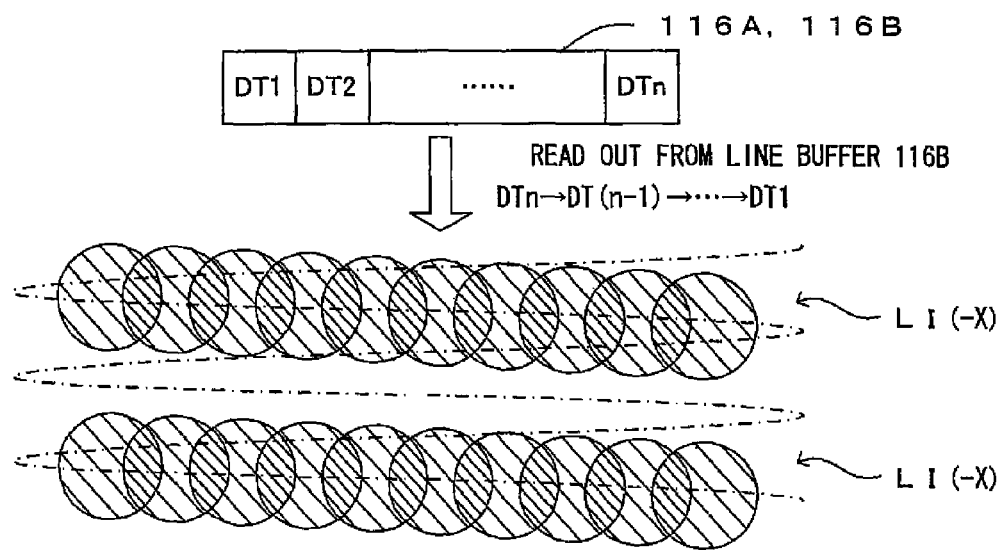
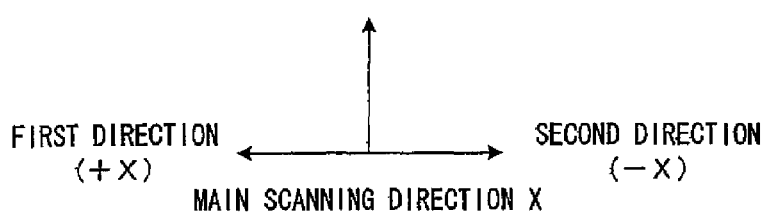

FIG. 23A   AR1: GRAPHIC REGION
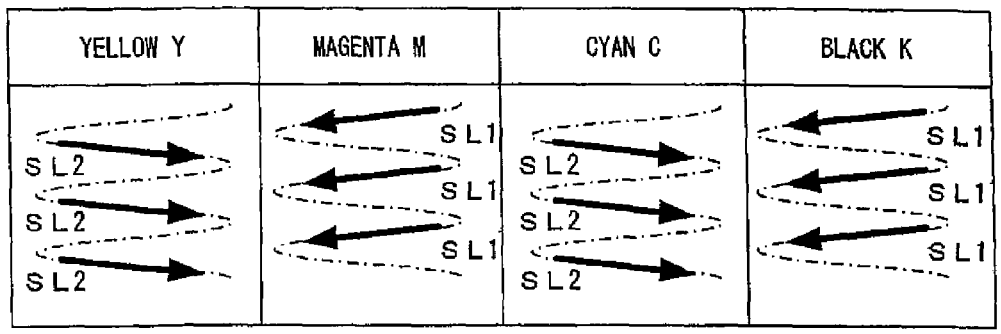
FIG. 23B   AR2: LINE-IMAGE REGION
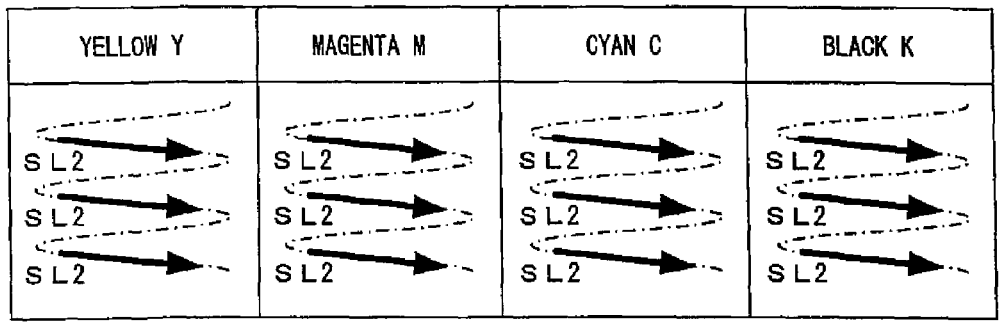
FIG. 23C   AR3: (GRAPHIC + LINE-IMAGE) MIXTURE REGION
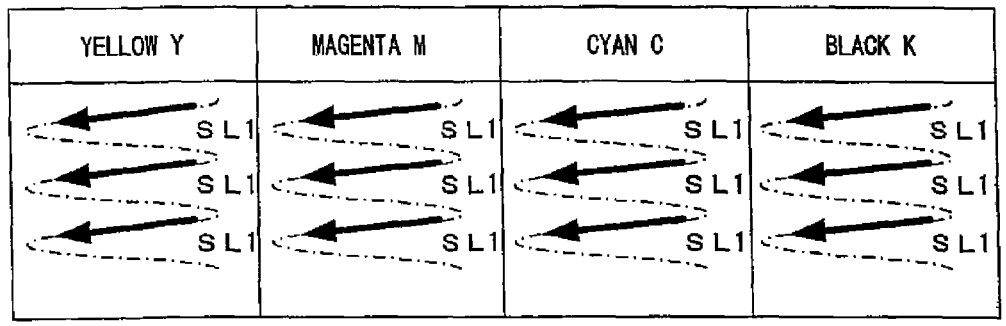
FIG. 23D   AR4: (LINE-IMAGE + GRAPHIC) MIXTURE REGION
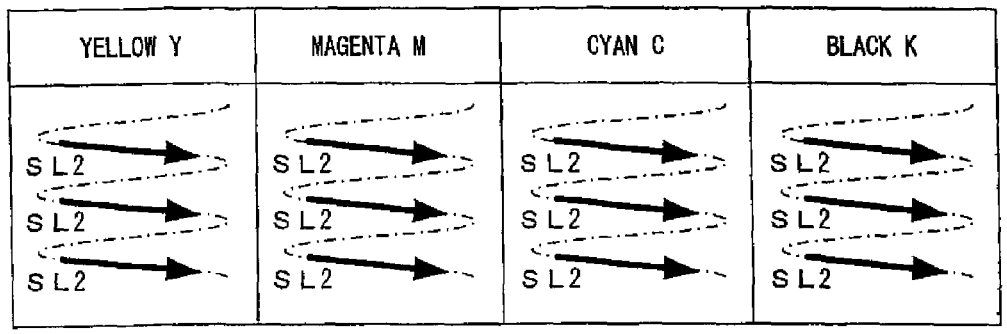
(+X) ←——•——→ (−X)

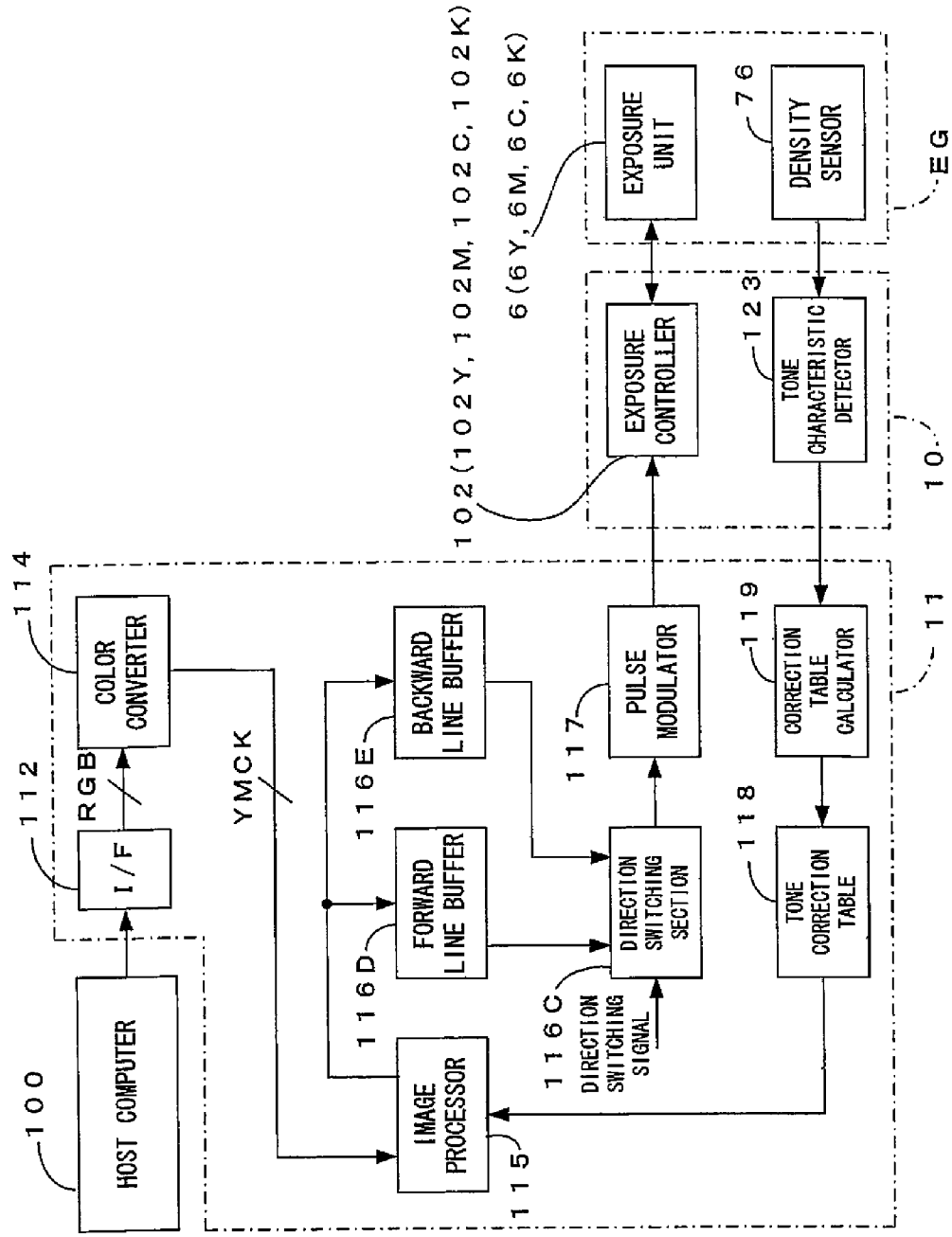

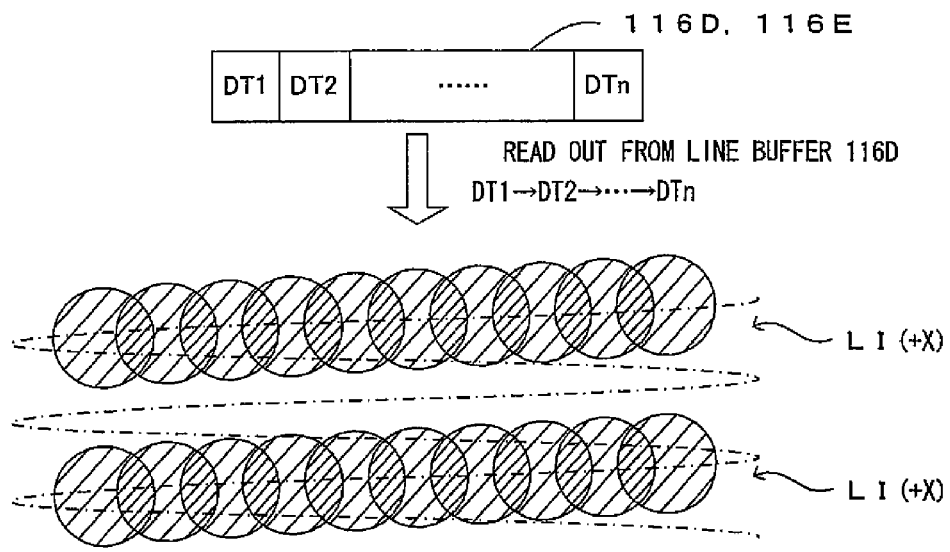
FIG. 25A: LATENT IMAGE FORMING BY LIGHT BEAM IN FIRST DIRECTION
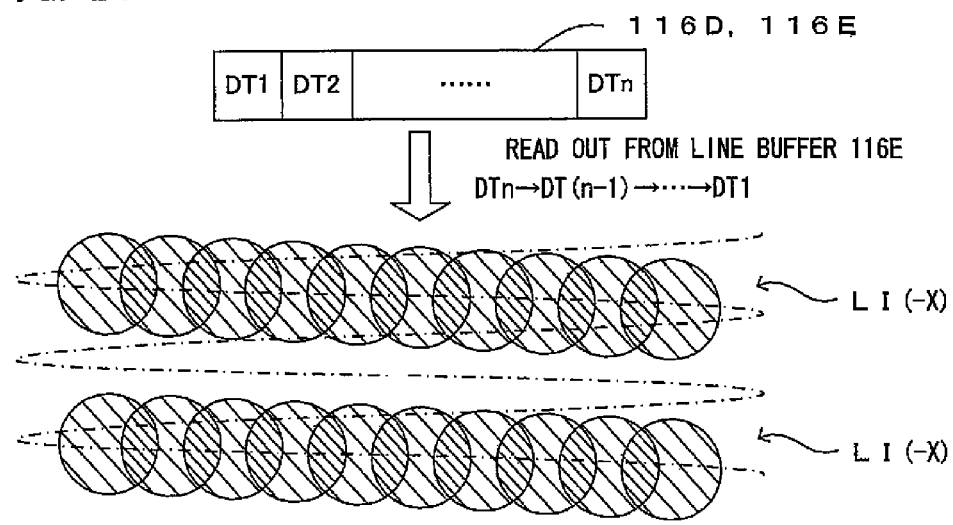
FIG. 25B: LATENT IMAGE FORMING BY LIGHT BEAM IN SECOND DIRECTION
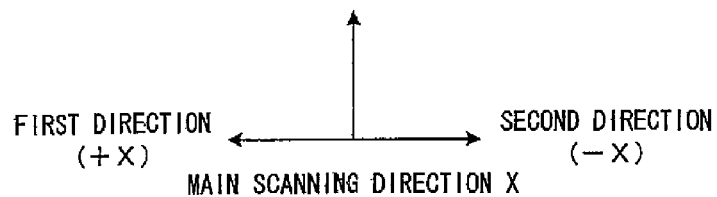

FIG. 33A  AR1: PHOTOGRAPHY REGION
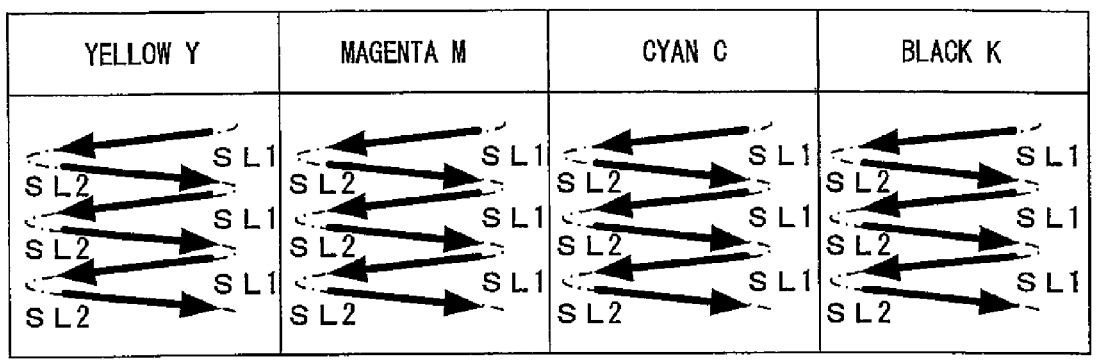
FIG. 33B  AR2: LINE REGION
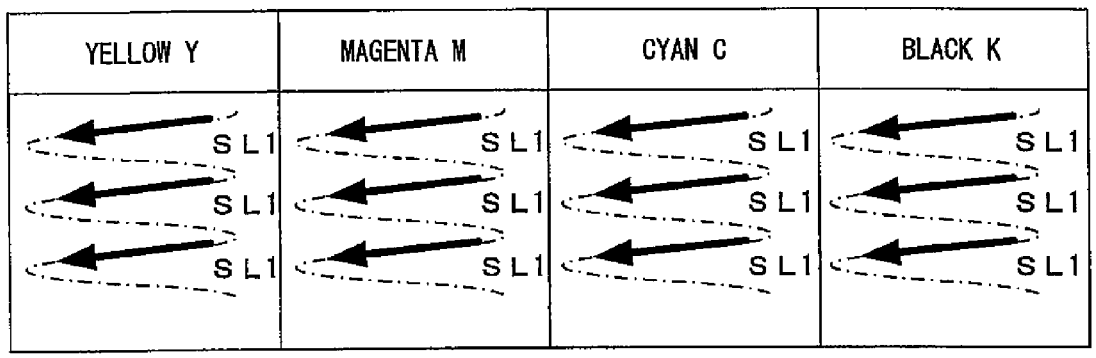
FIG. 33C  AR3: GRAPH REGION (COLLECTION OF AREAS OF CONSTANT TONE)
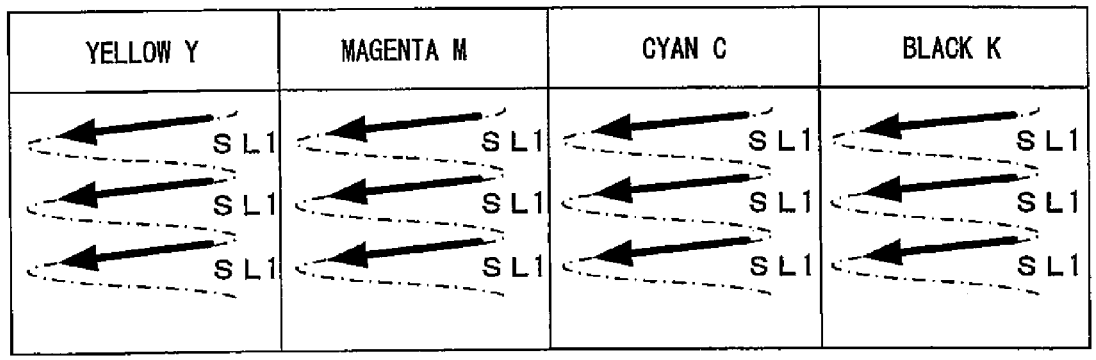

FIG. 40A  AR11:GRAPHIC REGION
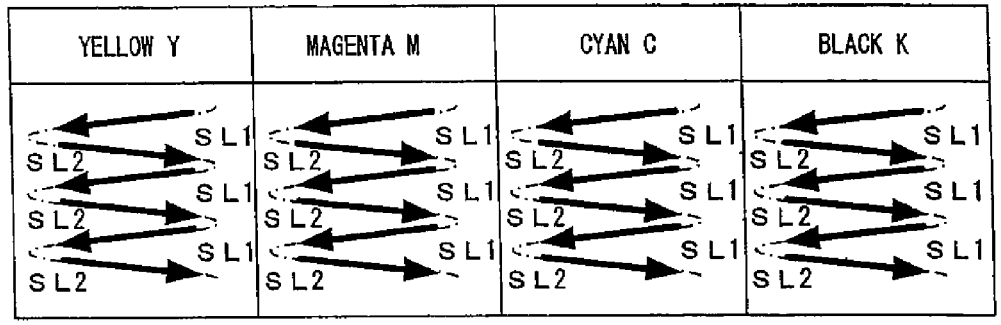
FIG. 40B  AR12:LINE-IMAGE REGION
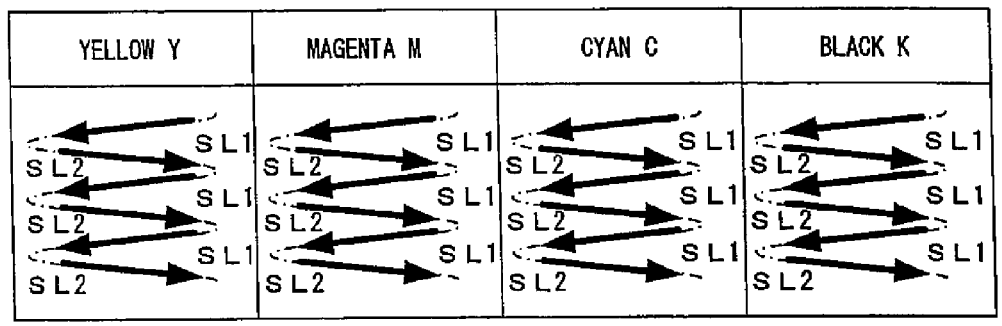
FIG. 40C  AR13:PHOTOGRAPHIC REGION (RIGHT-HAND SIDE)
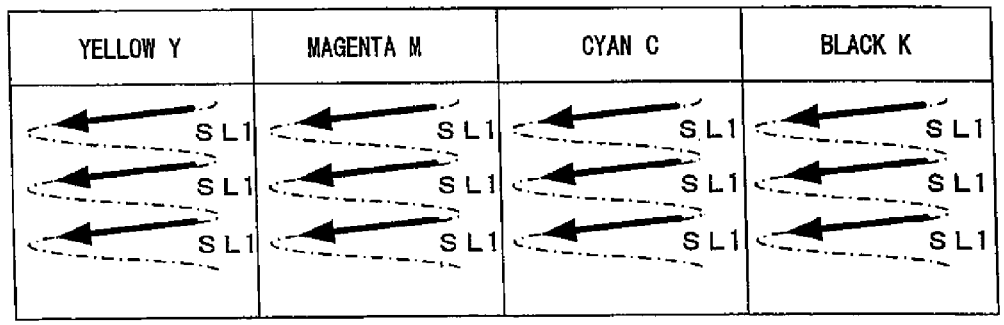
FIG. 40D  AR14:PHOTOGRAPHIC REGION (LEFT-HAND SIDE)
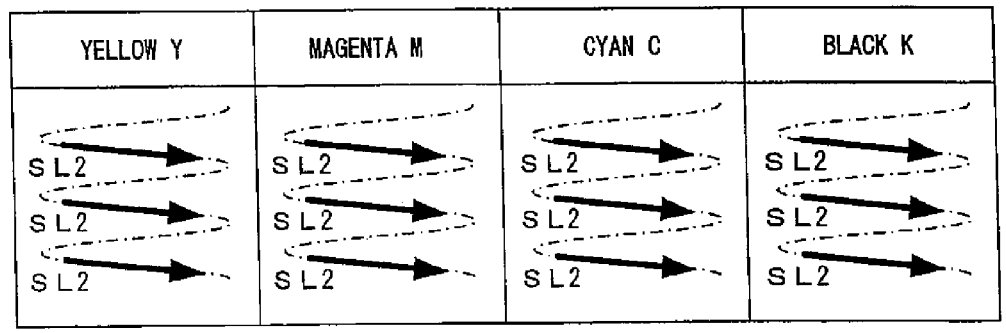
(+X) ←——•——→ (−X)

IMAGE FORMING APPARATUS, IMAGE FORMING METHOD AND DATA CONTROL DEVICE

CROSS REFERENCE TO RELATED APPLICATION

The disclosure of Japanese Patent Applications enumerated below including specification, drawings and claims is incorporated herein by reference in its entirety:
No. 2004-216859 filed Jul. 26, 2004;
No. 2004-216861 filed Jul. 26, 2004;
No. 2004-216862 filed Jul. 26, 2004; and
No. 2005-161343 filed Jun. 1, 2005.

BACKGROUND OF THE INVENTION

1. Field of the Invention

The present invention relates to an electrophotographic image forming apparatus and method. For example, an apparatus and method of a so-called tandem system which has a latent image forming unit for each of toner colors, the latent image forming unit makes a light beam from a light source scan by means of an oscillating deflection mirror surface. For another example, an apparatus and method which forms a linear latent image on a latent image carrier driven in a sub scanning direction by irradiating a latent-image forming light beam on the latent image carrier in a main scanning direction. For still another example, an apparatus and method which performs a printing operation in which a latent image is formed on a latent image carrier driven in a sub scanning direction by irradiating a latent-image forming light beam on the latent image carrier in a main scanning direction, and then, a toner image which is formed by developing the latent image is transferred onto a recording medium. The present invention also relates to a data control device suitable for use in the image forming apparatus and method above.

2. Description of the Related Art

As an image forming apparatus of this type, there has conventionally been known an image forming apparatus of a so-called tandem system wherein an image forming device including a photosensitive member, an exposure unit and a developing unit is dedicated to each of the four different colors including yellow, magenta, cyan and black, for example. In the tandem apparatus, a toner image of each color component is formed on the photosensitive member in the following manner as described in Japanese Unexamined Patent Publication No. H1-170958 of 1989, for example. That is, a light source of the exposure unit for each color component is controlled based on image data representing a toner image of the associated color component, while the light beam from the light source scans in the main scanning direction by means of a deflector (a polygon mirror, for example) of the exposure unit, thereby forming, on the photosensitive member, a latent image corresponding to the image data related to the color component. Such latent images are developed with toners of respectively corresponding colors so as to form toner images of the plural colors, and the resultant toner images of the plural colors are mutually superimposed on a transfer medium so as to form a color image.

Further, in order to achieve the size reduction and speeding up of a deflector, an apparatus has heretofore been proposed which employs an oscillating mirror as the deflector, which sinusoidally oscillates a deflection mirror surface (see, for example, Japanese Unexamined Patent Publication No. H9-230276 of 1997). In this apparatus, a frequency of a driving signal applied to the oscillating mirror matches with an intrinsic resonant frequency of the oscillating mirror, thereby bringing the oscillating mirror into resonant oscillations at relatively large amplitude. The light beam from the light source is irradiated on the oscillating mirror in resonant oscillations, thereby making the light beam scan reciprocally. Thus, the latent images are formed by the scanning light beam in both of the forward and backward scanning directions.

Furthermore, there is an image forming apparatus which is designed to print in various modes for the sake of enhancing the versatility of the apparatus and of offering sophisticated features. For instance, the apparatus described in above-mentioned Japanese Unexamined Patent Publication No. H1-170958 of 1989 is designed to print at two resolutions. In this apparatus, a polygon mirror is provided for the light beam to scan, the polygon mirror driven into rotation by a mirror driving motor. The mirror driving motor is electrically connected to a mirror driving control circuit, such that a driving signal applied to the mirror driving motor is switched between one for the lower resolution and the other for the higher resolution. In the case of printing at the lower resolution, therefore, the low-resolution driving signal is applied to the mirror driving motor so that the polygon mirror is rotated at a relatively lower speed. In the case of printing at the higher resolution, on the other hand, the high-resolution driving signal is applied to the mirror driving motor so that the polygon mirror is rotated at a relatively higher speed. By changing the rotational speed of the polygon mirror in this manner, it is possible to print in the two kinds of print modes including high-resolution printing and low-resolution printing.

SUMMARY OF THE INVENTION

Incidentally, in each of the image forming devices in the tandem apparatus described in above-mentioned Japanese Unexamined Patent Publication No. H1-170958 of 1989, a two-dimensional latent image is formed by making the light beam scan reciprocally in the main scanning direction while rotating a photosensitive member in a direction approximately orthogonal to the main scanning direction. Therefore, in a case where the latent images are formed by the scanning light beam in both of the forward and backward scanning directions as in above-mentioned Japanese Unexamined Patent Publication No. H9-230276 of 1997, a problem, to be described in detail hereinlater, that a density of an image portion formed at an end of a forward path in the main scanning direction is different from that of an image portion formed at an end of a backward path in the main scanning direction, may sometimes occur depending upon the type of image to be formed. This results in a degraded image quality.

The present invention has been made in view of the foregoing problem. It is a first object of the present invention to ensure that images are formed in a consistent density at all times in an apparatus which has a latent image forming unit for each of toner colors, the latent image forming unit makes the light beam from the light source scan by means of the oscillating deflection mirror surface.

Further, in an image forming apparatus, adjustment of a position of the latent image formed on the photosensitive member is crucial to provide an image of high quality. For example, in the image forming apparatus which forms a color image in the aforementioned manner, that is, mutually superimposing toner images of the plural colors, it is important to prevent the occurrence of a so-called "color registration offset", a phenomenon where the respective positions of the toner images of the individual color components are shifted from each other. One of the major causative factors of the color registration offset is the occurrence of skew where scanning lines are skewed relative to a reference line which is set in advance. To be more specific, it is ideal that the scanning line of the light beam which scans in the main scanning direction by the polygon mirror coincides with the reference line, so that the linear latent image is formed on the photosensitive member along the reference line. However, there may be a case where the scanning line in each of the exposure unit is skewed relative to the reference line, resulting in the occurrence of the color registration offset. In this connection, the apparatus described in above-mentioned Japanese Unexamined. Patent Publication No. H1-170958 of 1989 is provided with an adjustment mechanism which moves a light path of the light beam by minutely moving a part of the components of the exposure unit in mutually different two axial directions, thereby permitting the scanning line of the light beam to be movably adjusted. At a suitable time such as after the replacement of the photosensitive member, the scanning line may be movably adjusted so as to move the position of the linear latent image formed on the photosensitive member, whereby the color registration offset is corrected.

However, in the conventional apparatus described above, because the adjustment is made by mechanically moving a part of the components of the exposure unit such as an optical box in which the polygon mirror is placed, there is a certain limit in adjustment accuracy and it is practically impossible to accomplish the adjustment with accuracy of one pixel or less. Hence, there is a demand for a technique of further increasing the accuracy of the correction of the color registration offset thereby enabling the formation of images of high quality.

Further, as an image forming apparatuses which forms a color image, there is also known an image forming apparatus of a so-called four-cycle system besides the aforementioned tandem system. In this image forming apparatus, a process to form a latent image on a photosensitive member by the light beam scanning thereon, and to transfer onto a transfer medium such as an intermediate transfer belt a toner image which is obtained by developing the latent image with toner, is repeated for the respective four colors (yellow, magenta, cyan and black), and then these toner images of the four colors are mutually superimposed on the transfer medium, thereby forming the color image. In such an apparatus, as well, the correction of the color registration offset by way of the high accuracy adjustment of the respective forming positions of the latent images of the individual color components, or registration correction, is quite important for ensuring the formation of high quality images.

The present invention has been made in view of the foregoing problem. It is a second object of the invention to provide a technique of easily adjusting the position of the linear latent image formed on the latent image carrier with high accuracy for ensuring the formation of high quality images in an apparatus including a latent image forming unit which forms a linear latent image by a light beam which scans on a latent image carrier.

It is a third object of the invention to provide a data control device suited for achieving the second object of the invention.

Furthermore, in the conventional apparatus described in above-mentioned Japanese Unexamined Patent Publication No. H1-170958 of 1989, the print mode (resolution) is changed by varying the rotational speed of the polygon mirror. Hence, in a case where after printing on one recording medium or plural recording media in a particular print mode, the subsequent recording medium is printed in another print mode, the subsequent printing operation cannot be started until the rotational speed of the polygon mirror is stabilized. This results in difficulty in quickly changing the print modes.

The present invention has been made in view of the foregoing problem. It is a fourth object of the invention to provide a technique of permitting the print mode to be changed quickly in the image forming apparatus which performs a printing operation in which a latent image is formed by the light beam scanning on a latent image carrier, and then, a toner image formed by developing the latent image is transferred onto a recording medium.

It is a fifth object of the invention to provide a data control device suited for achieving the fourth object of the invention.

Incidentally, in the apparatus capable of printing at two resolutions as described above, a toner consumption can be adjusted by changing the resolution. In the normal printing operation, for example, the high-resolution printing may be carried out for accomplishing favorable printing. In a case where it is desired to decrease the toner consumption, on the other hand, the operation may be switched to the low-resolution printing by way of user setting. This print-mode switching operation permits the user to control the toner consumption as required.

However, since the conventional apparatus described in above-mentioned Japanese Unexamined Patent Publication No. H1-170958 of 1989 switches the print mode (resolution) by varying the rotational speed of the polygon mirror, the apparatus is unable to switch the print mode quickly as described above, even when the adjustment of the toner consumption is demanded by the user.

The present invention has been made in view of the foregoing problem. It is a sixth object of the invention to provide a technique of permitting the print mode to be changed quickly for the adjustment of the toner consumption in the image forming apparatus which performs a printing operation in which a latent image is formed by the light beam scanning on a latent image carrier, and then, a toner image formed by developing the latent image is transferred onto a recording medium.

According to a first aspect of the present invention, there is provided an image forming apparatus comprising a plurality of image forming devices each of which forms a toner image of a color different from each other, wherein the toner images which are formed by the respective image forming devices are mutually superimposed on a transfer medium, thereby forming a color image, wherein each of the plurality of image forming devices comprises: a latent image carrier, on a surface of which is provided with an effective image region which has a predetermined width in a main scanning direction, and the surface of which is driven in a sub scanning direction which is approximately orthogonal to the main scanning direction; and a latent image forming unit, which is structured to be capable of scanning a first scan region corresponding to the effective image region with a light beam from a light source in the main scanning direction by means of a deflection mirror surface which oscillates, and which irradiates the effective image region with only a light beam which scans in a first direction of the main scanning direction and the first scan region, thereby forming a latent image in the effective image region.

According to a second aspect of the present invention, there is provided an image forming apparatus, comprising: a latent image carrier, on a surface of which is provided with an effective image region which has a predetermined width in a main scanning direction, and the surface of which is driven in a sub scanning direction which is approximately orthogonal to the main scanning direction; a latent image forming unit, which is structured to be capable of scanning a first scan region corresponding to the effective image region with a light bean from a light source in the main scanning direction by means of a deflection mirror surface which oscillates, and which irradiates the effective image region with a latent-image forming light beam, thereby forming a linear latent image in the effective image region; and a direction controller which selectively switches a scanning direction of the latent-image forming light beam to a first direction in the main scanning direction or a second direction which is opposite to the first direction based on information related to latent-image forming position on the latent image carrier, wherein the latent image forming unit irradiates the effective image region with a light beam which scans the first scan region in the scanning direction set by the direction controller as the latent-image forming light beam so as to form the linear latent image in the effective image region, thereby adjusting the forming position of the linear latent image on the latent image carrier.

According to a third aspect of the present invention, there is provided a data control device for an image forming apparatus which causes a light source to emit a latent-image forming light beam while controlling the light source based on one line image data, and causes the latent-image forming light beam to scan the latent image carrier in a first direction or a second direction opposite to the first direction by means of a deflection mirror surface which oscillates, thereby forming a latent image corresponding to the one line image data on the latent image carrier, the data control device which controls the one line image data comprising: a storage section which temporarily stores a plurality of image information items which constitutes the one line image data; and a direction switching section which switches, based on information related to latent-image forming position on the latent image carrier, an order to read out the image information items from the storage section to control the light source based on the image information items.

According to a fourth aspect of the present invention, there is provided an image forming apparatus which performs printing by transferring a toner image, formed by developing a latent image, onto a recording medium, the apparatus comprising: a latent image carrier, on a surface of which is provided with an effective image region which has a predetermined width in a main scanning direction, and the surface of which is driven in a sub scanning direction which is approximately orthogonal to the main scanning direction; a latent image forming unit, which is structured to be capable of scanning a first scan region corresponding to the effective image region with a light beam from a light source in the main scanning direction by means of a deflection mirror surface which oscillates, and which irradiates the effective image region with a latent-image forming light beam, thereby forming a latent image in the effective image region; and a direction controller which selectively switches, based on information related to print mode, between a reciprocal scan mode in which the latent-image forming light beam reciprocally scans in the main scanning direction and a one-way scan mode in which the latent-image forming light beam scans in one-way in either a first direction in the main scanning direction or a second direction opposite to the first direction.

According to a fifth aspect of the present invention, there is provided a data control device for an image forming apparatus which performs a printing operation in which a light source is caused to emit a latent-image forming light beam while controlling the light source based on one line image data, and the latent-image forming light beam is caused to scan the latent image carrier in a first direction or a second direction opposite to the first direction by means of a deflection mirror surface which oscillates, thereby forming a latent image corresponding to the one line image data on the latent image carrier, and in which a toner image, formed by developing the latent image, is transferred onto a recording medium thereafter, the data control device which controls the one line image data comprising: a storage section which temporarily stores a plurality of image information items which constitutes the one line image data; and a direction switching section which switches, based on information related to print mode, an order to read out the image information items from the storage section to control the light source based on the image information items.

According to a sixth aspect of the present invention, there is provided an image forming apparatus which performs printing by transferring a toner image, formed by developing a latent image, onto a recording medium, the apparatus comprising: a latent image carrier, on a surface of which is provided with an effective image region which has a predetermined width in a main scanning direction, and the surface of which is driven in a sub scanning direction which is approximately orthogonal to the main scanning direction; a latent image forming unit, which is structured to be capable of scanning a scan region corresponding to the effective image region with a light beam from a light source in the main scanning direction by means of a deflection mirror surface which oscillates, and which irradiates the effective image region with a latent-image forming light beam, thereby forming a latent image in the effective image region; and a direction controller which selectively switches, based on information related to print mode, between a reciprocal scan mode in which the latent-image forming light beam reciprocally scans in the main scanning direction and a one-way scan mode in which the latent-image forming light beam scans in one-way in either a first direction in the main scanning direction or a second direction opposite to the first direction, wherein normal toner amount printing of printing using a usual first toner amount and toner saving printing of printing using a second toner amount which is less than the first toner amount are provided as the print modes, the latent image forming unit sets a light quantity of the latent-image forming light beam to the same value in either print modes, and the direction controller sets the scan mode, based on the information, to the reciprocal scan mode when the normal toner amount printing is performed, whereas to the one-way scan mode when the toner saving printing is performed.

According to a seventh aspect of the present invention, there is provided an image forming method of forming a color image on a transfer medium by using a plurality of image forming devices each of which forms a latent image on a latent image carrier and forms a toner image by developing the latent image with toner of a color different from each other, the latent image carrier, on a surface of which is provided with an effective image region in a predetermined width in a main scanning direction, and the surface of which is driven in a sub scanning direction which is approximately orthogonal to the main scanning direction, the method comprising: an image forming step, performed in each of the plurality of image forming devices, to form the latent image in the effective image region by irradiating the effective image region of the latent image carrier with a light beam from a light source scanning in a first direction of the main scanning direction by means of a deflection mirror surface which oscillates, and to form the toner image by developing the latent image; and a transferring step to form a color image by superimposing the toner images which are formed in the plurality of image forming devices on the transfer medium.

According to a eighth aspect of the present invention, there is provided an image forming method wherein a linear latent image is formed on a latent image carrier, on a surface of which is provided with an effective image region in a predetermined width in a main scanning direction, and the surface of which is driven in a sub scanning direction which is approximately orthogonal to the main scanning direction, the linear latent image formed in the effective image region by irradiating the effective image region with a latent-image forming light beam, the method comprising: an information acquisition step of acquiring information related to latent-image forming position on the latent image carrier; a direction determination step of selectively determining a scanning direction of the latent-image forming light beam to be a first direction in the main scanning direction or to be a second direction opposite to the first direction, based on the information acquired in the information acquisition step; and an image forming step of forming the latent image in the effective image region by irradiating the effective image region on the latent image carrier with a light beam from a light source by means of a deflection mirror surface which oscillates in the scanning direction determined in the direction determination step, thereby adjusting the latent-image forming position on the latent image carrier, and of forming a toner image by developing the latent image.

According to a ninth aspect of the present invention, there is provided an image forming method of performing a printing operation in which a latent image is formed on a latent image carrier, on a surface of which is provided with an effective image region in a predetermined width in a main scanning direction, and the surface of which is driven in a sub scanning direction which is approximately orthogonal to the main scanning direction, the latent image formed in the effective image region by irradiating the effective image region with a latent-image forming light beam, and a toner image, formed by developing the latent image, is transferred onto a recording medium thereafter, the method comprising: an information acquisition step of acquiring information related to print mode; a scan mode determination step of selectively switching, based on the information acquired in the information acquisition step, either to a reciprocal scan mode in which the latent-image forming light beam reciprocally scans in the main scanning direction or to a one-way scan mode in which the latent-image forming light beam scans in one-way either in a first direction in the main scanning direction or in a second direction opposite to the first direction; and an image forming step of forming the latent image in the effective image region by irradiating the effective image region on the latent image carrier with a light beam from a light source, by means of a deflection mirror surface which oscillates, in the scanning direction determined in the scan mode determination step, and of forming the toner image by developing the latent image.

According to a tenth aspect of the present invention, there is provided an image forming method of performing a printing operation in which a latent image is formed on a latent image carrier, on a surface of which is provided with an effective image region in a predetermined width in a main scanning direction, and the surface of which is driven in a sub scanning direction which is approximately orthogonal to the main scanning direction, the latent image formed in the effective image region by irradiating the effective image region with a latent-image forming light beam, and a toner image, formed by developing the latent image, is transferred onto a recording medium thereafter, the method comprising: an information acquisition step of acquiring information related to print modes which includes normal toner amount printing of printing using a usual first toner amount and toner saving printing of printing using a second toner amount which is less than the first toner amount; a scan mode determination step of determining the scan mode, based on the information acquired in the information acquisition step, to a reciprocal scan mode in which the latent-image forming light beam reciprocally scans in the main scanning direction when the normal toner amount printing is performed, whereas to a one-way scan mode in which the latent-image forming light beam scans in one-way either in a first direction in the main scanning direction or in a second direction opposite to the first direction when the toner saving printing is performed; and an image forming step of forming the latent image in the effective image region by irradiating the effective image region on the latent image carrier with a light beam from a light source, by means of a deflection mirror surface which oscillates, in the scanning direction determined in the scan mode determination step, and of forming the toner image by developing the latent image, wherein a light quantity of the latent-image forming light beam is set to the same value in either print modes in the image forming step.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6 is a diagram schematically showing the latent-image forming operation.

FIGS. 13A and 13B are diagrams which show a linear latent image formed in the second embodiment.

FIGS. 23A through 23D are diagrams each showing linear latent images formed by the image forming apparatus of the seventh embodiment.

FIG. 24 is a diagram showing signal processing blocks of the image forming apparatus of the eighth embodiment.

FIGS. 25A and 25B are diagrams which show a linear latent image formed in the eighth embodiment.

FIGS. 33A through 33C are diagrams showing latent images formed by the image forming apparatus of the eleventh embodiment.

FIGS. 40A through 40D are diagrams each showing linear latent images formed by the image forming apparatus of the fourteenth embodiment.

DETAILED DESCRIPTION OF THE PREFERRED EMBODIMENT

First Embodiment

Figure 1:
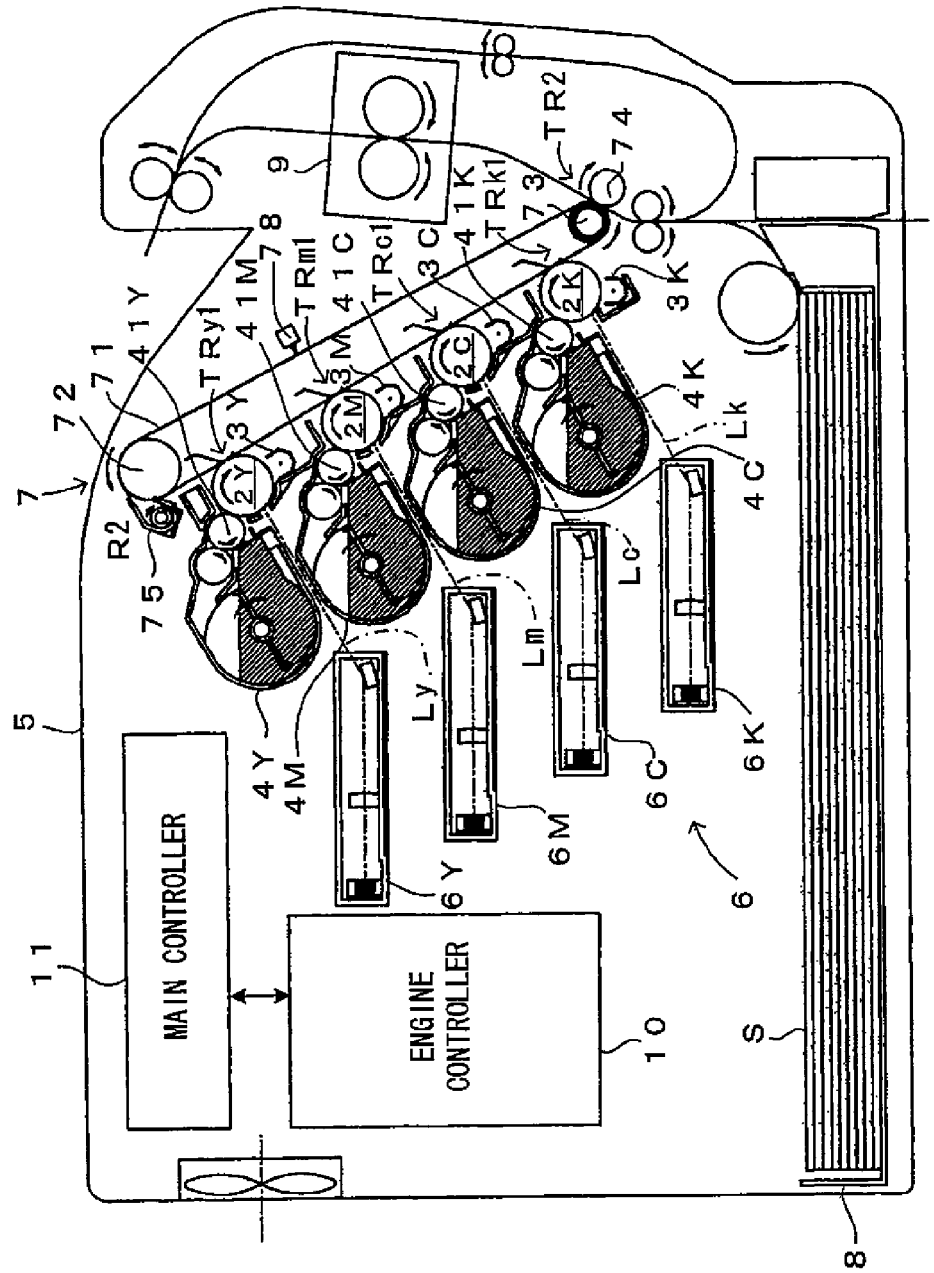
FIG. 1 is a diagram showing an image forming apparatus according to a first embodiment of the invention.
Figure 2:
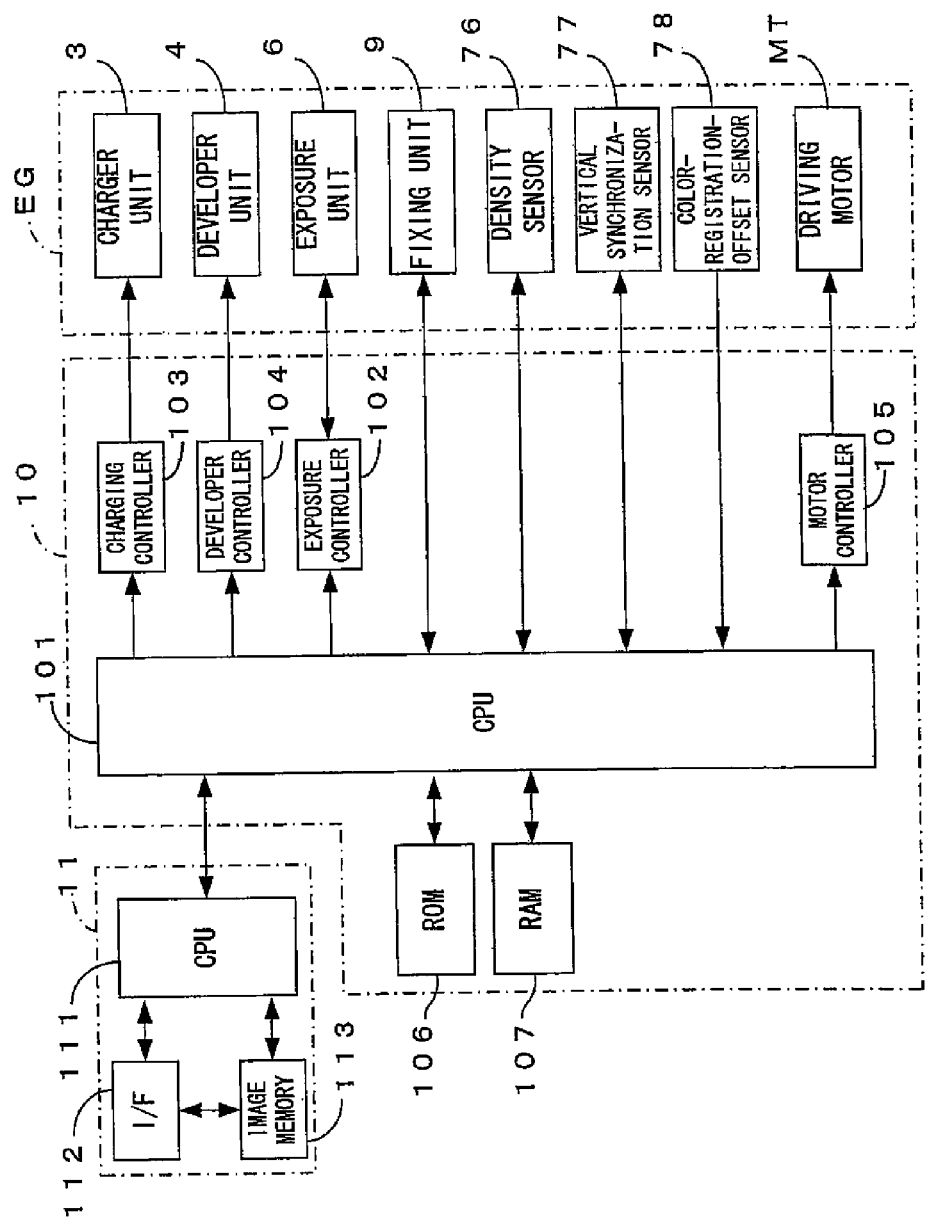
FIG. 2 is a block diagram showing an electrical structure of the image forming apparatus shown in FIG. 1.

FIG. 1 is a diagram showing an image forming apparatus according to a first embodiment of the invention. FIG. 2 is a block diagram showing an electrical structure of the image forming apparatus shown in FIG. 1. This image forming apparatus is a so-called tandem color printer, wherein photosensitive members 2Y, 2M, 2C, 2K for four colors of yellow (Y), magenta (M), cyan (C) and black (K), as latent image carriers, are juxtaposed to each other in an apparatus body 5. The apparatus serves to form a full color image by superimposing toner images on the individual photosensitive members 2Y, 2M, 2C, 2K, or to form a monochromatic image using only the toner image of black (K). The image forming apparatus operates as follows. When an external apparatus such as a host computer applies a print command to a main controller 11 in response to a request from a user wanting to form an image, a CPU 111 of the main controller 11 sends a print command, based on which an engine controller 10 controls individual parts of an engine part EG so as to form an image corresponding to the print command on a sheet S such as copy sheet, transfer sheet, paper and transparent sheet for OHP.

In the engine part EG, charger units, developing units, exposure units and cleaners are provided in correspondence to the four photosensitive members 2Y, 2M, 2C, 2K, respectively. Thus, image forming devices, each of which includes the photosensitive member, the charger unit, the developing unit, the exposure unit and the cleaner, are provided in association with the respective toner colors, and form the toner images of each associated toner color. It is noted that these image forming devices (the photosensitive members, the charger units, developing units, exposure units and cleaners) for the respective color components are structured the same way. Therefore, the structure for the yellow color is described here while individual parts of the structures for the other color components are represented by equivalent reference characters, respectively, and the description thereof is dispensed with.

The photosensitive member 2Y is rotatable in a direction of an arrow in FIG. 1 (sub scanning direction). More specifically, a driving motor MT is mechanically connected to one end of the photosensitive member 2Y. When a drive command is applied from a CPU 101 to a motor controller 105 electrically connected to the driving motor MT, the motor controller 105 controls to drive the driving motor MT. Thus, the photosensitive member 2Y is moved in rotation. Thus, in this embodiment, the photosensitive member 2Y is driven by transmitting a driving force from the driving motor MT only to the one end of the photosensitive member 2Y. Furthermore, this embodiment is designed such that a location of the driving motor MT, a location of a horizontal synchronization sensor 60 to be described hereinlater and a scanning direction of a light beam satisfy a predetermined relation. In this regard, a detailed description will be made hereinlater.

Figure 4:
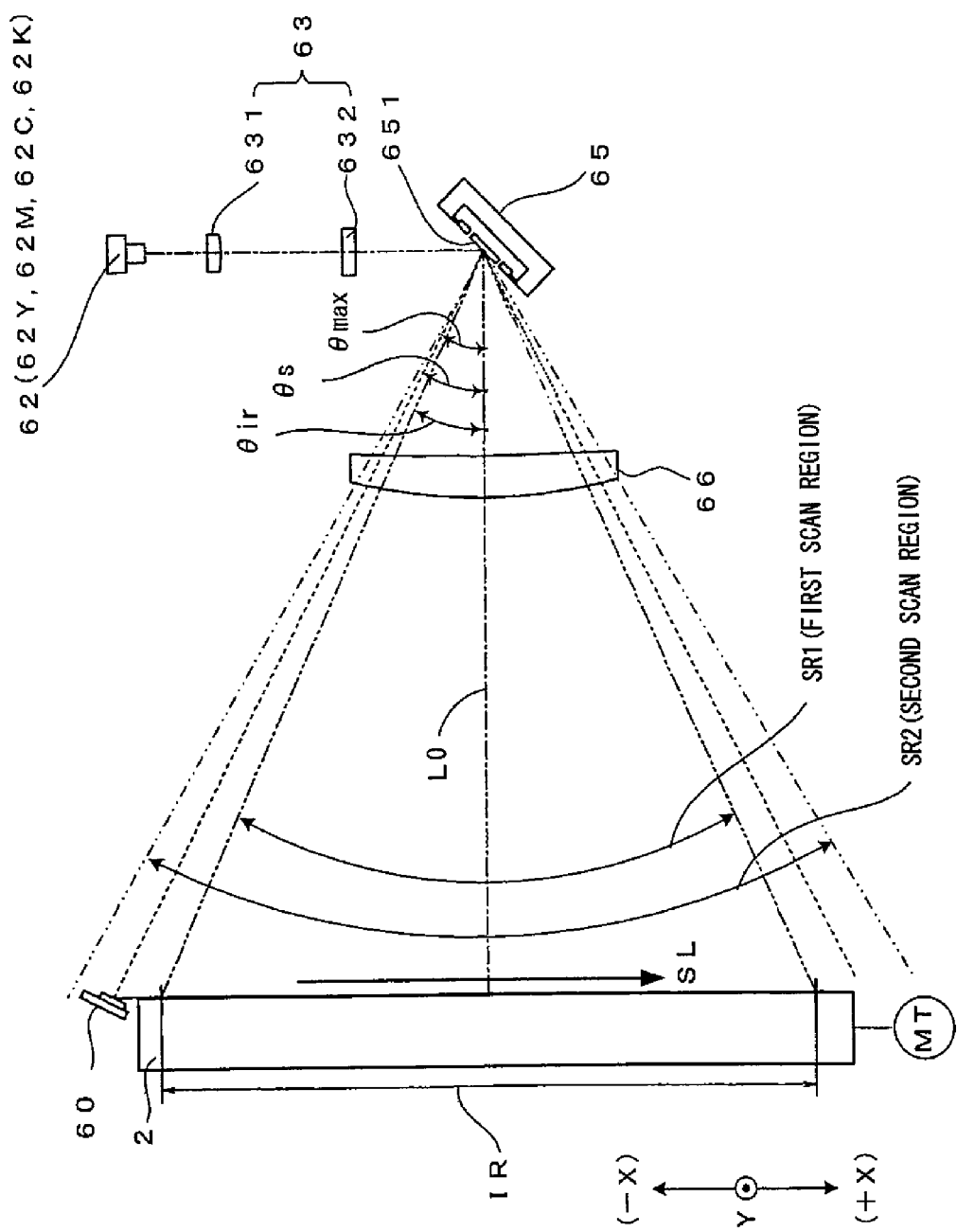
FIG. 4 is a diagram showing a scan region of the light beam in the exposure unit shown in FIG. 3.

Around the photosensitive member 2Y driven in this manner, a charger unit 3Y, a developing unit 4Y and a cleaner (not shown) are arranged along a rotational direction thereof. The charger unit 3Y comprises a scorotron charger, for example, which is applied with a charging bias from a charge controller 103 thereby uniformly charging an outer circumferential surface of the photosensitive member 2Y to a predetermined surface potential. An exposure unit 6Y emits a scanning light beam Ly toward the outer circumferential surface of the photosensitive member 2Y so charged by the charger unit 3Y. Thus, an electrostatic latent image corresponding to yellow image data included in the print command is formed on the photosensitive member 2Y. The exposure unit 6Y is equivalent to a "latent image forming unit" of the invention and operates according to a control command from an exposure controller 102Y (FIG. 4). Structures and operations of the exposure unit 6 (6Y, 6M, 6C, 6K) and the exposure controller 102 (102Y, 102M, 102C, 102K) will be described in detail hereinlater.

The electrostatic latent image thus formed is developed with toner by means of the developing unit 4Y. The developing unit 4Y contains therein a yellow toner. When a developing unit controller 104 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. Particularly in an image forming apparatus of a non-contact development system wherein the photosensitive member 2Y is spaced away from the developing roller 41Y and the toner is made to jump between these members for accomplishing the development with toner, the developing bias may preferably have a waveform formed by superimposing a sinusoidal-wave, triangular-wave or rectangular-wave AC voltage on the DC voltage such as to effect efficient toner jumping.

The yellow toner image developed by the developing unit 4Y is primarily transferred onto an intermediate transfer belt 71 of a transfer unit 7 in a primary transfer region TRy1. The other members for the other color components than yellow are structured identically as those for the yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes the intermediate transfer belt 71 entrained about two rollers 72 and 73, and a belt driver (not shown) which drives the roller 72 into rotation thereby rotating the intermediate transfer belt 71 in a predetermined rotation direction R2. Further, a secondary transfer roller 74 is disposed at a position opposing the roller 73 with the intermediate transfer belt 71 interposed therebetween and is structured to move into contact with or away from a surface of the belt 71 by means of an unillustrated electromagnetic clutch. In a case where a color image is transferred to the sheet S, primary transfer timings are controlled to superimpose the individual toner images on each other so as to form the color image on the intermediate transfer belt 71. Then, the color image is secondarily transferred onto the sheet S taken out from a cassette 8 and transported to a secondary transfer region TR2 between the intermediate transfer belt 71 and the secondary transfer roller 74. In a case where a monochromatic image is transferred to the sheet S, on the other hand, only a black toner image is formed on the photosensitive member 2K and the monochromatic image is secondarily transferred onto the sheet S transported to the secondary transfer region TR2. The sheet S thus having received the secondarily transferred image is transported to a discharge tray on a top surface of the apparatus body via a fixing unit 9.

After the primary transfer of the toner images to the intermediate transfer belt 71, the surface potentials of the photosensitive members 2Y, 2M, 2C, 2K are reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, 3K.

Disposed in the vicinity of the roller 72 are a transfer belt cleaner 75, a density sensor 76 (FIG. 2) and a vertical synchronization sensor 77 (FIG. 2). Of these, the cleaner 75 is structured to move into contact with or away from the roller 72 by means of an unillustrated electromagnetic clutch. Having moved toward the roller 72, the cleaner 75 holds its blade against the surface of the intermediate transfer belt 71 entrained about the roller 72 thereby removing the toner remaining on the outer circumferential surface of the intermediate transfer belt 71 after the secondary image transfer. The density sensor 76 is disposed facing the surface of the intermediate transfer belt 71 and measures the optical densities of patch images formed on the outer circumferential surface of the intermediate transfer belt 71. The vertical synchronization sensor 77 is a sensor which detects a reference position of the intermediate transfer belt 71 and functions as a vertical synchronization sensor for obtaining a synchronizing signal outputted in association with a rotation of the intermediate transfer belt 71 in the sub scanning direction, namely a vertical synchronizing signal Vsync. In this apparatus, the operations of the individual parts of the apparatus are controlled based on the vertical synchronizing signal Vsync for the purposes of synchronizing the operation timings of the individual parts and precisely superimposing the toner images of the respective colors on each other. Further, a color-registration-offset sensor 78 is disposed between the rollers 72 and 73, and detects an amount of color-registration-offset of toner images of each color.

In FIG. 2, a reference numeral 113 represents an image memory provided in the main controller 11 for storing image data supplied from the external apparatus, such as a host computer, via an interface 112. A reference numeral 106 represents a ROM for storing operation programs executed by the CPU 101, control data used for controlling the engine part EG, and the like. A reference numeral 107 represents a RAM for temporarily storing the operation results given by the CPU 101, and other data.

Figure 3:
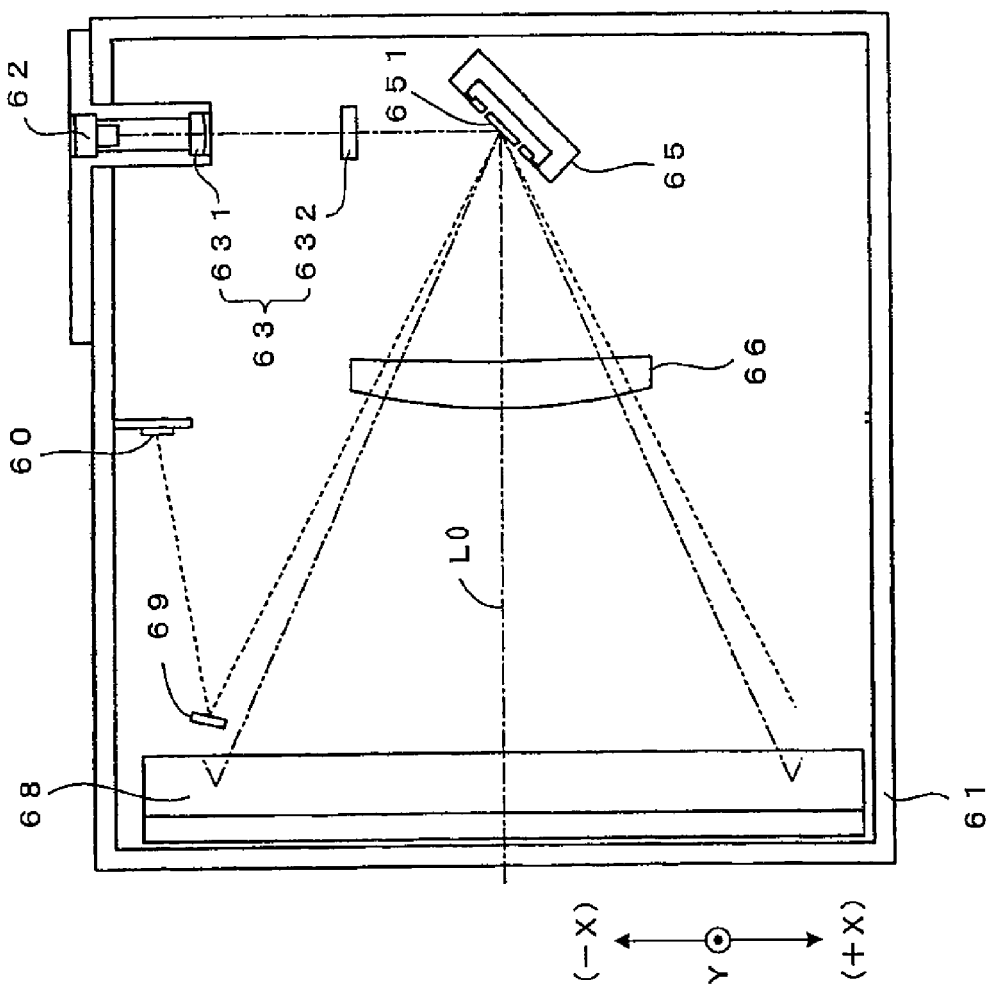
FIG. 3 is a main scanning cross sectional view showing a structure of the exposure unit which is disposed in the image forming apparatus shown in FIG. 1.
Figure 5:
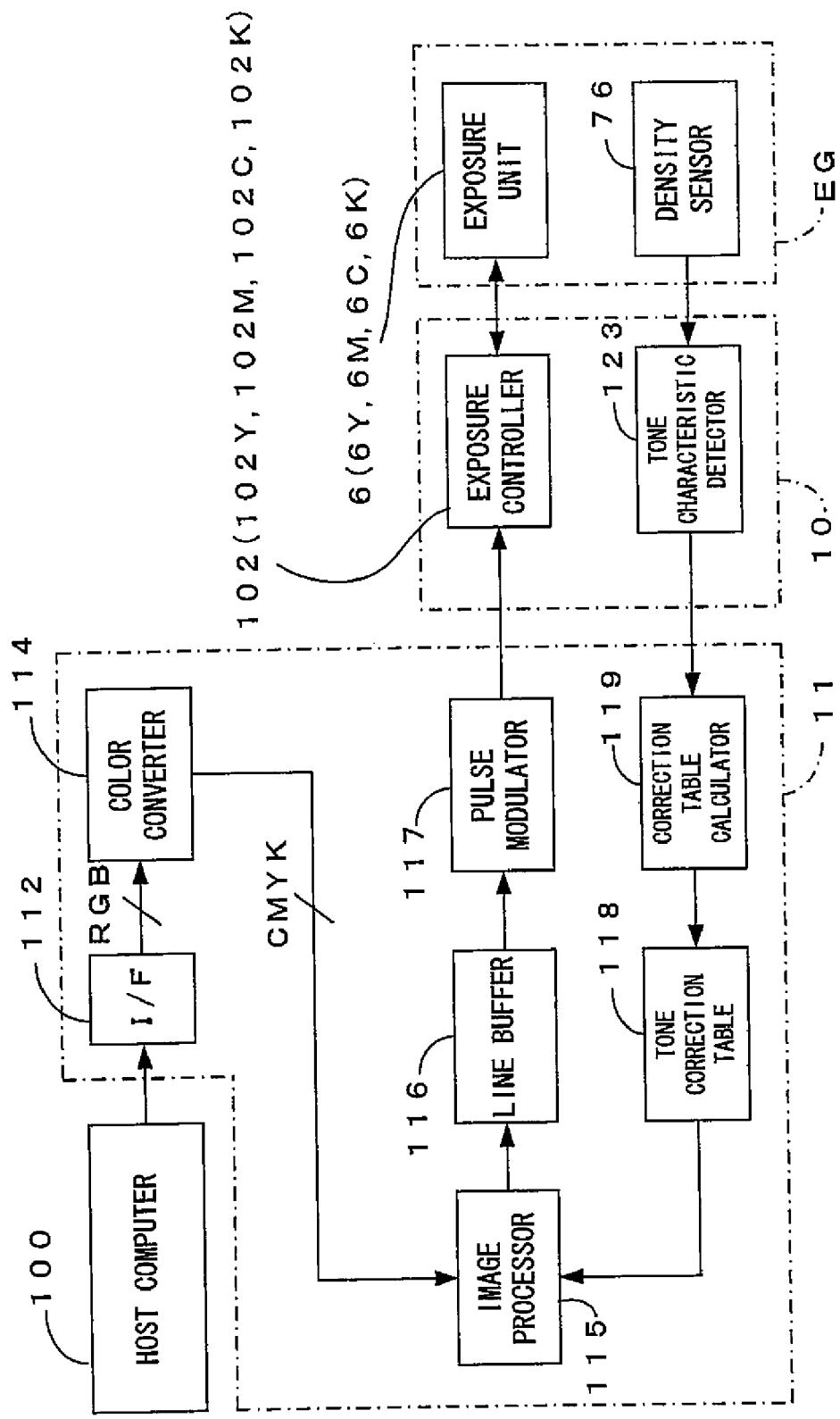
FIG. 5 is a diagram showing signal processing blocks of the image forming apparatus shown in FIG. 1.

FIG. 3 is a main scanning cross sectional view showing a structure of the exposure unit which is disposed in the image forming apparatus shown in FIG. 1. FIG. 4 is a diagram showing a scan region of the light beam in the exposure unit shown in FIG. 3. FIG. 5 is a diagram showing signal processing blocks of the image forming apparatus shown in FIG. 1. Referring to these figures, the structures and operations of the exposure unit 6 and the exposure controller 102 will now be described in detail. It is noted that since the exposure unit 6 and the exposure controller 102 for the respective color components are structured the same ways, the structure for the yellow color is described here while the individual parts of the structures for the other color components are represented by equivalent reference characters, respectively, and the description thereof is dispensed with.

The exposure unit 6Y (6M, 6C, 6K) includes an exposure housing 61. The exposure housing 61 has a single laser light source 62Y fixed thereto so as to be capable of emitting a light beam from the laser light source 62Y. The laser light source 62Y is electrically connected to a light source driver (not shown) of the exposure controller 102Y shown in FIG. 5. The light source driver operates as follows to provide ON/OFF control of the laser light source 62Y according to an image signal, so that the laser light source 62Y emits the light beam modulated in correspondence to the image data. Referring to FIG. 5, description is made as below.

When the image signal from the external apparatus such as a host computer 100 is inputted to the image forming apparatus, the main controller 11 performs a predetermined signal processing on the image signal. The main controller 11 includes function blocks such as a color converter 114, an image processor 115, a line buffer 116, a pulse modulator 117, a tone correction table 118, a correction table calculator 119, and the like.

In addition to the CPU 101, the ROM 106, the RAM 107, and the exposure controller 102 shown in FIG. 2, the engine controller 10 further includes a tone characteristic detector 123 which detects a tone characteristic representing a gamma characteristic of the engine part EG based on a detection result given by the density sensor 76. In the main controller 11 and the engine controller 10, these function blocks may be implemented in hardware or otherwise, in software executed by the CPUs 111 and 101.

In the main controller 11 supplied with the image signal from the host computer 100, the color converter 114 converts RGB tone data into corresponding CMYK tone data, the RGB tone data representing the respective tone levels of RGB components of each pixel in an image corresponding to the image signal, the CMYK tone data representing the respective tone levels of CMYK components corresponding to the RGB components. In the color converter 114, the inputted RGB tone data are composed of eight bits for each pixel for each color component (or representing 256 tone levels), for example, whereas the outputted CMYK tone data are composed of eight bits for each pixel for each color component (or representing 256 tone levels). The CMYK tone data outputted from the color converter 114 are inputted to the image processor 115.

The image processor 115 performs the following processes for each of the color components. That is, the image processor performs tone correction and a half-toning process on the tone data of each pixel inputted from the color converter 114. Specifically, the image processor 115 looks up the tone correction table 118 stored in a non-volatile memory in advance, and converts the tone data of each pixel inputted from the color converter 114 into corrected tone data representing corrected tone levels according to the tone correction table 118. An object of the tone correction is to compensate for the change of the gamma characteristic of the engine part EG constructed as described above, thereby to maintain the overall gamma characteristic of the image forming apparatus in an idealistic state at all times. That is, in the image forming apparatuses of this type, the gamma characteristic varies from one apparatus to another, and even in the same apparatus, the gamma characteristic varies according to a status of use. In order to eliminate influences of the varied gamma characteristic upon the image quality, a tone control process is performed at predetermined timings for updating the contents of the aforementioned tone correction table 118 based on a result of actual measurement of image densities.

The tone control process is performed as follows. Tone patch images, which are prepared in advance for measurement of the gamma characteristic for tone correction, are formed on the intermediate transfer belt 71 by the engine part EG for each toner color. The respective image densities of the tone patch images are detected by the density sensor 76. Based on signals from the density sensor 76, the tone characteristic detector 123 generates a tone characteristic (the gamma characteristic of the engine part EG) wherein the respective tone levels of the tone patch images are in correspondence to the respective image densities thus detected, and outputs the resultant tone characteristic to the correction table calculator 119 of the main controller 11. The correction table calculator 119 calculates tone correction table data to obtain the idealistic tone characteristic by compensating for the measured tone characteristic of the engine part EG based on the tone characteristic supplied from the tone characteristic detector 123, and then updates the contents of the tone correction table 118 to the calculated results. In this manner, the tone correction table 118 is redefined. By making such updates, the image forming apparatus is capable of forming images of a consistent quality irrespective of the variations or change with time of the gamma characteristic of the apparatus.

The image processor 115 performs the half-toning process, such as an error diffusion method, a dither method, a screen method, and the like to the corrected tone data thus corrected, and inputs the half-toning-processed CMYK tone data composed of eight bits for each pixel for each color component into the line buffer 116. The tone data stored in the line buffer 116 which is disposed for each of color component are inputted into the pulse modulator 117 at a proper timing. The contents of the half-toning process vary depending upon the types of images to be formed. That is, the most suited contents of the process to the image to be formed are selected and executed based on a criterion as to whether the image is a monochromatic image or a color image, or whether the image is a line image or a graphic image, or the like.

The half-toning-processed tone data inputted to the pulse modulator 117 are represented by multivalued signals which indicate respective sizes and an arrangement of toner dots of each color to adhere to each pixel. Receiving such data, the pulse modulator 117, using the half-toning-processed tone data, generates a video signal for pulse width modulation of an exposure laser pulse for an image of each color in the engine part EG, and outputs the video signal to the engine controller 10 via an unillustrated video interface. A light-source driver (not shown) of the exposure controller 102Y, receiving the video signal, controls ON/OFF of the laser light source 62Y of the exposure unit 6. The same operations are performed on the other color components.

Returning to FIGS. 3 and 4, further description is made as follows. To make the light beam from the laser light source 62Y scan and expose the surface (not shown) of the photosensitive member 2Y, a collimator lens 631, a cylindrical lens 632, a deflector 65 and a scanning lens 66 are disposed inside the exposure housing 61. In other words, after shaped into collimated light beam of a proper size by the collimator lens 631, the light beam from the laser light source 62Y impinges upon the cylindrical lens 632 which is powered only in a sub scanning direction Y. By adjusting the cylindrical lens 632, the collimated light beam is focused in the vicinity of a deflection mirror surface 651 of the deflector 65 in the sub scanning direction Y. Thus, according to this embodiment, the collimator lens 631 and the cylindrical lens 632 function as a beam shaping system 63 which shapes the light beam from the laser light source 62Y.

The deflector 65 is made using a micro machining technique which is an application of semiconductor manufacturing techniques and which aims at forming an integrated micro machine on a semiconductor substrate, and is structured with an oscillation mirror which oscillates in resonance. Specifically, the deflector 65 is capable of deflecting the light beam in a main scanning direction X by means of the deflection mirror surface 651 which oscillates in resonance. More specifically, the deflection mirror surface 651 is supported to be able to freely pivot about a pivot axis (torsion spring) which is approximately orthogonal to the main scanning direction X and sinusoidally oscillates about the pivot axis according to an external force applied from an actuator (not shown). The actuator applies an electrostatic, electromagnetic or mechanical external force to the deflection mirror surface 651 based on a mirror driving signal from a mirror driver (not shown) of the exposure controller 102, thereby oscillating the deflection mirror surface 651 at a frequency of the mirror driving signal.

The actuator may adopt any of the driving methods based on electrostatic adsorption, electromagnetic force, mechanical force, and the like. These driving methods are well known in the art and hence, the description thereof is dispensed with.

The light beam deflected by the deflection mirror surface 651 of the deflector 65 is deflected toward the scanning lens 66 at a maximum amplitude angle θmax, as shown in FIG. 4. In this embodiment, the scanning lens 66 is designed to have an approximately constant F value with respect to the overall effective image region IR on the photosensitive member 2. Therefore, the light beam deflected toward the scanning lens 66 is focused in the effective image region IR on the surface of the photosensitive member 2 in a spot of an approximately constant diameter by the scanning lens 66. Thus, the light beam scans in parallel to the main scanning direction X so as to form a linear latent image in the effective image region IR on the photosensitive member 2, the linear latent image extending in the main scanning direction X. In addition, in this embodiment, a scan region ("second scan region" of the invention) SR2, which can be scanned by the deflector 65, is broader than a scan region ("first scan region" of the invention) SR1 where the light beam scans in the effective image region IR, as shown in FIG. 4. Further, the first scan region SR1 is positioned approximate center of the second scan region SR2, so as to be approximately symmetrical with respect to an optical axis. Furthermore, a reference symbol θir in FIG. 4 represents the amplitude angle of the deflection mirror surface 651, which corresponds to an end of the effective image region IR, and a reference symbol θs represents the amplitude angle of the deflection mirror surface 651, which corresponds to a horizontal synchronization sensor to be described below.

Further, in the apparatus structured as described above, the light beam is capable of reciprocally scanning in the main scanning direction, that is, the light beam is capable of scanning in both (+X) direction and (−X) direction. In this embodiment, however, only a light beam SL which scans in the (+X) direction and in the first scan region SR1 is guided to the effective image region IR to form the latent image in the effective image region IR, as shown in FIG. 4. That is, the (+X) direction is a scanning direction of the light beam SL to form the latent image and is equivalent to a "first direction" of the invention. In this embodiment, the scanning direction and the location of the driving motor MT are previously defined to satisfy the following relation.

The driving motor MT is disposed on a downstream side of the scanning direction (+X). As shown in FIG. 3, a return mirror 69 is disposed on an upstream side in the scanning direction (+X) which guides the scanning light beam at the end of the scanning path toward the horizontal synchronization sensor 60. The return mirror 69 is disposed at the end of the second scan region SR2 on an upstream side in the scanning direction (+X). The return mirror 69 guides the scanning light beam which moves inside the second scan region SR2 and outside the first scan region SR1 on the upstream side in the scanning direction (+X) toward the horizontal synchronization sensor 60. At a time when the scanning light beam is received by the horizontal synchronization sensor 60 and passes at a sensor position (amplitude angle θs), the horizontal synchronization sensor 60 outputs a signal. In this embodiment, the horizontal synchronization sensor 60 functions as a horizontal synchronization reading sensor for obtaining a synchronizing signal when the light beam scans the effective image region IR in the main scanning direction X, or a horizontal synchronizing signal Hsync. A latent image forming operation is controlled based on the horizontal synchronizing signal Hsync. With reference to the following figures, the latent image forming operation of the apparatus according to the embodiment is described in contrast to a latent image forming operation of a conventional apparatus.

Figure 7:
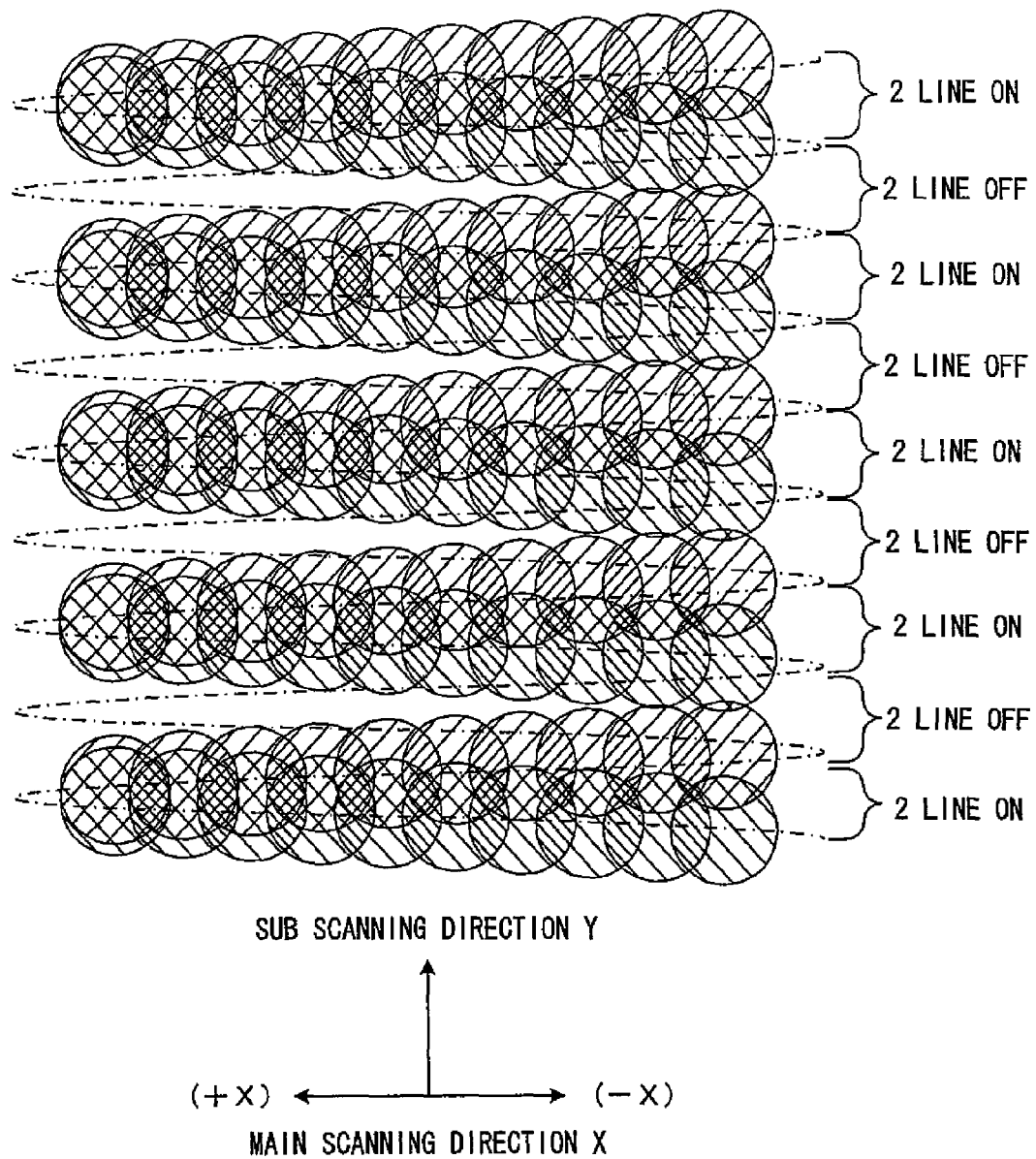
FIG. 7 is a diagram showing latent images formed by the latent-image forming operation of the conventional apparatus.
Figure 8:
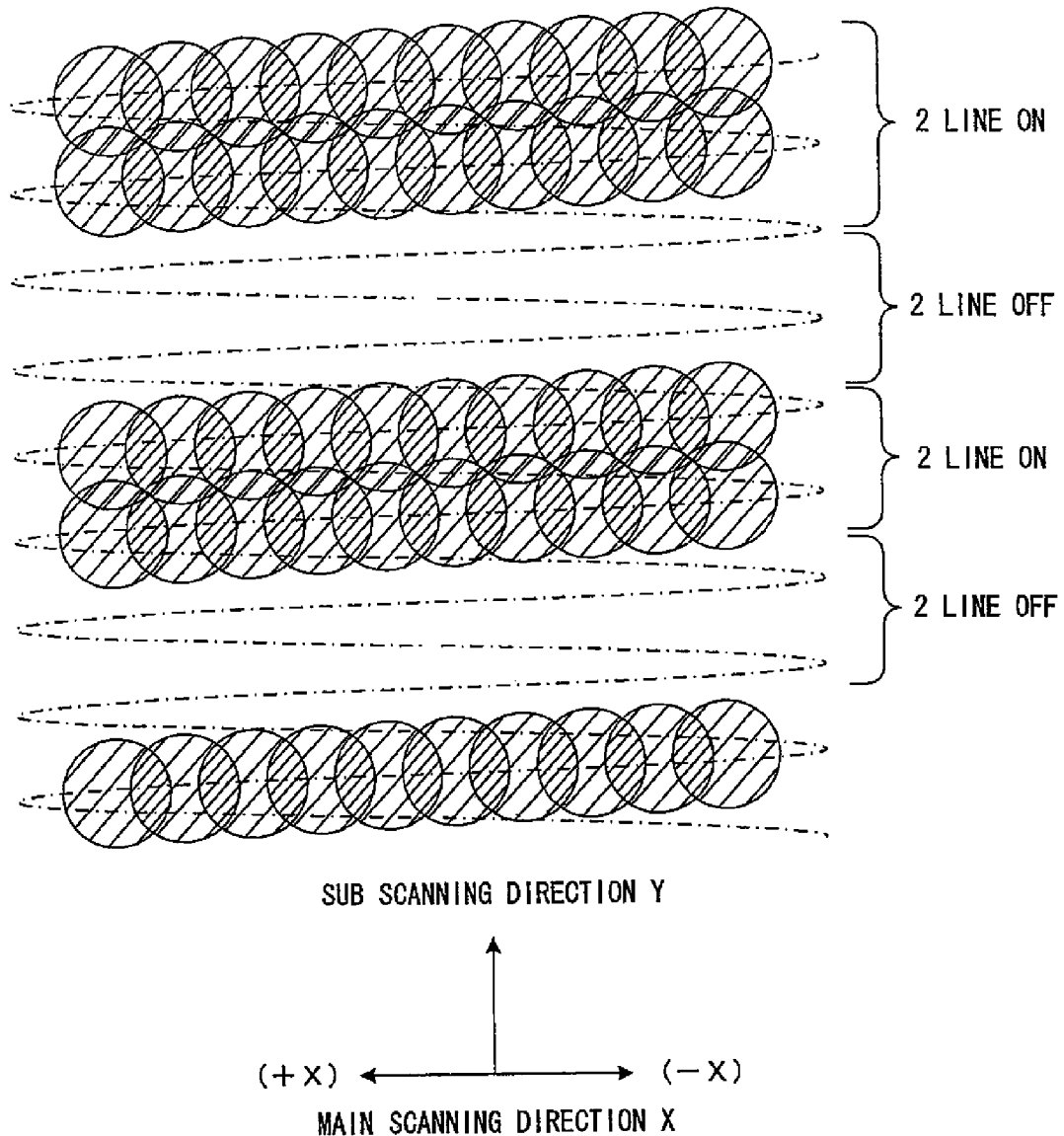
FIG. 8 is a diagram showing latent images formed by the latent-image forming operation of the embodiment.

FIG. 6 is a diagram schematically showing the latent-image forming operation. FIG. 7 is a diagram showing latent images formed by the latent-image forming operation of the conventional apparatus, whereas FIG. 8 is a diagram showing latent images formed by the latent-image forming operation of the embodiment. Dot-and-dash lines in FIGS. 6 through 8 are phantom lines indicating tracks of the reciprocal scan. Boldface arrows in FIG. 6 indicate the scanning light beam SL for latent image formation. The description is made here by way of example where a pattern of 2-line-ON and 2-line-OFF is repeatedly formed.

According to the conventional apparatus, as shown in FIGS. 6 and 7, the scanning light beam SL scans in the forward and backward scan paths, thereby forming a two-line latent image and thereafter, the laser light source 62 is turned off for two scanning lines. Thus is formed the latent image of the 2-line-ON and 2-line-OFF pattern. Intended repeat pattern (two-dimensional latent image) is formed by repeating this latent-image forming operation. A problem encountered in this process is density difference with respect to the main scanning direction. That is, since the two-dimensional latent image is formed by making the scanning light beam SL reciprocally scan in the main scanning direction X while rotating the photosensitive member 2 in the sub scanning direction Y which is approximately orthogonal to the main scanning direction X, a latent image area formed along the (+X) direction is different from that formed along the (−X) direction. This results in the difference of image densities.

In contrast, according to the embodiment, although the light beam is capable of reciprocally scanning in the main scanning direction X, the latent image is formed by irradiating the effective image region IR of the photosensitive member 2 only with the light beam SL scanning in the first direction (+X) of the main scanning direction X. Therefore, as shown in FIG. 8, the latent image area is even in the main scanning direction X, so that the image density is even. As a result, the image can be formed in high quality.

Furthermore, in this embodiment, the scanning direction of the latent-image forming light beam SL is consistent to be the first direction (+X) for all the color components, so that the toner images of the individual color components may have the constant image density.

Further, according to the embodiment, the driving motor MT is mechanically connected to an end of the photosensitive member 2 on a downstream-side in the first direction (+X) and drives the photosensitive member 2 into rotation, as shown in FIG. 4. Hence, the one end of the photosensitive member 2 is more susceptible to the mechanical vibrations than the other end thereof. In this embodiment, therefore, the horizontal synchronization sensor 60 is disposed at a place satisfying the following two conditions, namely, (1) on the opposite side from the driving motor MT in the main scanning direction X (at the other end of the photosensitive member 2), and (2) inside the second scan region SR2 and outside the first scan region SR1. Since the sensor 60 which is equivalent to a "detector" of the invention is located at a place less susceptible to the mechanical vibrations, the horizontal synchronizing signal may be obtained in a state less affected by the mechanical vibrations. As a result, the latent image may be formed favorably and the image quality is improved.

Further, according to the embodiment, the horizontal synchronization sensor 60 is disposed on the upstream side of the first direction (+X), whereas the laser light source is ON/OFF controlled based on the output signal (horizontal synchronizing signal) from the sensor 60. That is, latent-image writing is started in a region less affected by the mechanical vibrations associated with the rotational driving of the photosensitive member 2 by the driving motor MT and hence, start positions of latent-image writing are registered in the sub scanning direction. Thus, the image quality may be enhanced even further.

Second Embodiment

Figure 9:
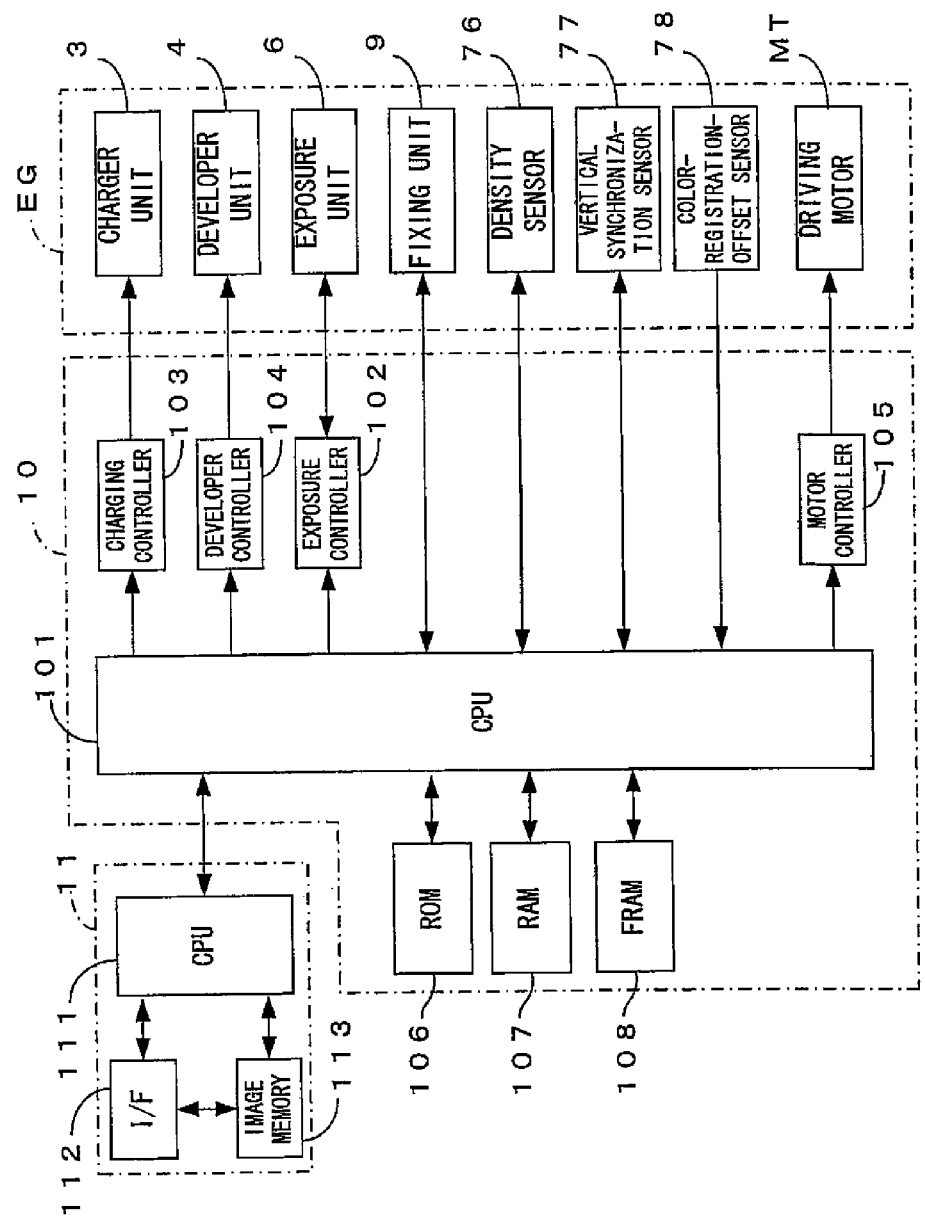
FIG. 9 is a block diagram showing an electric structure of an image forming apparatus according to a second embodiment of the invention.

FIG. 9 is a block diagram showing an electric structure of an image forming apparatus according to a second embodiment of the invention. It is noted that the apparatus of the second embodiment is structured the same way as the first embodiment and hence, the same components as those of the first embodiment are represented by the same reference characters, respectively, the description of which is dispensed with. As shown in FIG. 9, the second embodiment further includes an FRAM (ferroelectric memory) 108 for storing information related to status of use of the individual parts of the engine.

Figure 10:
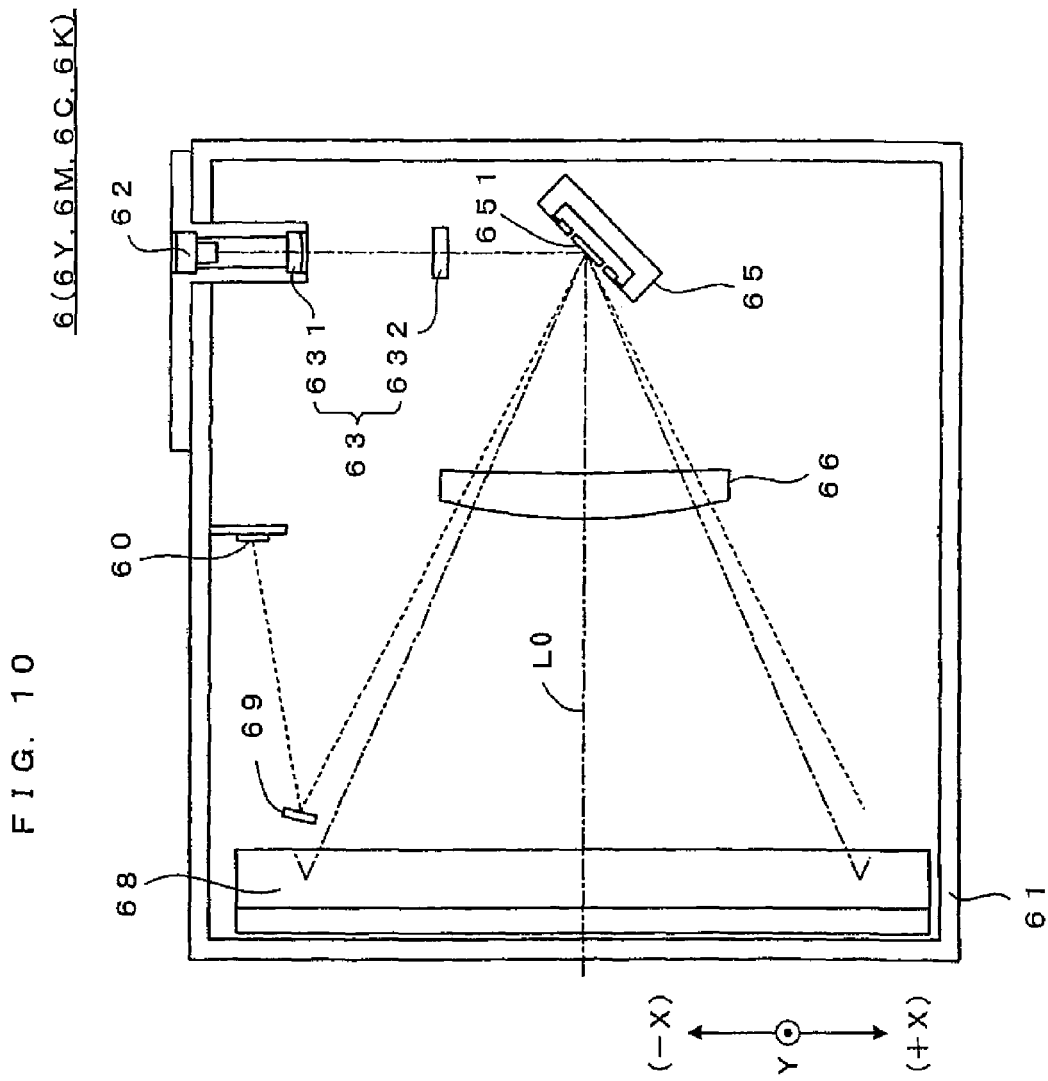
FIG. 10 is a main scanning cross sectional view showing a structure of the exposure unit which is disposed in the image forming apparatus according to a second embodiment of the invention.
Figure 11:
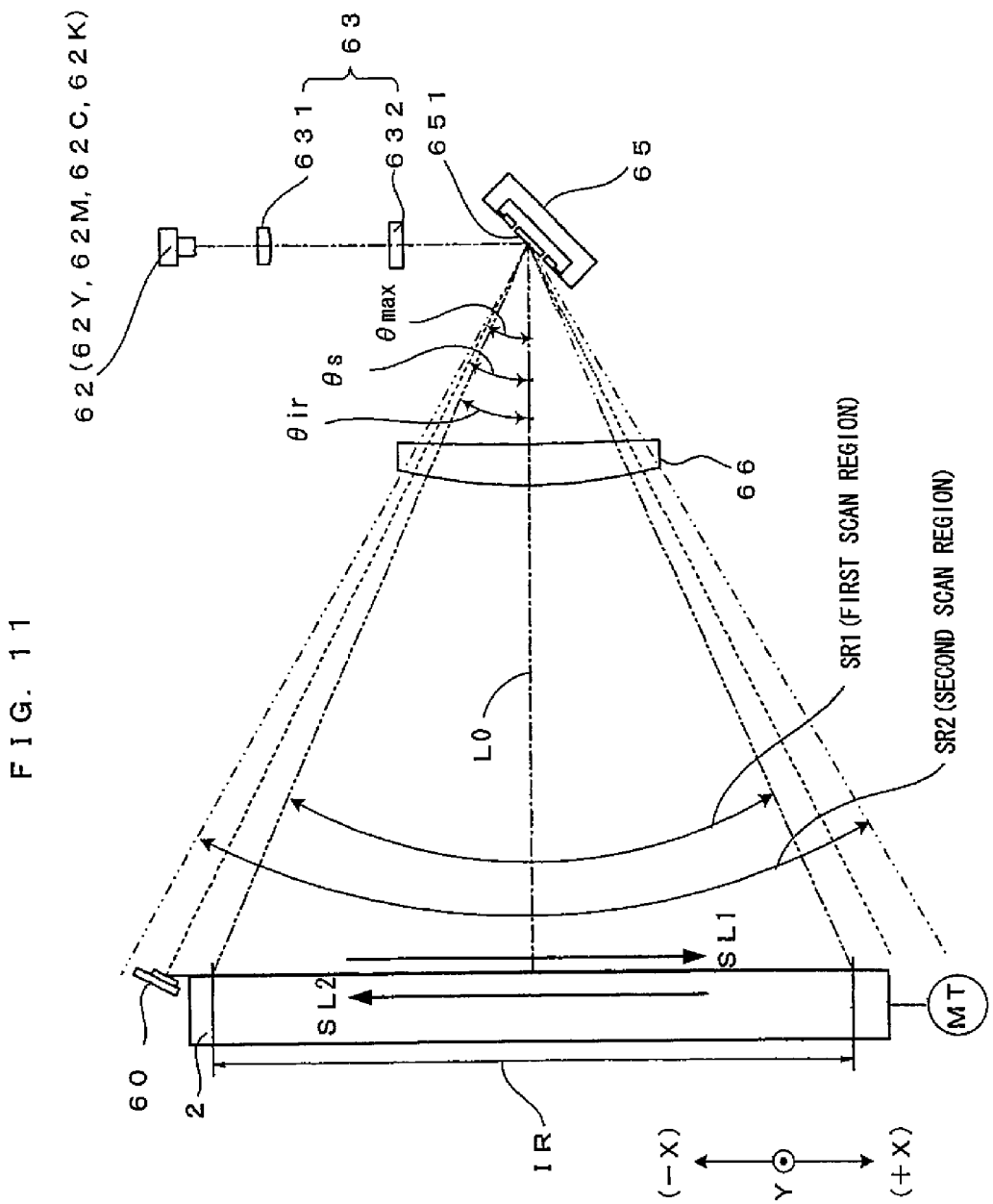
FIG. 11 is a diagram showing a scan region of the light beam in the exposure unit shown in FIG. 10.
Figure 12:
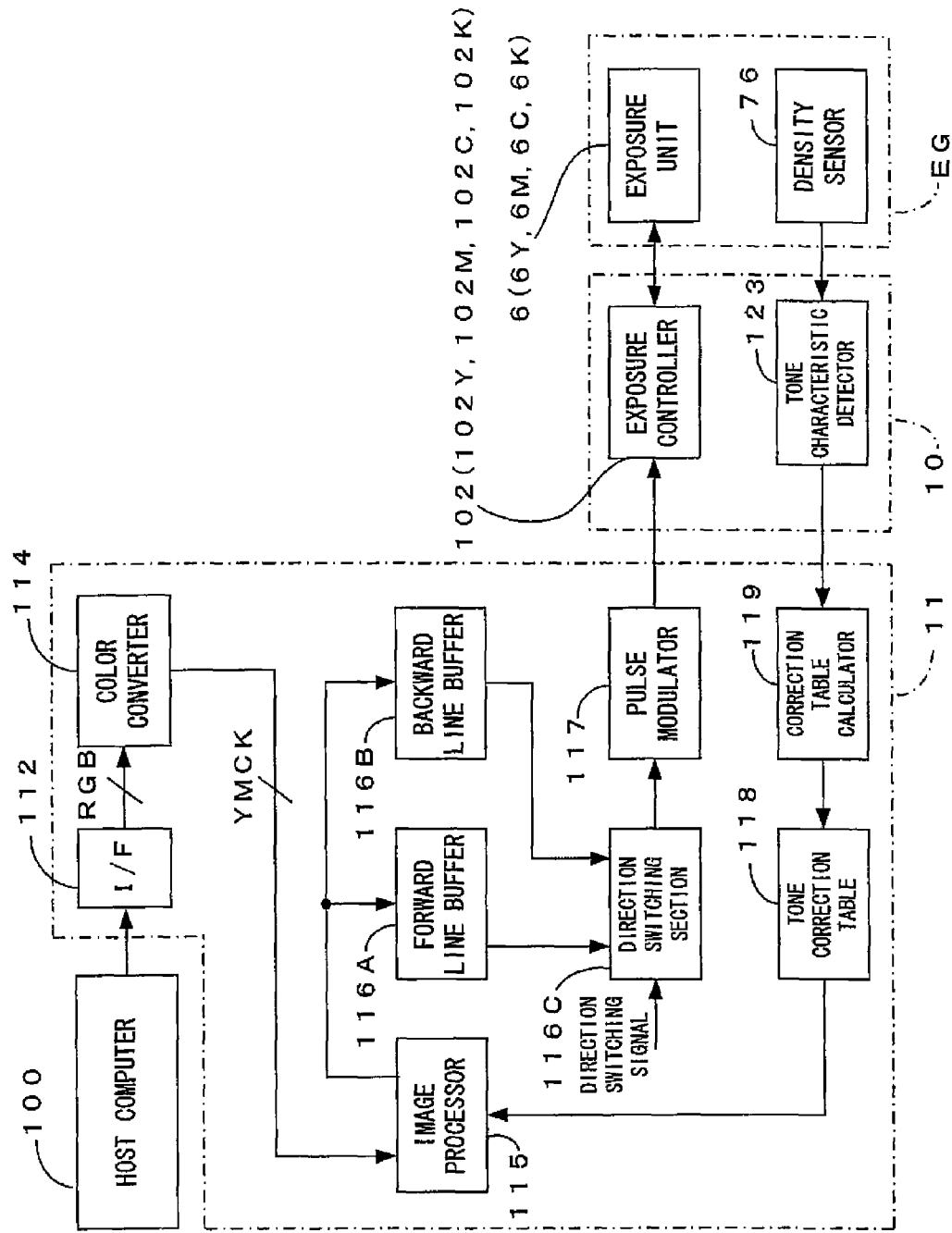
FIG. 12 is a diagram showing signal processing blocks of the image forming apparatus according to a second embodiment of the invention.

FIG. 10 is a main scanning cross sectional view showing a structure of the exposure unit which is disposed in the image forming apparatus according to a second embodiment of the invention. FIG. 11 is a diagram showing a scan region of the light beam in the exposure unit shown in FIG. 10. FIG. 12 is a diagram showing signal processing blocks of the image forming apparatus according to a second embodiment of the invention. Referring to these figures, the structures and operations of the exposure unit 6 and the exposure controller 102 will now be described in detail. It is noted that since the exposure unit 6 and the exposure controller 102 for the respective color components are structured the same ways, the structure for the yellow color is described here while the individual parts of the structures for the other color components are represented by equivalent reference characters, respectively, and the description thereof is dispensed with.

The exposure unit 6Y (6M, 6C, 6K) includes an exposure housing 61. The exposure housing 61 has a single laser light source 62Y fixed thereto so as to be capable of emitting a light beam from the laser light source 62Y. The laser light source 62Y is electrically connected to a light source driver (not shown) of the exposure controller 102Y shown in FIG. 5. The light source driver operates as follows to provide ON/OFF control of the laser light source 62Y according to an image signal, so that the laser light source 62Y emits the light beam modulated in correspondence to the image data. Referring to FIG. 5, description is made as below.

When the image signal from the external apparatus such as a host computer 100 is inputted to the image forming apparatus, the main controller 11 performs a predetermined signal processing on the image signal. The main controller 11 includes function blocks such as a color converter 114, an image processor 115, two types of line buffers 116A and 116B, a direction switching section 116C, a pulse modulator 117, a tone correction table 118, a correction table calculator 119, and the like.

In addition to the CPU 101, the ROM 106, the RAM 107, and the exposure controller 102 shown in FIG. 2, the engine controller 10 further includes a tone characteristic detector 123 which detects a tone characteristic representing a gamma characteristic of the engine part EG based on a detection result given by the density sensor 76. In the main controller 11 and the engine controller 10, these function blocks may be implemented in hardware or otherwise, in software executed by the CPUs 111 and 101.

In the main controller 11 supplied with the image signal from the host computer 100, the color converter 114 converts RGB tone data into corresponding CMYK tone data, the RGB tone data representing the respective tone levels of RGB components of each pixel in an image corresponding to the image signal, the CMYK tone data representing the respective tone levels of CMYK components corresponding to the RGB components. In the color converter 114, the inputted RGB tone data are composed of eight bits for each pixel for each color component (or representing 256 tone levels), for example, whereas the outputted CMYK tone data are composed of eight bits for each pixel for each color component (or representing 256 tone levels). The CMYK tone data outputted from the color converter 114 are inputted to the image processor 115.

The image processor 115 performs the following processes for each of the color components. That is, the image processor performs tone correction and a half-toning process on the tone data of each pixel inputted from the color converter 114. Specifically, the image processor 115 looks up the tone correction table 118 stored in a non-volatile memory in advance, and converts the tone data of each pixel inputted from the color converter 114 into corrected tone data representing corrected tone levels according to the tone correction table 118. An object of the tone correction is to compensate for the change of the gamma characteristic of the engine part EG constructed as described above, thereby to maintain the overall gamma characteristic of the image forming apparatus in an idealistic state at all times. That is, in the image forming apparatuses of this type, the gamma characteristic varies from one apparatus to another, and even in the same apparatus, the gamma characteristic varies according to a status of use. In order to eliminate influences of the varied gamma characteristic upon the image quality, a tone control process is performed at predetermined timings for updating the contents of the aforementioned tone correction table 118 based on a result of actual measurement of image densities.

The tone control process is performed as follows. Tone patch images, which are prepared in advance for measurement of the gamma characteristic for tone correction, are formed on the intermediate transfer belt 71 by the engine part EG for each toner color. The respective image densities of the tone patch images are detected by the density sensor 76. Based on signals from the density sensor 76, the tone characteristic detector 123 generates a tone characteristic (the gamma characteristic of the engine part EG) wherein the respective tone levels of the tone patch images are in correspondence to the respective image densities thus detected, and outputs the resultant tone characteristic to the correction table calculator 119 of the main controller 11. The correction table calculator 119 calculates tone correction table data to obtain the idealistic tone characteristic by compensating for the measured tone characteristic of the engine part EG based on the tone characteristic supplied from the tone characteristic detector 123, and then updates the contents of the tone correction table 118 to the calculated results. In this manner, the tone correction table 118 is redefined. By making such updates, the image forming apparatus is capable of forming images of a consistent quality irrespective of the variations or change with time of the gamma characteristic of the apparatus.

The image processor 115 performs the half-toning process, such as an error diffusion method, a dither method, a screen method, and the like to the corrected tone data thus corrected, and inputs the half-toning-processed CMYK tone data composed of eight bits for each pixel for each color component into the two types of line buffers 116A and 116B. It is to be noted that the contents of the half-toning process vary depending upon the types of images to be formed. That is, the most suited contents of the process to the image to be formed are selected and executed based on a criterion as to whether the image is a monochromatic image or a color image, or whether the image is a line image or a graphic image, or the like.

These line buffers 116A and 116B have a common function that the buffers store the half-toning-processed tone data (image information) which constitutes one line image data outputted from the image processor 115, but these buffers read out the tone data in different orders. Specifically, the forward line buffer 116A outputs the half-toning-processed tone data which constitutes the one line image data forwardly from a head of data, whereas the backward line buffer 116B outputs the data backwardly from an end of data.

The half-toning-processed tone data thus outputted are inputted to the direction switching section 116C, so that only the half-toning-processed tone data outputted from either one of the line buffers based on a direction switching signal are outputted from the direction switching section 116C to the pulse modulator 117 at a proper timing. A main reason for providing the two types of line buffers 116A and 116B is to deal with an operation wherein the scanning direction of the latent-image forming light beam is changed for each of the color components, as will be described hereinlater. The direction switching section 116C inputs the tone data to the pulse modulator 117 at a timing and in an order corresponding to each of the color components. Thus, in the embodiment the line buffers 116A and 116B, and the direction switching section 116C constitute a "direction controller" and a "data control device" of the invention.

The half-toning-processed tone data inputted to the pulse modulator 117 are represented by multivalued signals which indicate respective sizes and an arrangement of toner dots of each color to adhere to each pixel. Receiving such data, the pulse modulator 117, using the half-toning-processed tone data, generates a video signal for pulse width modulation of an exposure laser pulse for an image of each color in the engine part EG, and outputs the video signal to the engine controller 10 via an unillustrated video interface. A light-source driver (not shown) of the exposure controller 102Y, receiving the video signal, controls ON/OFF of the laser light source 62Y of the exposure unit 6. The same operations are performed on the other color components.

Returning to FIGS. 10 and 11, further description is made as follows. To make the light beam from the laser light source 62Y scan and expose the surface (not shown) of the photosensitive member 2Y, a collimator lens 631, a cylindrical lens 632, a deflector 65 and a scanning lens 66 are disposed inside the exposure housing 61. In other words, after shaped into collimated light beam of a proper size by the collimator lens 631, the light beam from the laser light source 62Y impinges upon the cylindrical lens 632 which is powered only in a sub scanning direction Y. By adjusting the cylindrical lens 632, the collimated light beam is focused in the vicinity of a deflection mirror surface 651 of the deflector 65 in the sub scanning direction Y. Thus, according to this embodiment, the collimator lens 631 and the cylindrical lens 632 function as a beam shaping system 63 which shapes the light beam from the laser light source 62Y.

The deflector 65 is made using a micro machining technique which is an application of semiconductor manufacturing techniques and which aims at forming an integrated micro machine on a semiconductor substrate, and is structured with an oscillation mirror which oscillates in resonance. Specifically, the deflector 65 is capable of deflecting the light beam in a main scanning direction X by means of the deflection mirror surface 651 which oscillates in resonance. More specifically, the deflection mirror surface 651 is supported to be able to freely pivot about a pivot axis (torsion spring) which is approximately orthogonal to the main scanning direction X and sinusoidally oscillates about the pivot axis according to an external force applied from an actuator (not shown). The actuator applies an electrostatic, electromagnetic or mechanical external force to the deflection mirror surface 651 based on a mirror driving signal from a mirror driver (not shown) of the exposure controller 102, thereby oscillating the deflection mirror surface 651 at a frequency of the mirror driving signal. The actuator may adopt any of the driving methods based on electrostatic adsorption, electromagnetic force, mechanical force, and the like. These driving methods are well known in the art and hence, the description thereof is dispensed with.

The light beam deflected by the deflection mirror surface 651 of the deflector 65 is deflected toward the scanning lens 66 at a maximum amplitude angle $\theta$max, as shown in FIG. 11. In this embodiment, the scanning lens 66 is designed to have an approximately constant F value with respect to the overall effective image region IR on the photosensitive member 2. Therefore, the light beam deflected toward the scanning lens 66 is focused in the effective image region IR on the surface of the photosensitive member 2 in a spot of an approximately constant diameter by the scanning lens 66. Thus, the light beam scans in parallel to the main scanning direction X so as to form a linear latent image in the effective image region IR on the photosensitive member 2, the linear latent image extending in the main scanning direction X. In addition, in this embodiment, a scan region ("second scan region" of the invention) SR2, which can be scanned by the deflector 65, is broader than a scan region ("first scan region" of the invention) SR1 where the light beam scans in the effective image region IR, as shown in FIG. 11. Further, the first scan region SR1 is positioned approximate center of the second scan region SR2, so as to be approximately symmetrical with respect to an optical axis. Furthermore, a reference symbol $\theta$ir in FIG. 11 represents the amplitude angle of the deflection mirror surface 651, which corresponds to an end of the effective image region IR, and a reference symbol $\theta$s represents the amplitude angle of the deflection mirror surface 651, which corresponds to a horizontal synchronization sensor to be described below.

Further, in the apparatus structured as described above, the light bean is capable of reciprocally scanning in the main scanning direction, that is, the light beam is capable of scanning in both (+X) direction and (−X) direction. As described above, the tone data constituting the one line image data are temporarily stored in a storage unit (line buffers 116A and 116B), whereas the direction switching section 116C provides the tone data to the pulse modulator 117 at a proper timing and in a proper order. In a case where the scanning direction is switched to the (+X) direction, for example, tone data DT1, DT2, . . . , DTn are read out from the line buffer 116A in the order named, as shown in FIG. 13A, and beam spots are irradiated on the photosensitive member 2 in the first direction (+X) based on the respective tone data, thereby forming a linear latent image LI(+X) thereon. In a case where the scanning direction is switched to the (−X) direction, on the other hand, tone data DTn, DT(n−1), . . . , DT1 are read out from the line buffer 116B in the order named, as shown in FIG. 13B, and beam spots are irradiated on the photosensitive member 2 in the second direction (−X) based on the respective tone data, thereby forming a linear latent image LI(−X). Therefore, it is possible for the light beam for latent-image formation (equivalent to the "latent-image forming light beam" of the invention) to change for each color component or each line, as described below. More specifically, in this embodiment, skew information on each color component are stored in advance as "information related to latent-image forming position on latent image carrier" of the invention in the FRAM 108, the skew information indicating the occurrence of skew resulting from the deviation of a relative positional relation between the photosensitive member and the exposure unit from a reference positional relation. As to magenta and black, a light beam SL1, scanning in the (+X) direction and in the first scan region SR1, is guided to the effective image region IR based on such skew information, so as to form the latent image in the effective image region IR (see FIGS. 11 and 15). As to yellow and cyan, on the other hand, a light beam SL2, scanning in the (−X) direction and in the first scan region SR1, is guided to the effective image region IR based on the skew information so as to form the latent image in the effective image region IR (see FIGS. 11 and 16). A detailed description in this regard will be made hereinlater.

Further, in this embodiment, the scanning direction and the location of the driving motor MT are previously defined to satisfy the following relation. That is, the driving motor MT is disposed on a downstream side of the scanning direction (+X). As shown in FIG. 10, a return mirror 69 is disposed on an upstream side in the scanning direction (+X) which guides the scanning light beam at the end of the scanning path toward the horizontal synchronization sensor 60. The return mirror 69 is disposed at the end of the second scan region SR2 on an upstream side in the scanning direction (+X). The return mirror 69 guides the scanning light beam which moves inside the second scan region SR2 and outside the first scan region SR1 on the upstream side in the scanning direction (+X) toward the horizontal synchronization sensor 60. At a time when the scanning light beam is received by the horizontal synchronization sensor 60 and passes at a sensor position (amplitude angle θs), the horizontal synchronization sensor 60 outputs a signal. In this embodiment, the horizontal synchronization sensor 60 functions as a horizontal synchronization reading sensor for obtaining a synchronizing signal when the light beam scans the effective image region IR in the main scanning direction X, or a horizontal synchronizing signal Hsync. A latent image forming operation is controlled based on the horizontal synchronizing signal Hsync. The latent image forming operation of the apparatus according to the embodiment will now be described.

Figure 14:
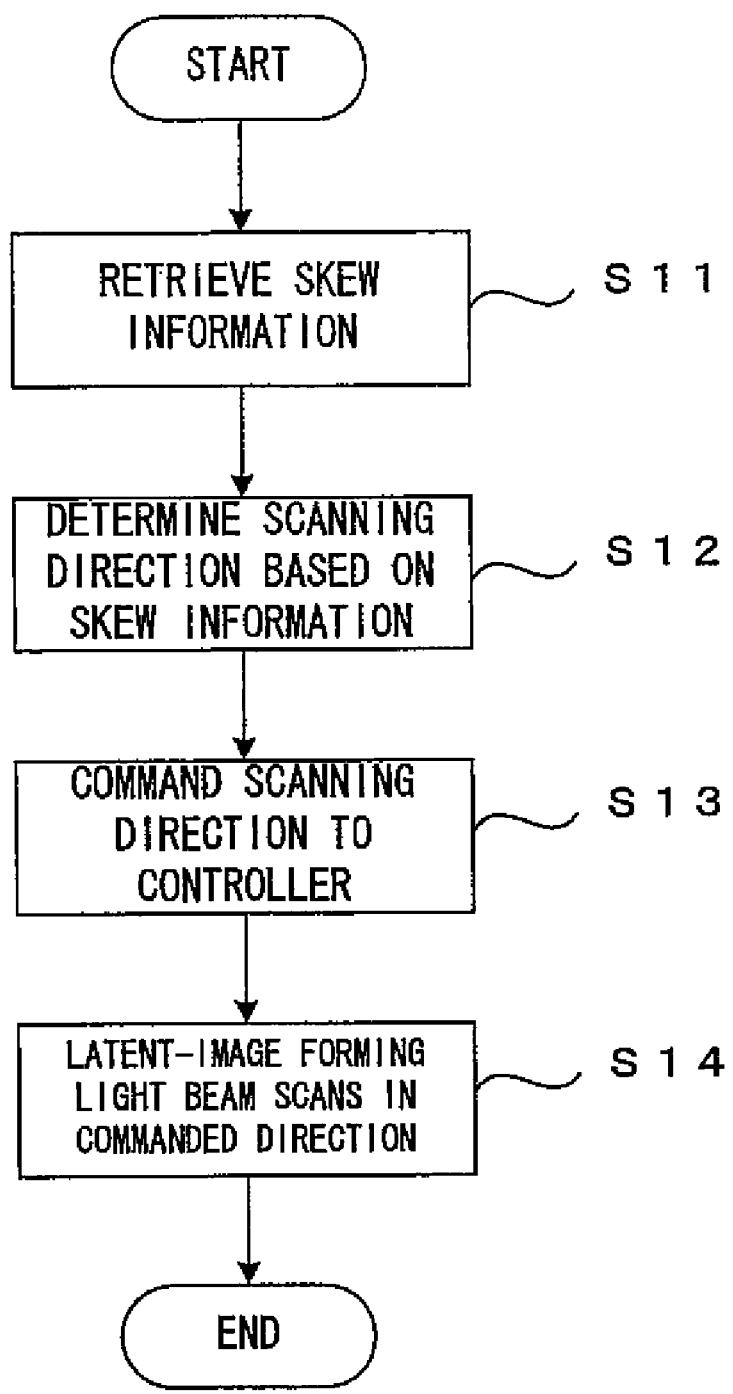
FIG. 14 is a flow chart showing operations of the image forming apparatus of the second embodiment.
Figure 15:
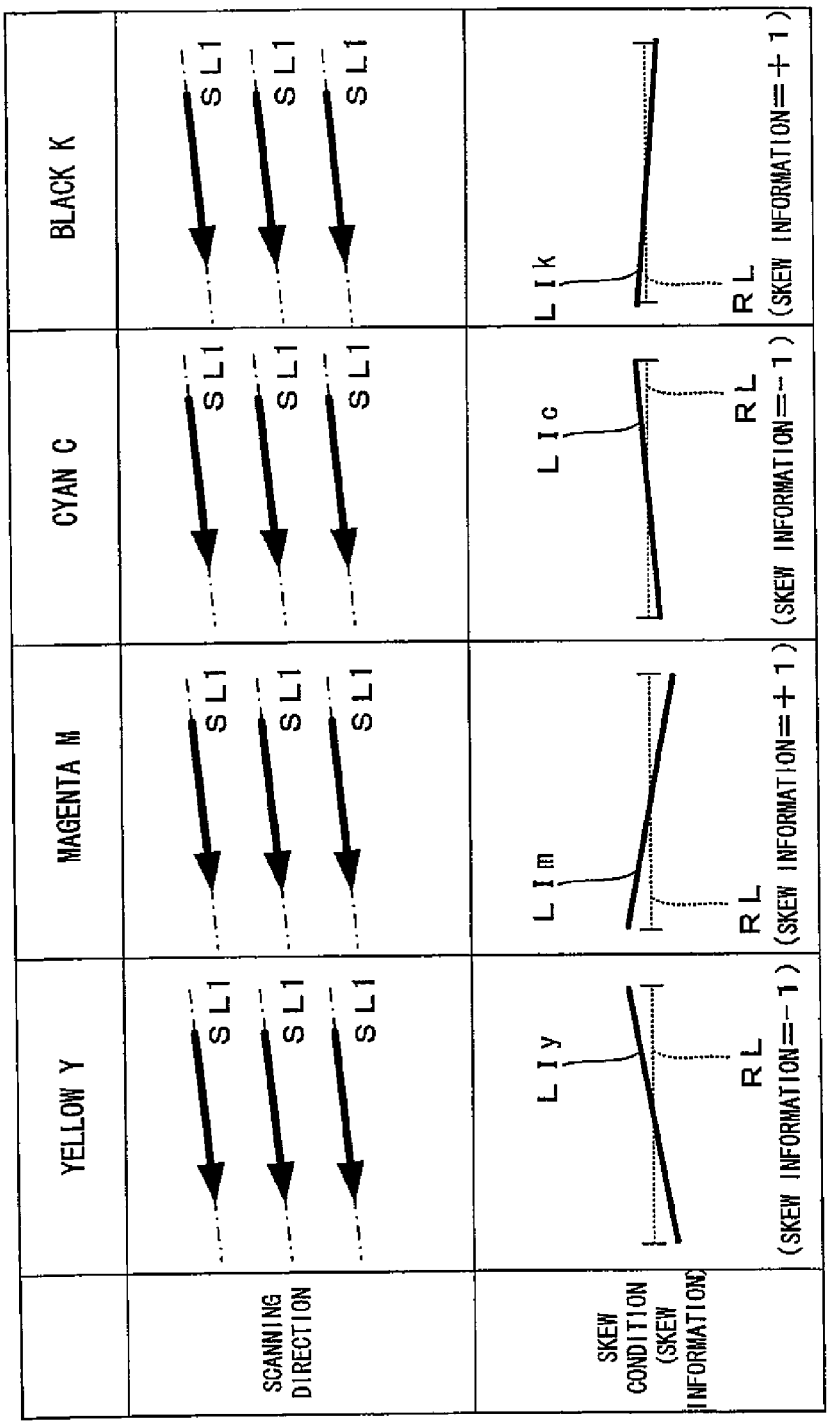
FIG. 15 is a schematic diagram explanatory of the skew information stored in the FRAM.
Figure 16:
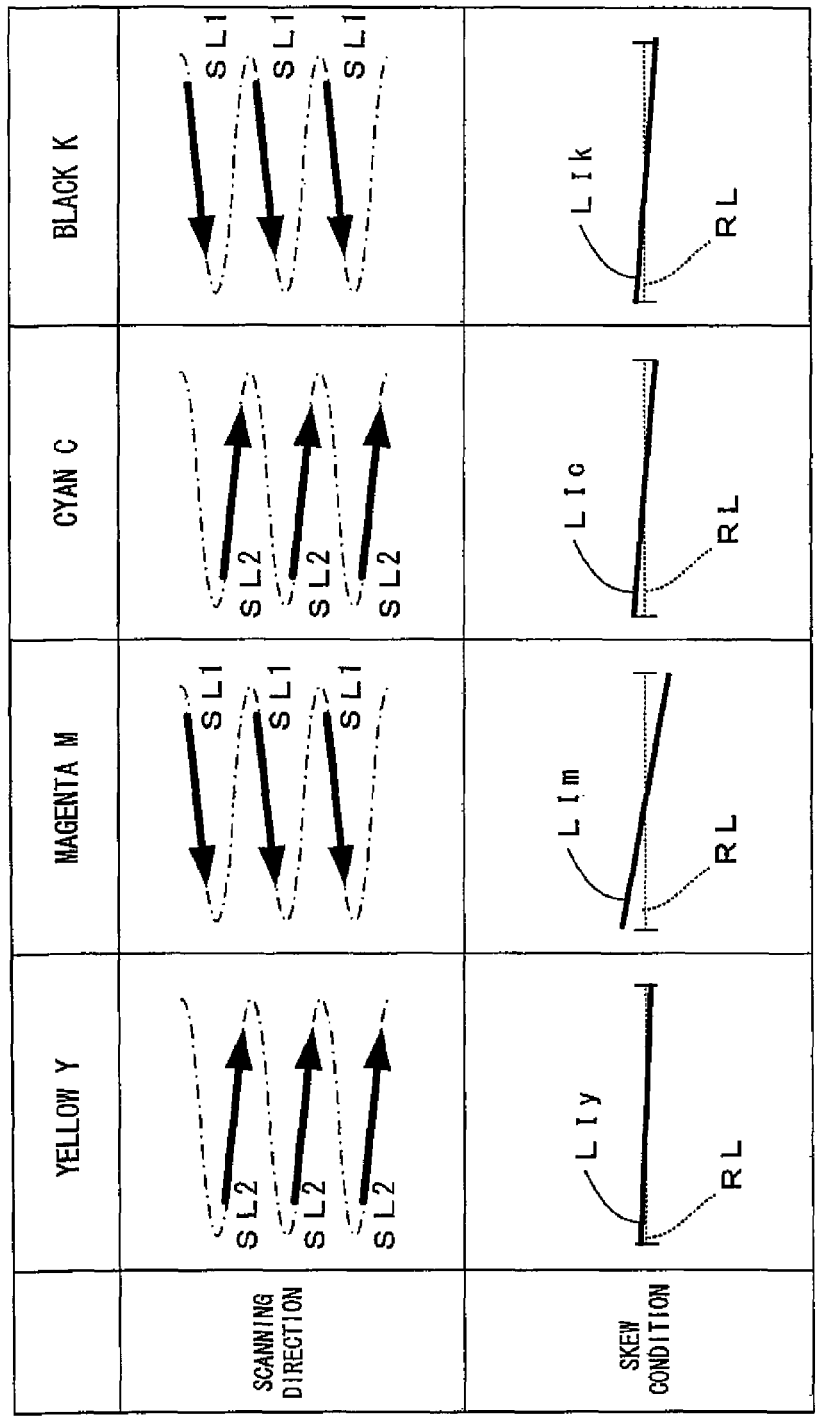
FIG. 16 is a diagram showing latent images formed by the latent-image forming operation of the embodiment.

FIG. 14 is a flow chart showing operations of the image forming apparatus of the second embodiment. FIG. 15 is a schematic diagram explanatory of the skew information stored in the FRAM. FIG. 16 is a diagram showing latent images formed by the latent-image forming operation of the embodiment. In FIGS. 15 and 16, dot-and-dash lines are phantom lines indicating tracks of the scanning line, and boldface arrows indicate the scanning light beam SL for latent image formation. In this example, the relative positional relation between the photosensitive member and the exposure unit varies from one color component to another, and the respective skew conditions of the exposure units for the individual color components differ from one another, as shown in FIG. 15. In a case where the latent-image forming light beam SL1 scanning in the (+X) direction is used to form the latent images for all the color components, yellow and cyan linear latent images LIy and LIc are skewed counter-clockwise relative to a reference line RL indicative of the reference positional relation with respect to the drawing surface of FIG. 15, whereas magenta and black linear latent images LIm and LIk are skewed clockwise relative to the reference line RL.

Hence, skew information items on the yellow and cyan colors are set to (−1), whereas skew information items on the magenta and black colors are set to (+1), and the information items thus set are stored in the FRAM 108 in advance. Such skew information items may be previously stored in the FRAM 108 after product verification preceding factory shipment. The contents of the skew information are not limited to those of the embodiment, but any information indicative of the skew condition may be used as the skew information.

When the image signal is inputted from the external apparatus such as the host computer 100, the latent images are formed on the respective photosensitive members according to the flow chart shown in FIG. 14 and then, the color image is formed based on the resultant latent images. Specifically, the skew information items are retrieved from the FRAM 108 in Step S11 (information acquisition step). The scanning direction of the latent-image forming light beam is determined in correspondence to each of the skew information items (Step S12). In this embodiment, the scanning direction is set to the first direction (+X) when the skew information item indicates "+1", whereas the scanning direction is set to the second direction (−X) when the skew information item indicates "−1" (direction determination step).

Subsequently, a direction switching signal corresponding to the scanning direction thus determined is provided to the direction switching section 116C of the main controller 11 (Step S13). Thus, the scanning direction of the latent-image forming light beam is commanded for each of the color components and for each of one line image data. Receiving these commands, the direction switching section 116C provides the tone data to the pulse modulator 117 from the line buffer corresponding to the skew information at a proper timing and in a proper order, so that the latent-image forming light beam scans on the photosensitive member (Step S14). As described above, in this embodiment, the skew information items on magenta and black are set to be (+1) and hence, the light beam SL1 scanning in the (+X) direction is used to form the linear latent images LIm and LIk. Conversely, the skew information items on yellow and cyan are set to be (−1) and hence, the light beam SL2 scanning in the (−X) direction is used to form the linear latent images LIy and LIc. Thus, the respective linear latent images LIy, LIm, LIc, and LIk are registered to the reference line RL common to the respective image forming devices or skewed in the same direction relative to the reference line RL, as shown in FIG. 16, whereby color registration offset may be corrected. Incidentally, the resultant latent images are developed by the respective image forming devices so as to form the toner images of the four colors, which are mutually superimposed on the intermediate transfer belt 71 to form the color image.

As described above, according to the embodiment, the scanning direction of the light beam used to form the latent image (latent-image forming light beam) is selectively switched based on the skew information, whereby the forming position of the linear latent image on the photosensitive member may be adjusted with high precision of one pixel or less. As a result, the color images of high quality can be formed. Furthermore, the tone data constituting the one line image data are temporarily stored in the storage unit (line buffers 116A and 116B), and the direction switching section 116C reads out the tone data at a timing and in an order corresponding to the skew information, thereby changing the scanning direction of the latent-image forming light beam. Hence, the forming position of the linear latent image can be changed easily and quickly.

Further, according to the embodiment, the driving motor MT is mechanically connected to an end of the photosensitive member 2 on a downstream-side in the first direction (+X) and drives the photosensitive member 2 into rotation, as shown in FIG. 11. Hence, the one end of the photosensitive member 2 is more susceptible to the mechanical vibrations than the other end thereof. In this embodiment, therefore, the horizontal synchronization sensor 60 is disposed at a place satisfying the following two conditions, namely, (1) on the opposite side from the driving motor MT in the main scanning direction X (at the other end of the photosensitive member 2), and (2) inside the second scan region SR2 and outside the first scan region SR1. Since the sensor 60 which is equivalent to a "synchronization detector" of the invention is located at a place less susceptible to the mechanical vibrations, the horizontal synchronizing signal may be obtained in a state less affected by the mechanical vibrations. As a result, the latent image may be formed favorably and the image quality is improved.

Third Embodiment

In the second embodiment described above, the scanning direction of the latent-image forming light beam is selectively switched based on the skew information which is set in advance. However, an adjustment toner image (registration mark) for adjusting the latent-image forming position may be formed, and may obtain an amount of offset of the linear latent image relative to a predetermined reference line (amount of color registration offset) by detecting the adjustment toner image by means of the color-registration-offset sensor 78, as the "information related to latent-image forming position on latent image carrier" of the invention. Thus, in a third embodiment, the color-registration-offset sensor 78 functions as an "information detector" of the invention. Since the apparatus is essentially structured the same way as that of the second embodiment, the description of this embodiment will focus on a switching method. In this regard, the same applies to fourth and fifth embodiments hereof which will be described hereinlater.

Figure 17:
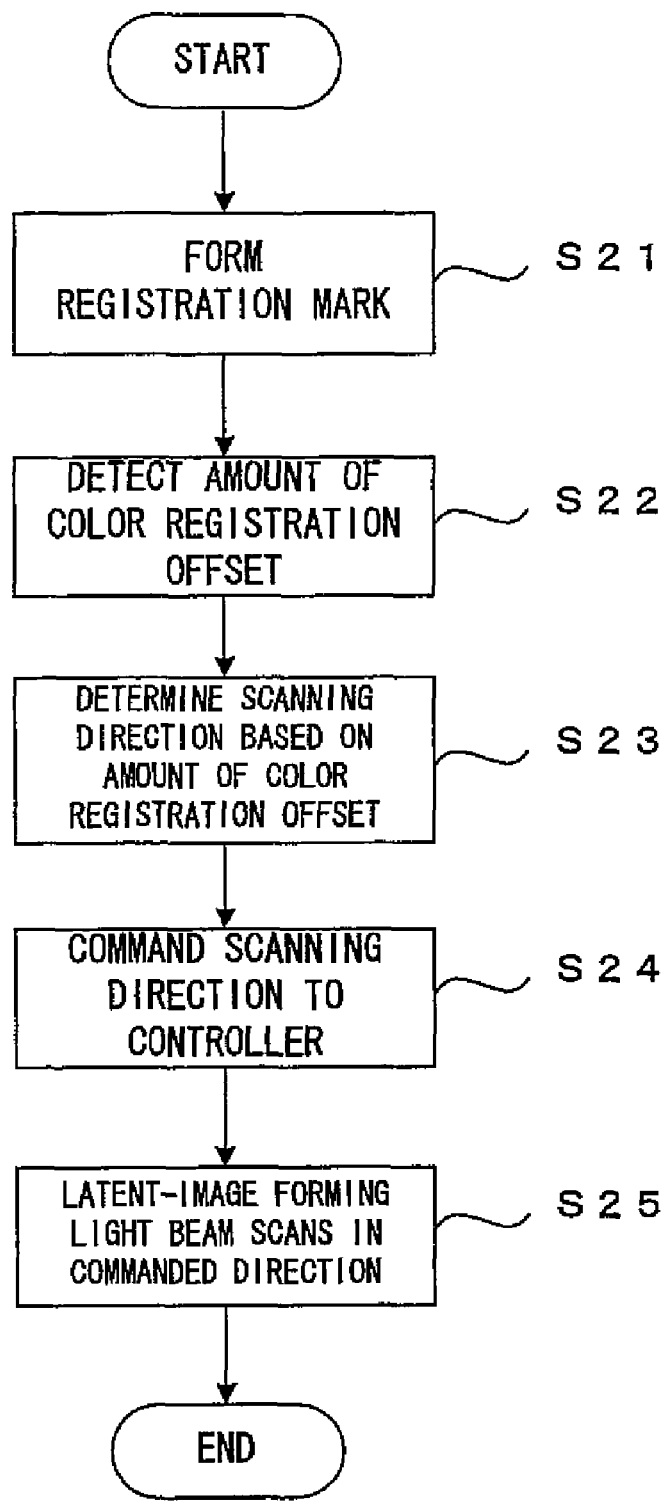
FIG. 17 is a flow chart showing operations of the third embodiment.

FIG. 17 is a flow chart showing operations of the third embodiment. In the third embodiment, first in Step S21, a predetermined registration mark is formed by each of the image forming devices and these registration marks are transferred to the intermediate transfer belt 71. The respective registration marks are detected by means of the color-registration-offset sensor 78 (Step S22). Thus is obtained an amount of offset of the linear latent image relative to the reference line (information acquisition step). It is noted here that as the reference line, a line which is predetermined hypothetically in designing the apparatus may be used, or a scanning line for a specific color may be used, the specific color being one of the four colors which is selected in advance. In either case, the relative amount of color registration offset of the linear latent image of each color component may be obtained accurately. Since the contents of the technique of determining the amount of color registration offset by using the registration mark is already well known, the detailed description thereof is dispensed with.

When the amount of color registration offset is thus determined for each color component, the scanning direction of the latent-image forming light beam is determined based on each of the amounts of color registration offset (Step S23). In a case where the conditions of color registration offset are those shown in the bottom row of FIG. 15, for example, the scanning direction for the magenta and black colors is set to the first direction (+X), whereas the scanning direction for the yellow and cyan colors is set to the second direction (−X) (direction determination step).

When the image signal is inputted from the external apparatus such as the host computer 100, a direction switching signal corresponding to the scanning direction thus determined is provided to the direction switching section 116C of the main controller 11 (Step S24). Thus, the scanning direction of the latent-image forming light beam is commanded for each of the color components and for each of one line image data. Receiving these commands, the direction switching section 116C provides the tone data to the pulse modulator 117 from the line buffer corresponding to the conditions of color registration offset at a proper timing and in a proper order, so that the latent-image forming light beam scans on the photosensitive member (Step S25). Thus, the respective linear latent images LIy, LIm, LIc, and LIk are registered to the reference line RL common to the respective image forming devices or skewed in the same direction relative to the reference line RL, as shown in FIG. 16 for example, whereby the color registration offset is corrected. Incidentally, the resultant latent images are developed by the respective image forming devices so as to form the toner images of the four colors, which are mutually superimposed on the intermediate transfer belt 71 to form the color image.

As described above, also in the third embodiment, similarly to the second embodiment, the scanning direction of the latent-image forming light beam is selectively switched based on the amount of color registration offset, thereby adjusting the forming position of the linear latent image on the photosensitive member with high precision of one pixel or less. As a result, it is possible to form the color images of high quality. Further, the scanning direction may be always optimized because the scanning direction is switched after the amount of color registration offset is obtained by forming and detecting the registration mark. Therefore, even in a case where the conditions of color registration offset are varied with time, the apparatus can form the color images of high quality in a stable manner.

Fourth Embodiment

Figure 18:
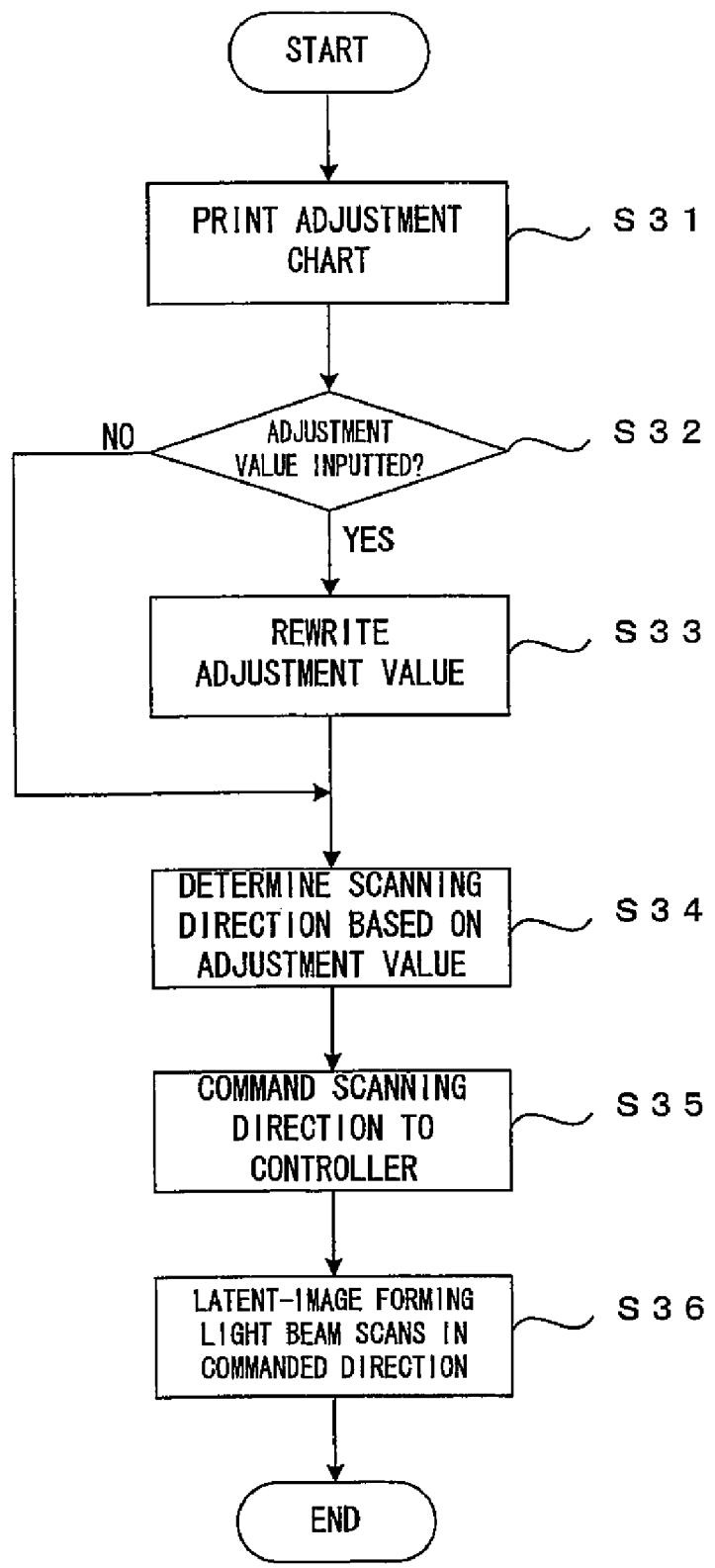
FIG. 18 is a flow chart showing operations of the fourth embodiment.

As an alternative to the method of detecting the amount of color registration offset by using the registration mark, an adjustment chart which is described in Japanese Unexamined Patent Publication No. H9-304992 of 1997 for example, may also be used. Referring to FIG. 18, a fourth embodiment of the invention will be described in detail as below.

FIG. 18 is a flow chart showing operations of the fourth embodiment. In the fourth embodiment, the adjustment chart is first printed in Step S31. In this step, three patterns suited to the detection of the amount of color registration offset are printed on the adjustment chart. A service engineer or a user visually inspects the resultant adjustment chart to determine the amount of color registration offset. If it is determined that the correction of the color registration offset is necessary, an adjustment value for the correction of the color registration offset is inputted via an input device of the host computer connected to the image forming apparatus. Thus, according to the embodiment, the adjustment value, as the "information related to latent-image forming position on latent image carrier" of the invention, is inputted via the interface (I/F) 112. Accordingly, the I/F 112 is equivalent to an "input device" of the invention. As a matter of course, it is also possible to input the adjustment value via an input panel (not shown) provided in the apparatus.

When the adjustment value is inputted in this manner (Step S32: information acquisition step), the adjustment value already stored in the FRAM 108 is updated by rewriting with the inputted value (Step S33). In a case where the adjustment value is not inputted, on the other hand, the operation flow proceeds to Step S34. In Step S34, the scanning direction of the latent-image forming light beam is determined based on the adjustment value (direction determination step). If the conditions of color registration offset are those shown in the bottom row of FIG. 15, for example, the service engineer or the like may set the adjustment value for the magenta and black to (+1) and the adjustment value for the yellow and cyan to (−1). In this case, the scanning direction for the magenta and black is set to the first direction (+X) whereas the scanning direction for the yellow and cyan is set to the second direction (−X). It is noted that the contents of the adjustment value are not limited to these and any information indicative of the adjustment value may be used.

When the image signal is inputted from the external apparatus such as the host computer 100, the direction switching signal corresponding to the scanning direction thus determined is provided to the direction switching section 116C of the main controller 11 (Step S35). Thus, the scanning direction of the latent-image forming light beam is commanded for each of the color components and for each of one line image data. Receiving these commands, the direction switching section 116C provides the tone data to the pulse modulator 117 from the line buffer corresponding to the adjustment value at a proper timing and in a proper order, so that the latent-image forming light beam scans on the photosensitive member (Step S36). Thus, the respective linear latent images LIy, LIm, LIc, and LIk are registered to the reference line RL common to the respective image forming devices or skewed in the same direction relative to the reference line RL, as shown in FIG. 16, whereby the color registration offset is corrected.

The resultant latent images are developed by the respective image forming devices to form the toner images of the four colors, which are mutually superimposed on the intermediate transfer belt 71 to form the color image.

As described above, in the fourth embodiment, similarly to the foregoing second and third embodiments, the scanning direction of the latent-image forming light beam is selectively switched based on the adjustment value, thereby adjusting the forming position of the linear latent image on the photosensitive member with high precision of one pixel or less. As a result, it is possible to form the color images of high quality. Further, since the scanning direction is determined and switched based on the adjustment value inputted based on the adjustment chart reflecting the conditions of color registration offset, the scanning direction may be optimized each time the adjustment chart is produced. Therefore, even in a case where the conditions of color registration offset are varied with time, the apparatus can form the color images of high quality in a stable manner.

Fifth Embodiment

Figure 19:
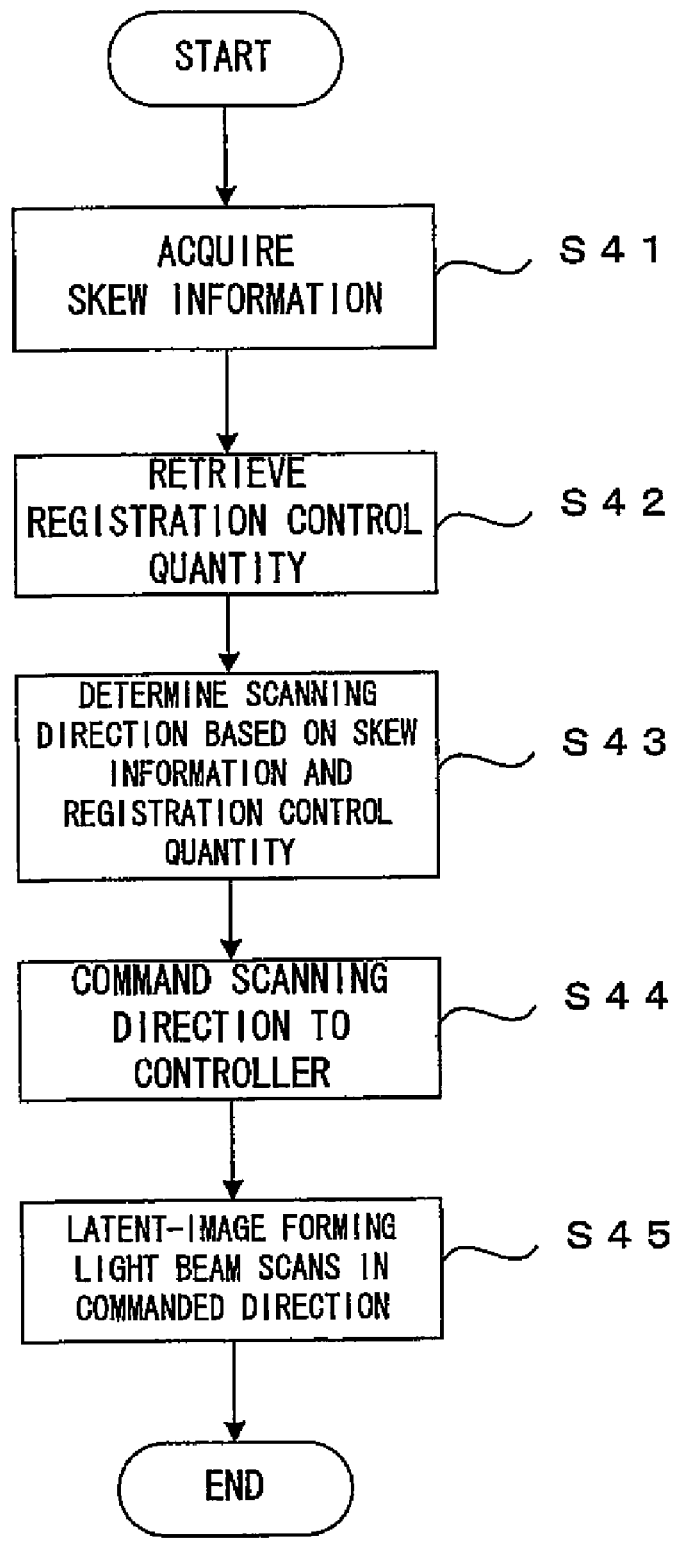
FIG. 19 is a flow chart showing operations of the fifth embodiment.

Incidentally, in the second and third embodiments, the image quality is improved by adjusting the scanning direction of the latent-image forming light beam based on the skew information. However, in the image forming apparatus which forms the color image by mutually superimposing the toner images of plural colors, registration offset also exerts a significant influence on the image quality. For instance, if the photosensitive member or the intermediate transfer belt is varied in speed, there occurs the registration offset between the toner image being transferred and the toner image already transferred onto the intermediate transfer belt. Even when the photosensitive member or the like is not varied in speed, in a case where a rotational period of the photosensitive member which rotates in the sub scanning direction is not an integral multiple of a scan period of the light beam which scans in the main scanning direction, the apparatus has a drawback that the toner images of the individual colors suffer a registration offset of one scan stroke in maximum in the sub scanning direction. Therefore, it is also very important in forming images in high quality to correct the registration offset by performing adjustment of the respective forming positions of the latent images for the individual colors in high accuracy. What is more, the image forming apparatus of the tandem system may encounter the skew and the registration offset in complex. Hence, it is desirable to prevent the color registration offset by judging these factors comprehensively. Referring to FIG. 19, a fifth embodiment will be described in detail as below.

FIG. 19 is a flow chart showing operations of the fifth embodiment. In the fifth embodiment, the skew information is first acquired in Step S41. That is, the skew information may be retrieved from the FRAM 108 just as in the second embodiment or the skew information may be obtained by forming and detecting the registration mark just as in the third embodiment.

Further, as already known in the color image forming apparatus, correction information necessary for correcting the registration offset is stored in the memory such as the ROM 106 or FRAM 108 in advance as registration control quantity. In this embodiment, therefore, the registration control quantity is retrieved from the memory, the skew information and the registration control quantity both being as the "information related to latent-image forming position on latent image carrier" of the invention (Step S42). According to the embodiment, Steps S41 and S42 are equivalent to the "information acquisition step" of the invention.

In the subsequent Step S43, the scanning direction of the latent-image forming light beam is determined based on the skew information and the registration control quantity. That is, in a case where both the skew and the registration offset occur, the color registration offset occurs as a combined result of these factors. In this embodiment, the scanning direction of the light beam is not determined based on either one of the information but determined by judging both of the information comprehensively. Therefore, the scanning direction is obtained which accommodates the color registration offset which occurs as the combined result of such factors (direction determination step).

When the image signal is inputted from the external apparatus such as the host computer 100, the direction switching signal corresponding to the scanning direction determined in Step S43 is provided to the direction switching section 116C of the main controller 11, just as in the foregoing embodiments (Step S44). Thus, the scanning direction of the latent-image forming light beam is commanded for each of the color components and for each of one line image data. Receiving these commands, the direction switching section 116C provides the tone data to the pulse modulator 117 from the line buffer corresponding to the skew information and the registration control quantity at a proper timing and in a proper order, so that the latent-image forming light beam scans on the photosensitive member (Step S45). Thus, the color registration offset occurring as the combined result of the skew and the registration offset may be corrected. The latent images formed in this manner are developed by the respective image forming devices so as to form the toner images of the four colors, which are mutually superimposed on the intermediate transfer belt 71 to form the color image.

As described above, in the fifth embodiment, similarly to the foregoing embodiments, the skew information and the registration control quantity are acquired as the "information related to latent-image forming position on latent image carrier" of the invention, and the scanning direction of the latent-image forming light beam is selectively switched based on these information, thereby adjusting the forming position of the linear latent image on the photosensitive member with high precision of one pixel or less. As a result, the apparatus can form the color images of high quality.

Sixth Embodiment

Figure 20:
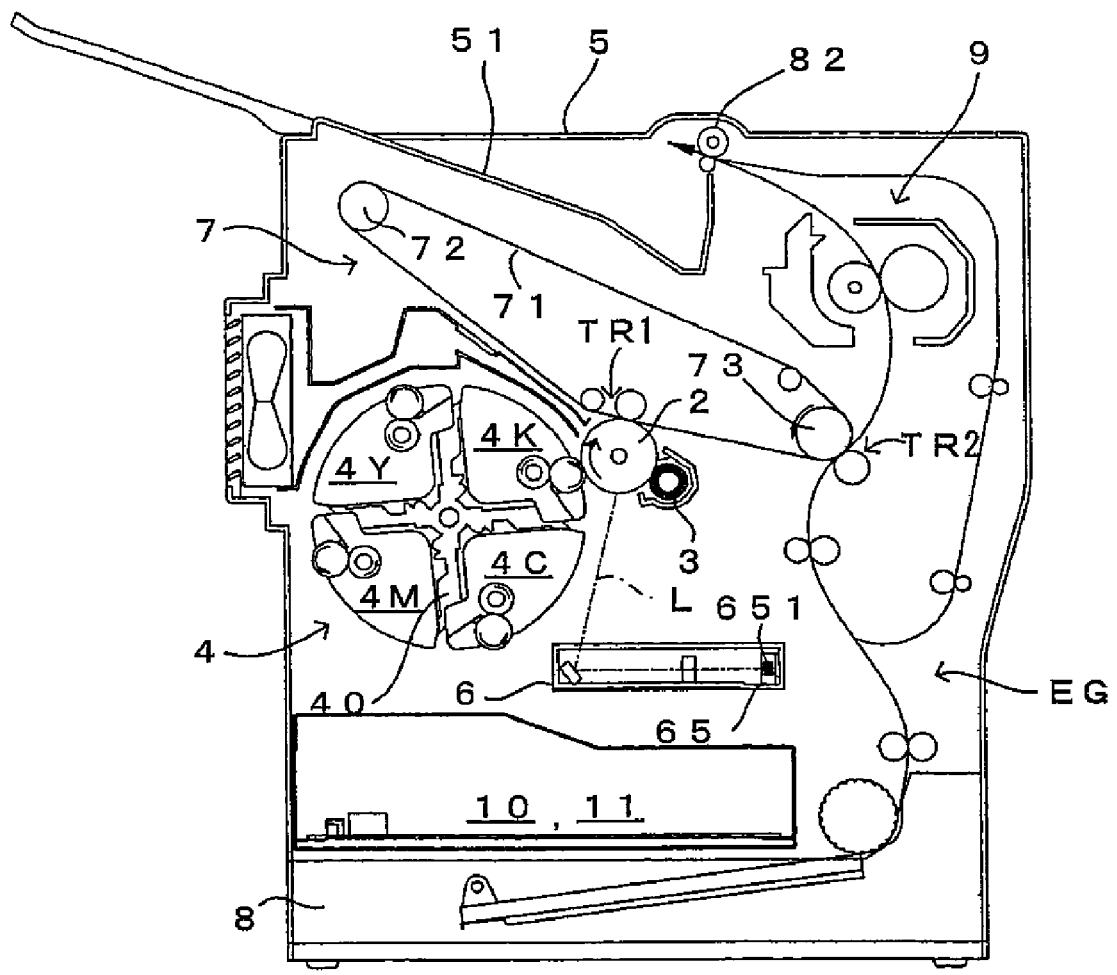
FIG. 20 is a drawing which shows an image forming apparatus according to a sixth embodiment of the invention.

Besides the aforementioned tandem image forming apparatus, the image forming apparatuses for forming color image further includes an image forming apparatus of the four-cycle system as shown in FIG. 20, for example. The invention may also be applied to this image forming apparatus, thereby correcting the registration offset for achieving the improved image quality. A detailed description will be made as below with reference to FIGS. 20 and 21.

FIG. 20 is a drawing which shows an image forming apparatus according to a sixth embodiment of the invention. This apparatus is essentially structured the same way as the apparatus shown in FIG. 1, except that this apparatus is of the so-called four-cycle system. That is, this apparatus is provided with a rotary developing unit 4 including four developing devices 4Y, 4M, 4C, 4K in correspondence to a single photosensitive member 2. A process to position one of the developing devices 4Y, 4M, 4C, 4K selectively at a development position facing the photosensitive member 2 according to a latent image formed on the photosensitive member 2, and to transfer a toner image developed by the selected developing device onto a transfer medium, is repeated for the respective one of the four colors including yellow, magenta, cyan and black. The resultant toner images of the four colors are mutually superimposed on the intermediate transfer belt 71 so as to form the color image. Since the other components are essentially structured the same way and hence, are represented by the same or equivalent reference characters, respectively, the description of which is dispensed with.

Figure 21:
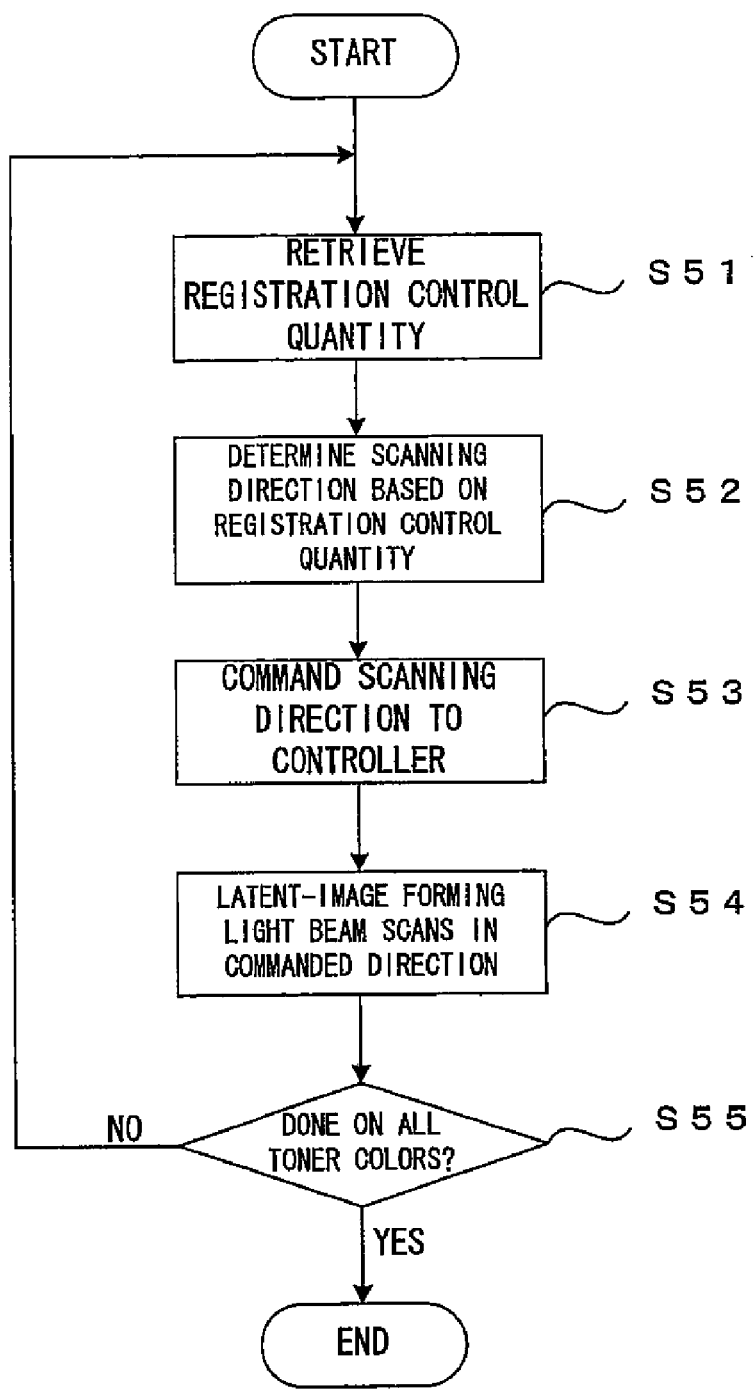
FIG. 21 is a flow chart showing the operation in the sixth embodiment.

By the way, in the image forming apparatus shown in FIG. 20, the color registration offset resulting from the skew does not basically become a problem, because the toner images of the individual colors are formed using a single photosensitive member 2 and a single exposure unit 6. However, the aforementioned registration offset may occur. Hence, in the sixth embodiment, an operation shown in FIG. 21 is performed, thereby correcting the registration offset and achieving the improved image quality. In this embodiment, the correction information necessary to correct the registration offset is stored in the memory such as the ROM 106 or FRAM 108 in advance as the registration control quantity. The methods of acquiring the correction information and the registration control quantity are already known in the art and hence, a detailed description thereof is dispensed with.

FIG. 21 is a flow chart showing the operation in the sixth embodiment. In the sixth embodiment, Steps S51 through S54 are repeated for each of the colors. That is, the registration control quantity as the "information related to latent-image forming position on latent image carrier" of the invention is retrieved from the memory (Step S51: information acquisition step). In subsequent Step S52, the scanning direction of the latent-image forming light beam is determined based on the registration control quantity (direction determination step). Then, the latent image corresponding to the image signal applied from the external apparatus such as the host computer 100 is formed on the photosensitive member 2. At this time, the direction switching signal corresponding to the scanning direction determined in Step S52 is commanded to the direction switching section 116C of the main controller 11, just as in the foregoing embodiments (Step S53). In this manner, the scanning direction of the latent-image forming light beam is commanded for each of the color components and for each one line image data. Receiving these commands, the direction switching section 116C provides the tone data to the pulse modulator 117 from the line buffer corresponding to the registration control quantity at a proper timing and in a proper order, so that the latent-image forming light beam scans on the photosensitive member (Step S54). Thus is formed the latent image of the first one of the colors. The resultant latent image is developed with toner and the resultant toner image is transferred onto the intermediate transfer belt 71.

While it is determined in Step S55 that a series of processes (Steps S51 through S54) are not yet done on all the color components, the operation flow returns to Step S51 to perform the series of processes on the next color component. Thereafter, the toner images of the individual colors are mutually superimposed on the intermediate transfer belt 71 to form the color image.

As described above, according to the sixth embodiment, the registration control quantity is acquired as the "information related to latent-image forming position on latent image carrier" of the invention, and the scanning direction of the latent-image forming light beam is selectively switched based on the information, thereby adjusting the forming position of the linear latent image on the photosensitive member 2 with high precision of one pixel or less. As a result, the registration offset is corrected to ensure the formation of the color images of high quality.

Seventh Embodiment

Figure 22:
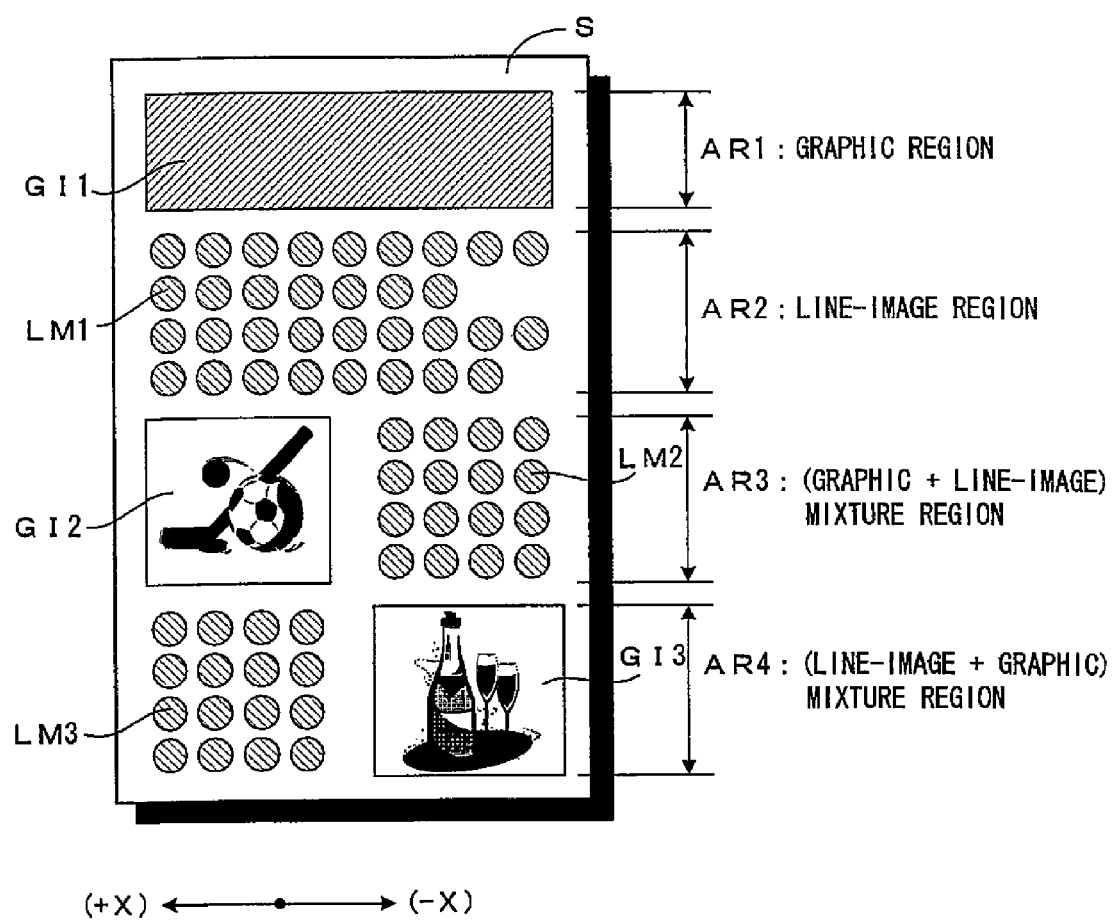
FIG. 22 is a drawing to describe a seventh embodiment of the image forming apparatus according to the invention.

FIG. 22 is a drawing to describe a seventh embodiment of the image forming apparatus according to the invention. FIGS. 23A through 23D are diagrams each showing linear latent images formed by the image forming apparatus of the seventh embodiment. There are cases that images to be printed by the image forming apparatus include plural types of images such as line image, graphic image, and the like as shown in FIG. 22 for example. On the sheet S shown in FIG. 22, line images LM1 to LM3 such as text, and graphic images GI1 to GI3 are printed in a mixed state. Where the line image is compared with the graphic image, the former image is more significantly affected by the color registration offset and jitter. Furthermore, there may be a case where the line image and the graphic image are juxtaposed along the sub scanning direction Y. In this case, it is desirable to adjust the forming position of the linear latent image according to a forming position of the line image, thereby reducing the influences of the color registration offset and such.

In FIG. 22, a graphic region AR1 where only the graphic image GI1 is formed, a line-image region AR2 where only the line image LM1, such as text, is formed, and two mixture regions AR3 and AR4 are shown. In the mixture region AR3 of these regions, a graphic image GI2 is laid out in the (+X) direction whereas a line image LM2 is laid out in the (−X) direction. Therefore, the latent-image forming light beam SL1 scanning in the (+X) direction is used in the light of the color registration offset of the line image LM2, so that the line image LM2 may be formed using the light beam in the initial stage of scanning. Furthermore, the line image LM2 may be formed in a more favorable manner because the starting positions of writing are registered. In the mixture region AR4, on the other hand, a graphic image GI3 is laid out in the (−X) direction whereas a line image LM3 is laid out in the (+X) direction. Conversely to the above, it is therefore desirable to use the latent-image forming light beam SL2 scanning in the (−X) direction.

In the case where the image including the line image region or the graphic region is formed, it is desirable to switch the scanning direction of the latent-image forming light beam for each linear latent image according to the forming position of the line image region, as shown in FIGS. 23C and 23D for example.

Eighth Embodiment

An image forming apparatus according to an eighth embodiment is structured the same way as that of the first embodiment shown in FIG. 1. The apparatus of this embodiment has the same electric structure as that of the second embodiment shown in FIG. 9. According to this embodiment, however, the RAM 107 and the FRAM 108 shown in FIG. 9 also function as the storage section which stores "information related to print mode" of the invention. In this regard, a detailed description will be made hereinlater.

FIG. 24 is a diagram showing signal processing blocks of the image forming apparatus of the eighth embodiment. Structures of the exposure unit and scan regions of the light beam in the exposure unit according to the eighth embodiment are the same as those of the second embodiment shown in FIGS. 10 and 11. The structures and operations of the exposure unit 6 and the exposure controller 102 are described in detail with reference to these figures. Since the structures of the exposure unit 6 and the exposure controller 102 are the same for all the color components, the description is made here on the yellow color while the components for the other colors are represented by the equivalent reference characters, respectively, the description of which is dispensed with. Furthermore, like components to those of the second embodiment are represented by the same reference characters, respectively, the description of which is dispensed with.

The image processor 115 performs the half-toning process, such as an error diffusion method, a dither method, a screen method, and the like to the corrected tone data, and inputs the half-toning-processed CMYK tone data composed of eight bits for each pixel for each color component into the two types of line buffers 116D and 116E. It is to be noted that the contents of the half-toning process vary depending upon the types of images to be formed. That is, the most suited contents of the process to the image to be formed are selected and executed based on a criterion as to whether the image is a monochromatic image or a color image, or whether the image is a line image or a graphic image, or the like.

These line buffers 116D and 116E have a common function that the buffers store the half-toning-processed tone data (image information) which constitutes one line image data outputted from the image processor 115, but these buffers read out the tone data in different orders. Specifically, the forward line buffer 116D outputs the half-toning-processed tone data which constitutes the one line image data forwardly from a head of data, whereas the backward line buffer 116E outputs the data backwardly from an end of data.

The half-toning-processed tone data thus outputted are inputted to the direction switching section 116C, so that only the half-toning-processed tone data outputted from either one of the line buffers based on a direction switching signal are outputted from the direction switching section 116C to the pulse modulator 117 at a proper timing. A main reason for providing the two types of line buffers 116D and 116E is to deal with an operation wherein a scan mode of the latent-image forming light beam is changed according to a print mode, as will be described hereinlater. The direction switching section 116C inputs the tone data to the pulse modulator 117 at a timing and in an order corresponding to each of the color components. Thus, in the embodiment, the line buffers 116D and 116E, and the direction switching section 116C constitute a "direction controller" and a "data control device" of the invention.

Further, in the apparatus structured as shown in FIGS. 10 and 11, the light beam is capable of reciprocally scanning in the main scanning direction, that is, the light beam is capable of scanning in both (+X) direction and (−X) direction. As described above, the tone data constituting the one line image data are temporarily stored in a storage unit (line buffers 116D and 116E), whereas the direction switching section 116C provides the tone data to the pulse modulator 117 at a proper timing and in a proper order. In a case where the scanning direction is switched to the (+X) direction, for example, tone data DT1, DT2, . . . , DTn are read out from the line buffer 116D in the order named, as shown in FIG. 25A, and beam spots are irradiated on the photosensitive member 2 in the first direction (+X) based on the respective tone data, thereby forming a linear latent image LI(+X) thereon. In a case where the scanning direction is switched to the (−X) direction, on the other hand, tone data DTn, DT(n−1), . . . , DT1 are read out from the line buffer 116E in the order named, as shown in FIG. 25B, and beam spots are irradiated on the photosensitive member 2 in the second direction (−X) based on the respective tone data, thereby forming a linear latent image LI(−X). Therefore, it is possible for the light beam for latent-image formation (equivalent to the "latent-image forming light beam" of the invention) to change for each print mode or each line, as described below. More specifically, in this embodiment, information related to resolution which is included in the print command (resolution information) is temporarily stored in the RAM 107 as "information related to print mode" of the invention. In a case where high-resolution printing is commanded, a so-called reciprocal scan mode is performed to form the latent images, in which an operation to form the latent image in the effective image region IR by guiding to the effective image region IR the light beam SL1 which scans in the (+X) direction and in the first scan region SR1 as the latent-image forming light beam, and an operation to form the latent image in the effective image region IR by guiding to the effective image region IR the light beam SL2 which scans in the (−X) direction and in the first scan region SR1 as the latent-image forming light beam, are repeated alternately. On the other hand, in a case where low-resolution printing is commanded, a so-called one-way scan mode is performed to form the latent images, in which only the latent-image forming light beam SL1 is repeated. Thus, in this embodiment, the scan mode of the latent-image forming light beam is switched between the high-resolution printing and the low-resolution printing based on the resolution information. In this regard, a detailed description will be made hereinlater.

Further, in this embodiment, the scanning direction and the location of the driving motor MT are previously defined to satisfy the following relation. That is, the driving motor MT is disposed on a downstream side of the scanning direction (+X). As shown in FIG. 10, a return mirror 69 is disposed on an upstream side in the scanning direction (+X) which guides the scanning light beam at the end of the scanning path toward the horizontal synchronization sensor 60. The return mirror 69 is disposed at the end of the second scan region SR2 on an upstream side in the scanning direction (+X). The return mirror 69 guides the scanning light beam which moves inside the second scan region SR2 and outside the first scan region SR1 on the upstream side in the scanning direction (+X) toward the horizontal synchronization sensor 60. At a time when the scanning light beam is received by the horizontal synchronization sensor 60 and passes at a sensor position (amplitude angle θs), the horizontal synchronization sensor 60 outputs a signal. In this embodiment, the horizontal synchronization sensor 60 functions as a horizontal synchronization reading sensor for obtaining a synchronizing signal when the light beam scans the effective image region IR in the main scanning direction X, or a horizontal synchronizing signal Hsync. A latent image forming operation is controlled based on the horizontal synchronizing signal Hsync. The latent image forming operation of the apparatus according to the embodiment will now be described.

Figure 26:
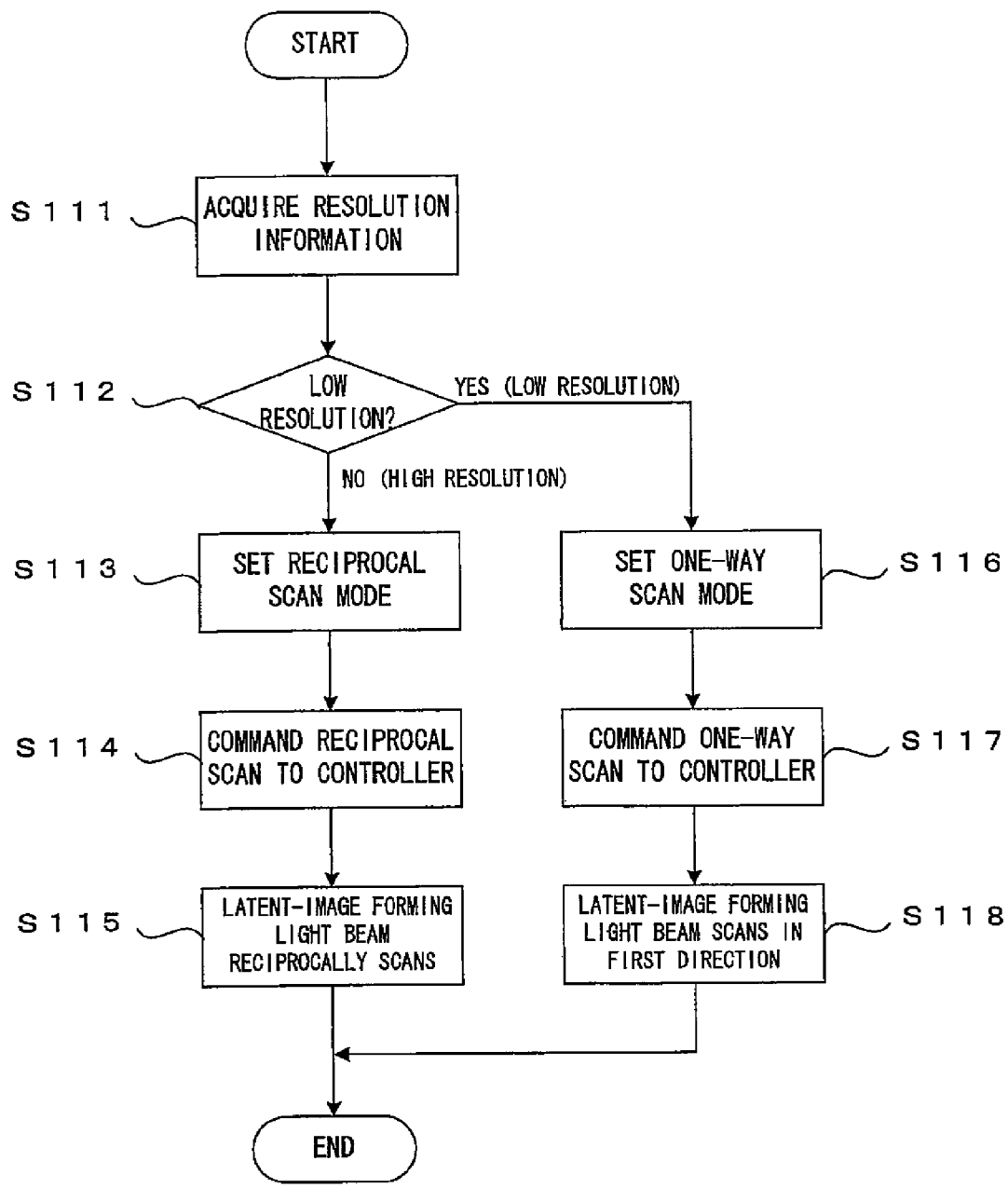
FIG. 26 is a flow chart showing an operation of the image forming apparatus of the eighth embodiment.
Figure 27:
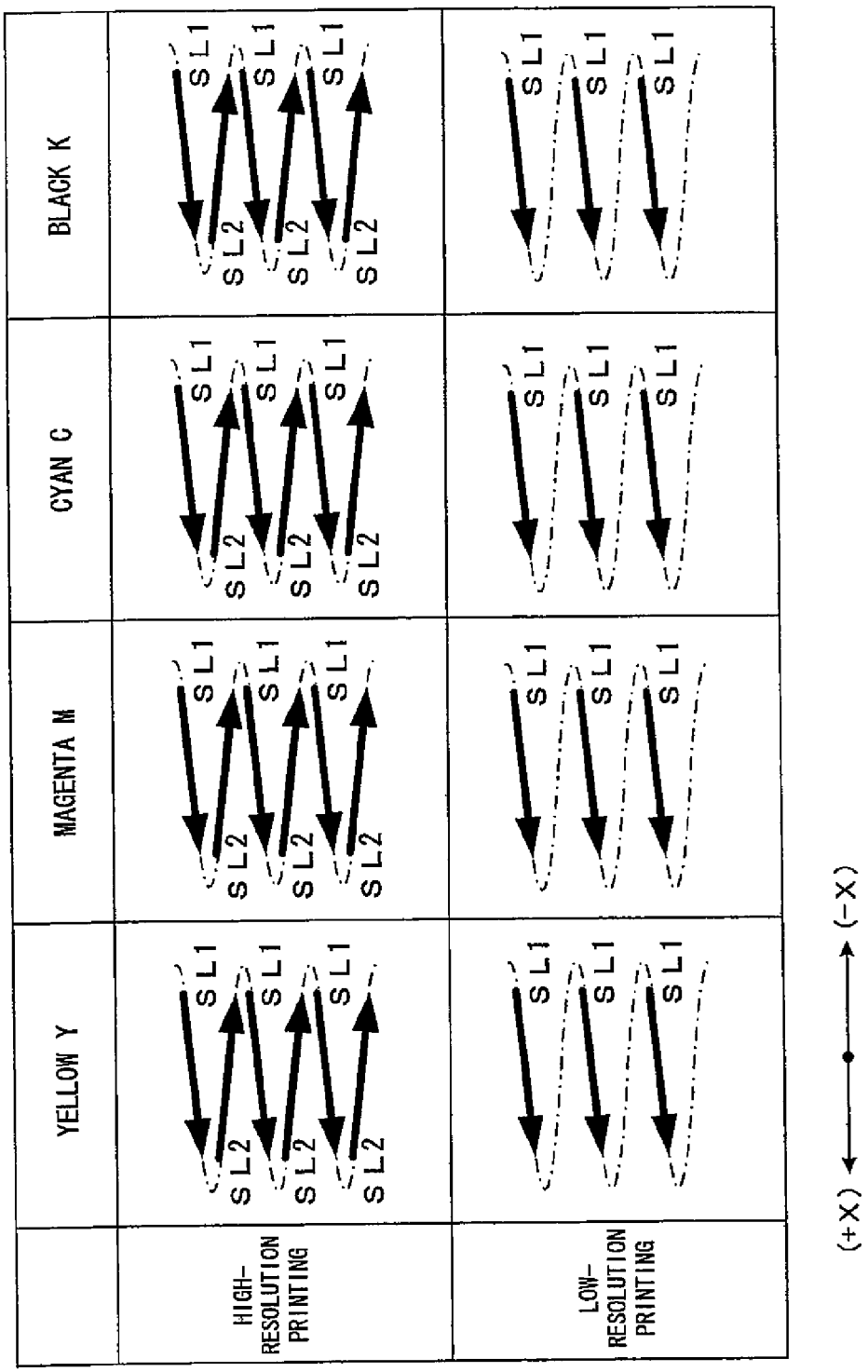
FIG. 27 is a diagram showing latent images formed by the latent-image forming operation of the embodiment.

FIG. 26 is a flow chart showing an operation of the image forming apparatus of the eighth embodiment. FIG. 27 is a diagram showing latent images formed by the latent-image forming operation of the embodiment. In FIG. 27 (as well as FIGS. 29, 31, 33A through 33C, 35, 38, and 40A through 40D to be described hereinlater), dot-and-dash lines are phantom lines indicating the tracks of the scanning line, and boldface arrows indicate the scanning light beam for latent image formation.

When the print command is inputted from the external apparatus such as the host computer 100, the latent images are formed on the individual photosensitive members according to the flow chart of FIG. 26 and the color image is formed based on the latent images. In Step S111, the resolution information included in the print command is acquired as the "information related to print mode" of the invention (information acquisition step). Based on the resolution information, determination is made as to whether the print command dictates the high-resolution printing or the low-resolution printing (Step S112).

If the result of the determination in Step S112 is "YES" or it is determined that the command dictates the high-resolution printing, Steps S113 through S115 are performed to form an image at high resolution, and then the resultant image is transferred onto the sheet S which is equivalent to a "recording medium" of the invention, and a printing process is terminated. First in Step S113, the apparatus is set for the reciprocal scan mode (scan mode determination step). Next, the direction switching signal corresponding to the scan mode thus determined is provided to the direction switching section 116C of the main controller 11 (Step S114). Receiving these commands, the direction switching section 116C alternately switches the timing and sequence of reading the tone data from the line buffers for each line. In this way, a latent image of high resolution is formed as follows. That is, as shown in the upper row of FIG. 27, the operation of forming the latent image in the effective image region IR by guiding to the effective image region IR the light beam SL1 which scans in the (+X) direction and in the first scan region SR1, as the latent-image forming light beam, and the operation of forming the latent image in the effective image region IR by guiding to the effective image region IR the light beam SL2 which scans in the (−X) direction and in the first scan region SR1, as the latent-image forming light beam, are repeated alternately (Step S115). Thus, the so-called reciprocal scan mode is performed to form the latent images in high resolution. The latent images thus formed are developed by the individual image forming devices to form the toner images of the four colors, which are mutually superimposed on the intermediate transfer belt 71 to form the color image. Subsequently, the resultant color image is transferred onto the sheet S to terminate the high-resolution printing.

On the other hand, if the result of the determination in Step S112 is "NO" or it is determined that the command dictates the low-resolution printing, Steps S116 through S118 are performed to form an image at low resolution, and then, the resultant image is transferred onto the sheet S to terminate the printing process. First in Step S116, the apparatus is set for the one-way scan mode (scan mode determination step). Next, the direction switching signal corresponding to the scan mode thus determined is provided to the direction switching section 116C of the main controller 11 (Step S117). Receiving these commands, the direction switching section 116C fixes the timing and order of reading out the tone data from the line buffer and sequentially forms the latent images for each line. Specifically, the tone data are read out from the forward line buffer 116D at a proper timing and in an order of forward direction (that is, the order of the tone data DT1, DT2, . . . , DTn), and only the latent-image forming light beam SL1 scanning in the first direction (+X) is optically modulated based on the respective tone data and scans on the photosensitive member 2 so as to form the latent images thereon, as shown in the lower row of FIG. 27 (Step S118). In this manner, the so-called one-way scan mode is performed to form the latent images at a lower resolution than in the high-resolution printing. It is to be noted that, similarly to the high-resolution printing, the latent images thus formed are developed with the toner so as to form the toner images of the four colors, which are mutually superimposed on the intermediate transfer belt 71 to form the color image. Subsequently, the resultant color image is transferred onto the sheet S to terminate the low-resolution printing.

As described above, according to the eighth embodiment, the printing resolutions are changed by selectively switching the operation between the reciprocal scan mode (Steps S113 through S115) and the one-way scan mode (Steps S116 through S118) based on the resolution information. In this manner, the high-resolution printing or the low-resolution printing may be selectively performed by merely switching the scan mode of the latent-image forming light beam without varying the oscillating operation of the deflection mirror surface 651. Therefore, the resolutions can be changed quickly.

Ninth Embodiment

Figure 28:
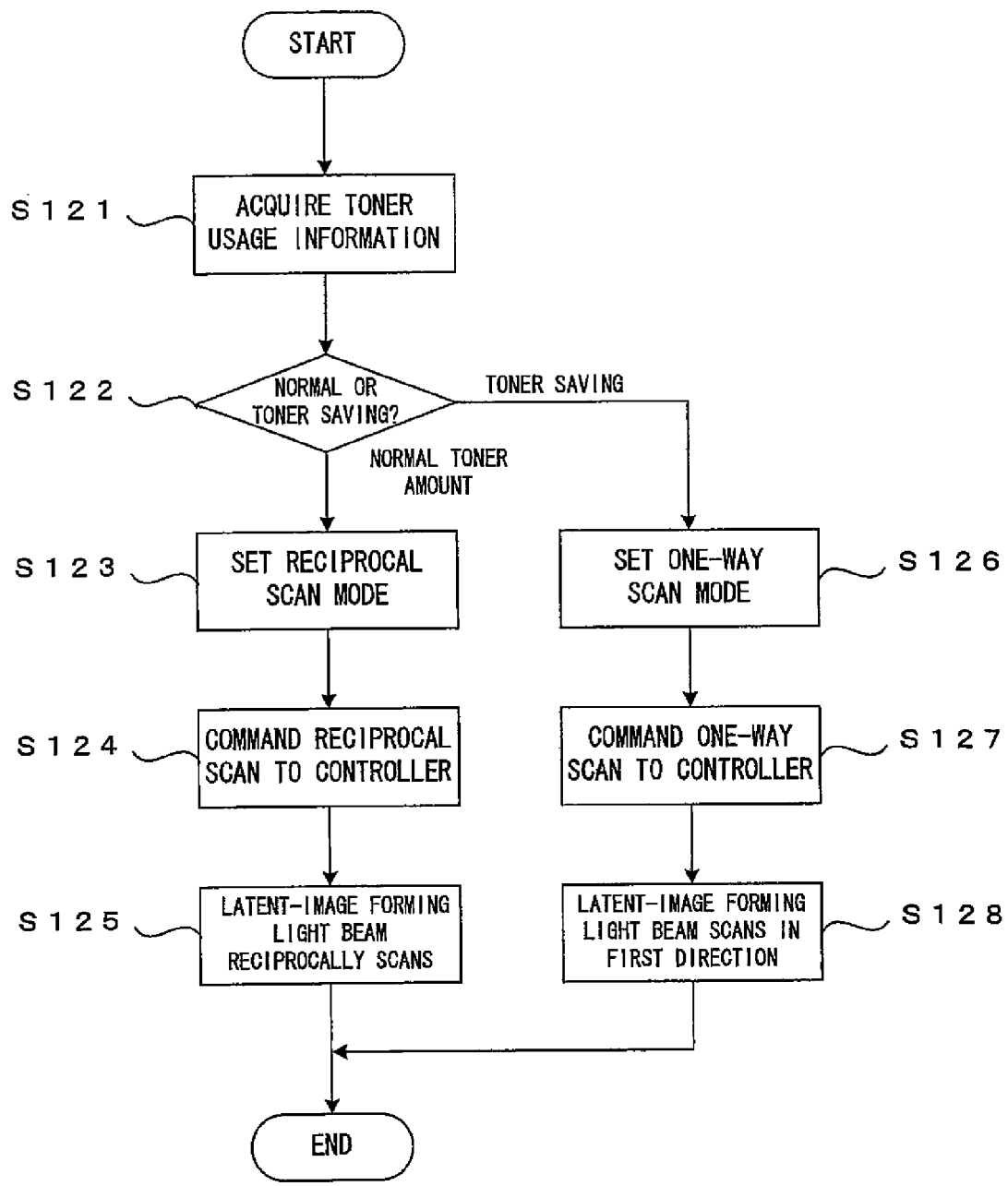
FIG. 28 is a flow chart showing an operation of the image forming apparatus of the ninth embodiment.
Figure 29:
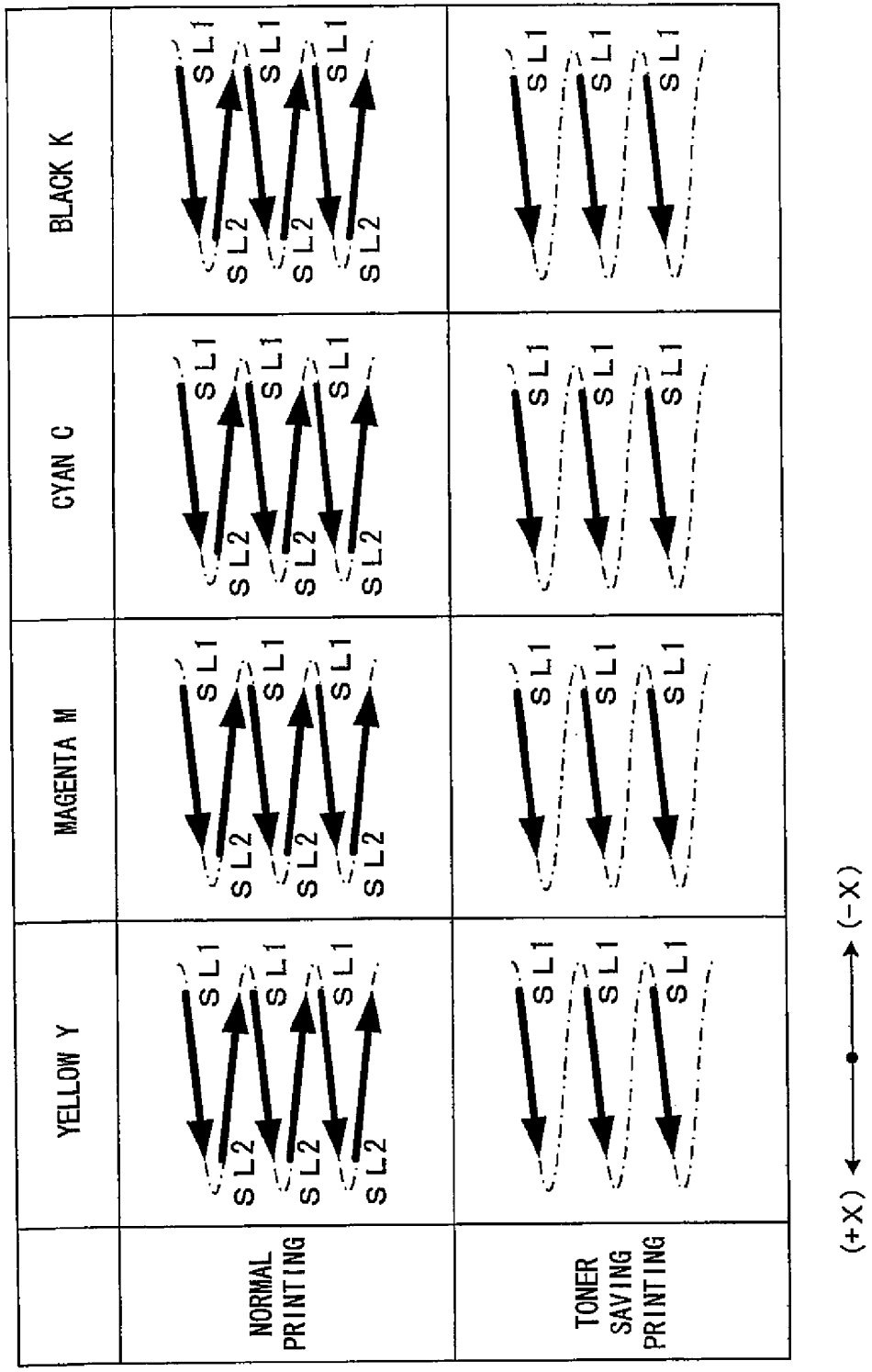
FIG. 29 is a diagram showing latent images formed by the latent-image forming operation of the embodiment.

By the way, there may be a case where the apparatus is set for toner saving printing in order to save toner consumption. The toner saving printing omits the formation of some of the dots of a normal print image which is printed in normal printing. The formation of dots may be omitted on a one line basis, for example. For instance, the latent image formation for the normal printing may be performed in the reciprocal scan mode whereas the latent image formation for the toner saving printing may be performed in the one-way scan mode, whereby switching between the normal printing and the toner saving printing may be accomplished. Referring to FIGS. 28 and 29, a detailed description is made as below on an operation of the apparatus switching between the normal printing and the toner saving printing. Since the apparatus according to a ninth embodiment (and the subsequent embodiments) is essentially structured the same way as that of the eighth embodiment, like components are represented by the same or equivalent reference characters, respectively, the description of which is dispensed with.

FIG. 28 is a flow chart showing an operation of the image forming apparatus of the ninth embodiment. FIG. 29 is a diagram showing latent images formed by the latent-image forming operation of the embodiment. According to the ninth embodiment, when the print command is inputted from the external apparatus such as the host computer 100, the latent images are formed on the individual photosensitive members according to the flow chart shown in FIG. 28 and the color image is formed based on the latent images. In Step S121, toner usage information included in the print command is acquired as the "information related to print mode" of the invention (information acquisition step). Based on the toner usage information, determination is made as to whether the print command requests the normal toner amount printing to print an image using a predetermined amount (equivalent to "first toner amount" of the invention) of toner or the toner saving printing to print an image using a smaller amount (equivalent to "second toner amount" of the invention) of toner than the normal toner amount printing (Step S122).

If it is determined in Step S122 that the print command is the "normal toner amount printing", Steps S123 through S125 are performed to form the image in the normal toner amount printing mode. The resultant image is transferred onto the sheet S, as the "recording medium" of the invention, to terminate the printing process. Since the operations of Steps S123 through S125 are the same as those of the high-resolution printing of the eighth embodiment, the description thereof is dispensed with.

On the other hand, if it is determined in Step S122 that the print command is the "toner saving printing", Steps S126 through S128 are performed to form an image in which dot formation is skipped in every other line in an image formed in the normal toner amount printing, and then, the resultant image is transferred onto the sheet S to terminate the printing process. First in Step S126, the apparatus is set for the one-way scan mode (scan mode determination step). Next, in a case where the first direction (+X) is set as the scanning direction of the latent-image forming light beam, the direction switching section 116C reads out the tone data from the forward line buffer 116D at a proper timing and in an order of forward direction (that is, the order of the tone data DT1, DT2, . . . , DTn), and the latent-image forming light beam SL1 scanning in the first direction (+X) is optically modulated based on the respective tone data and scans on the photosensitive member 2 so as to form linear latent images LI(+X) thereon (Step S128). On the other hand, in a case where the second direction (−X) is set as the scanning direction of the latent-image forming light beam, the direction switching section 116C does not read out the tone data from the backward line buffer 116E, and the latent-image forming light beam SL2 is inhibited from scanning on the photosensitive member 2, so that the formation of latent images is not performed. That is, the latent image which consists only of the linear latent images LI(+X) which is formed by the light beam scanning on the photosensitive member 2 in the first direction (+X) is formed, as shown in lower row of FIG. 27. Just as in the normal printing, the latent images thus formed are developed with the toner to form the toner images of the four colors, which are mutually superimposed on the intermediate transfer belt 71 to form the color image. Thereafter, the resultant color image is transferred onto the sheet S. The resultant image is a toner saving image in which the dot formation is omitted on a one line basis.

As described above, according to the ninth embodiment, the scan mode is selectively switched to the reciprocal scan mode (Steps S123 through S125) or to the one-way scan mode (Steps S126 through S128) based on the toner usage information, thereby switching the operation between the normal toner amount printing and the toner saving printing. In this manner, the normal toner amount printing or the toner saving printing may be selectively performed by merely switching the scan mode of the latent-image forming light beam without varying the oscillating operation of the deflection mirror surface 651. Therefore, the operation can be quickly switched from the normal toner amount printing to the toner saving printing or vice versa.

In addition, as a variation of the ninth embodiment, the light quantity of the latent-image forming light beam may be set to the same value in both of the normal toner amount printing and the toner saving printing. That is, the structure may be made such that the light quantity of the latent-image forming light beam may be set to the same value in both of the reciprocal scan mode performed in the normal toner amount printing and the one-way scan mode performed in the toner saving printing.

According to this variation, either the normal toner amount printing or the toner saving printing may be selectively performed by merely switching the scan mode of the latent-image forming light beam without varying the oscillating operation of the deflection mirror surface 651 or varying the light quantity of the latent-image forming light beam. Hence, the switching of the toner consumption adjustment or switching from the normal toner amount printing to the toner saving printing or vice versa can be accomplished quickly.

Further, since the light quantity of the latent-image forming light beam is set to the same value in both of the reciprocal scan mode performed during the normal toner amount printing and in the one-way scan mode performed during the toner saving printing, a quantity of toner consumed in the toner saving printing may be decreased to approximately half of that consumed in the normal toner amount printing. In other words, if the light quantity of the latent-image forming light beam in the one-way scan mode is set to a different value from that of the latent-image forming light beam in the reciprocal scan mode, the quantity of toner consumed in the toner saving printing may not be sufficiently decreased or may be excessively decreased as compared with the quantity of toner consumed in the normal toner amount printing. However, such problems may be obviated by setting the light quantity of the latent-image forming light beam in the one-way scan mode to the same value as that for the reciprocal scan mode.

Tenth Embodiment

Incidentally, as the images formed by the image forming apparatus, there are a tonal image which includes half tone such as photographic image, a binary image free from the half tone such as character image, line image and solid image, and such. In the case of the tonal image, if the operation is unexceptionally set for the one-way scan mode in response to the print command dictating the toner saving printing, the image quality may be seriously degraded. This is because a low-density area of the tonal image particularly distinctly reflects the degraded image quality due to the decreased toner consumption. In contrast, the degraded image quality due to the decreased toner consumption is unnoticeable in the binary image, since the density of the binary image is high.

Figure 30:
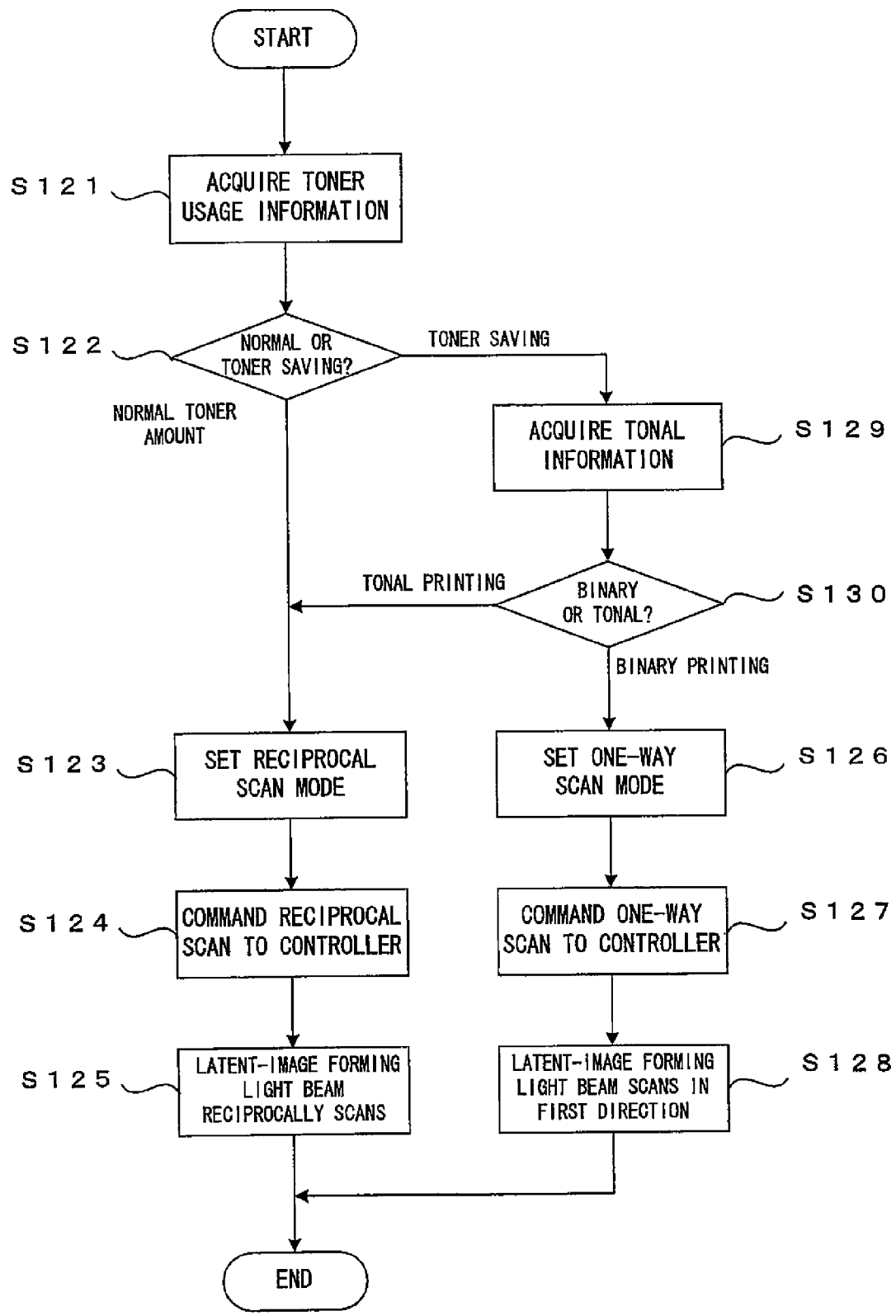
FIG. 30 is a flow chart showing an operation of the image forming apparatus of the tenth embodiment.
Figure 31:
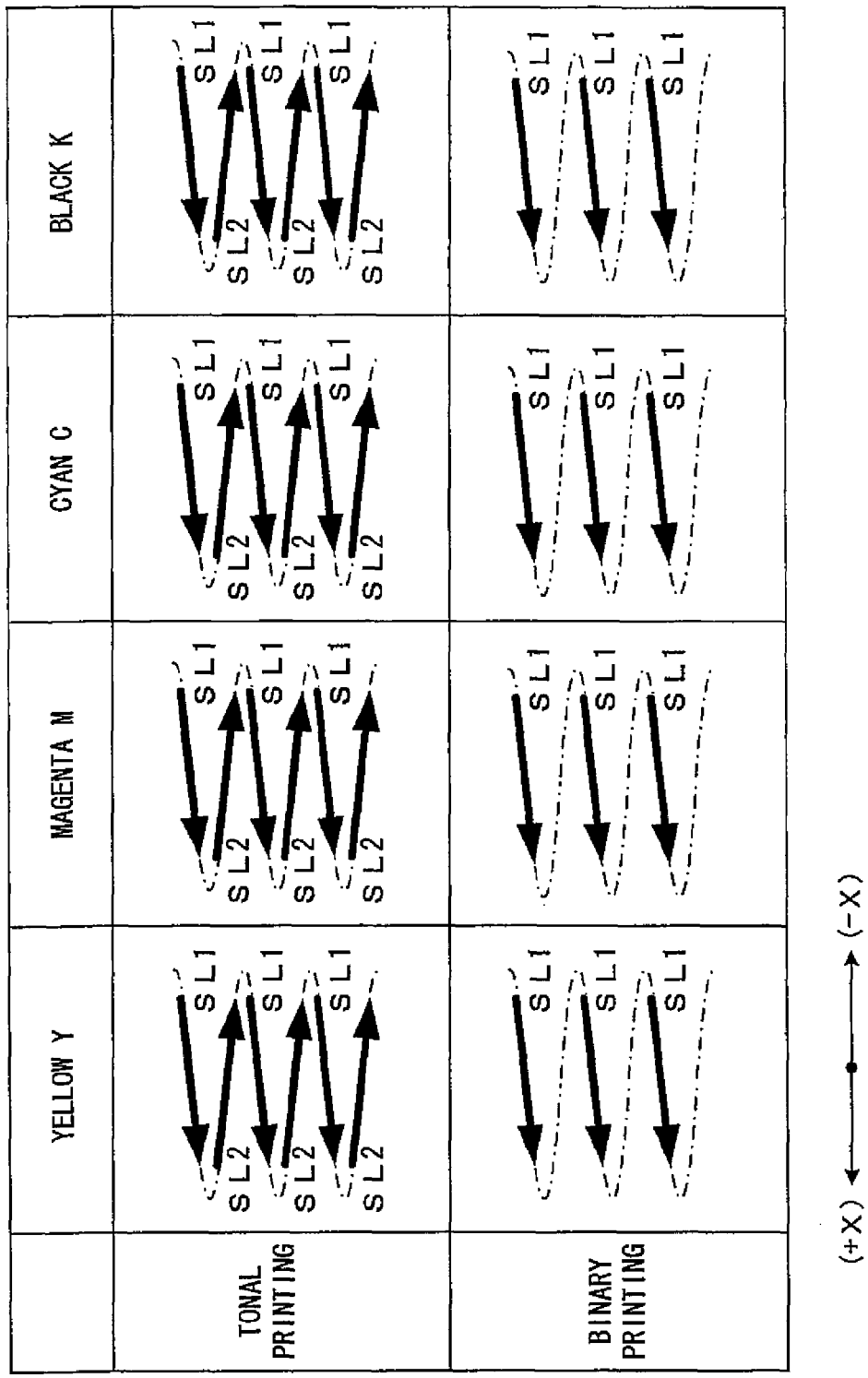
FIG. 31 is a diagram showing latent images formed by the latent-image forming operation of the embodiment.

Therefore, in the tenth embodiment, the one-way scan mode is set in a case where the information indicates that both the toner saving printing and the binary printing for printing the binary image free from the half tone are performed, and the reciprocal scan mode is set, on the other hand, in a case where the information indicates that both the toner saving printing and the tonal printing for printing the tonal image including the half tone are performed, thereby carrying out the tonal printing in an optimum manner. Referring to FIGS. 30 and 31, a detailed description is made as below on an operation of the apparatus wherein the print mode is switched between the tonal printing and the binary printing as well as between the normal toner amount printing and toner saving printing. Since the tenth embodiment is essentially constituted the same way as the ninth embodiment, the following description focuses on difference therebetween.

FIG. 30 is a flow chart showing an operation of the image forming apparatus of the tenth embodiment. FIG. 31 is a diagram showing latent images formed by the latent-image forming operation of the embodiment. In the tenth embodiment, when the print command is inputted from the external apparatus such as the host computer 100, the latent images are formed on the individual photosensitive members according to the flow chart shown in FIG. 30 and the color image is formed based on the latent images. The operations of Steps S121 through S125 are the same as those of Steps S121 through S125 in FIG. 28 of the ninth embodiment and hence, the description is dispensed with.

When it is determined in Step S122 that the print command dictates the "toner saving printing", the operation proceeds to Step S129 where tonal information included in the print command is acquired as the "information related to print mode" of the invention (information acquisition step). Based on the tonal information, determination is made as to whether the print command dictates the binary printing or the tonal printing (Step S130). Thus, in this embodiment, for the sake of the determination in Step S130, the print command is constituted to include the tonal information indicating whether the image to be printed is the tonal image including the half tone or the binary image free from the half tone. Alternately, the image processor 115 may make the determination in Step S130 based on the CMYK tone data outputted from the color converter 114 or on the corrected tone data converted therefrom, for example. In this case, the image processor 115 may be arranged to determine that the image being processed is the binary image free from the half tone when the number of half-tone data is less than a predetermined level and that the image being processed is the tonal image including the half tone when the number of half-tone data is not less than the predetermined level.

If it is determined in Step S130 that the print command dictates the "binary printing", Steps S126 through S128 are performed to form the latent images in the one-way scan mode. Subsequently, the toner images formed by developing the latent images are mutually superimposed on the intermediate transfer belt 71 so as to form the color image. The resultant color image is transferred onto the sheet S as the "recording medium" of the invention and then is fixed thereto to terminate the print process. Since the operations of Steps S126 through S128 are the same as those of Steps S126 through S128 in FIG. 28 of the ninth embodiment, the description is dispensed with.

On the other hand, if it is determined in Step S130 that the print command dictates the "tonal printing", Steps S123 through S125 are performed to form the latent images in the reciprocal scan mode. Subsequently, the toner images formed by developing the latent images are mutually superimposed on the intermediate transfer belt 71 so as to form the color image. The resultant color image is transferred onto the sheet S as the "recording medium" of the invention and then is fixed thereto to terminate the print process.

As described above, according to the tenth embodiment, the scan mode is switched to the one-way scan mode when the toner usage information indicates the toner saving printing and the tonal information indicates the binary printing (Steps S126 through S128), and the scan mode is switched to the reciprocal scan mode, on the other hand, when the toner usage information indicates the toner saving printing and the tonal information indicates the tonal printing (Steps S123 through S125), thereby the switching between the normal toner amount printing and the toner saving printing is performed. Thus, even when the toner usage information indicates the toner saving printing, the scan mode is not set to the one-way scan mode uniformly, but set to the reciprocal scan mode if the tonal information indicates the tonal printing. Therefore, it is possible to prevent the serious degradation of image quality such as the degradation which is distinctly observed in the low-density area and to improve the image reproducibility by performing the tonal printing of the tonal image including the half tone, such as the photographic image, in the one-way scan mode.

Eleventh Embodiment

Figure 32:
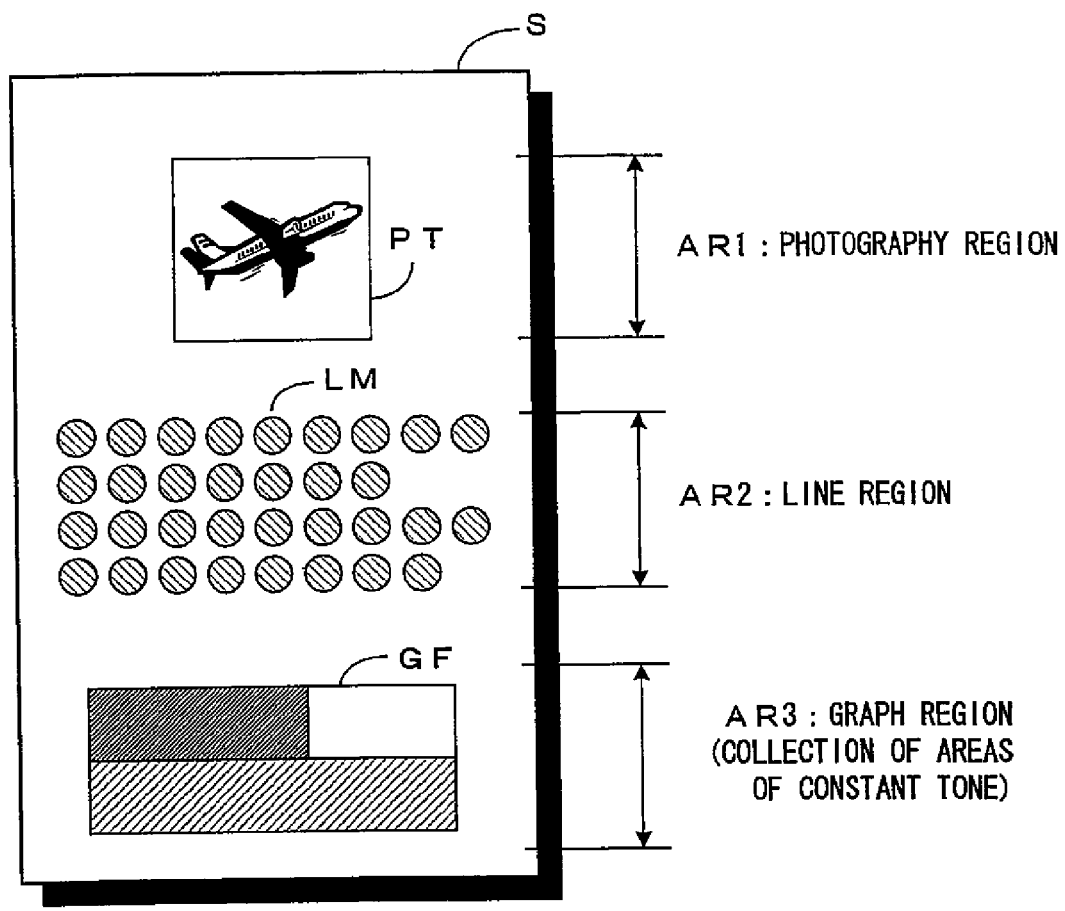
FIG. 32 is a diagram for describing an image forming apparatus according to a eleventh embodiment of the invention.

FIG. 32 is a diagram for describing an image forming apparatus according to a eleventh embodiment of the invention. FIGS. 33A through 33C are diagrams showing latent images formed by the image forming apparatus of the eleventh embodiment. There are cases that, as shown in FIG. 32 for example, the image to be formed by the image forming apparatus may include plural types of images such as image of photography, image of line and image of graph. On a sheet S shown in FIG. 32, an image of photography PT, an image of line LM, and an image of graph GF produced by a spreadsheet software or the like are printed in a mixed state. As described above, the respective image qualities of the photography PT, the line LM, and the graph GF are differently affected by the toner saving printing. It is therefore desirable to perform the printing operation in the respective scan modes corresponding to the individual images even when a single sheet S is subjected to the toner saving printing. Hence, in the eleventh embodiment, the scan mode is switched while a single sheet is subjected to the toner saving printing.

A photography region AR1 where the image of photography PT is formed, a line region AR2 where the image of line LM is formed, and a graph region AR3 where the image of graph GF is formed are shown in FIG. 32. In the operation of forming the latent image corresponding to the photography region AR1, the latent images are formed in the reciprocal scan mode similarly to the tenth embodiment, as shown in FIG. 33A, although the toner saving printing is in progress. On the other hand, when the operation proceeds to the line region AR2, the scan mode is switched to the one-way scan mode, as shown in FIG. 33B. Thus, the latent images may be formed in the respective scan modes suited to the individual regions.

By the way, the image of graph GF falls under the category of the tonal image and hence, it is preferable to print the image of graph GF in the reciprocal scan mode, as described in the tenth embodiment. In the image of graph GF, however, an area representing one numerical value is free from tone variations, so a graph is a collection of areas of which tone level is constant. In such an image, the result of decreasing the toner consumption is unnoticeable. In a case where the density of the image is high, in particular, the user scarcely notices the result of decreasing the toner consumption. In the eleventh embodiment, therefore, the image which is a collection of areas of which tone level is constant, such as the image of graph, is regarded as the binary image free from the half tone. Hence, when the printing operation proceeds to the graph region AR3, the scan mode continues to be the one-way scan mode as shown in FIG. 33C. In this manner, the toner consumption may be decreased effectively.

As described above, according to the eleventh embodiment, it is possible to selectively perform the tonal printing or the binary printing without varying the oscillating operation of the deflection mirror surface 651 or varying the light quantity of the latent-image forming light beam, and by merely switching the scan mode of the latent-image forming light beam. Therefore, it is possible to quickly switch the scan mode even when a single sheet S is subjected to the toner saving printing. Hence, the apparatus can meet the special print request flexibly and in high quality, the special print request being a request to print plural images on a single sheet S in a mixed state, the plural images of which the respective image qualities are affected by the decreased toner consumption differently from each other.

Further, according to the eleventh embodiment, during the toner saving printing, the image which is a collection of areas of which tone level is constant, such as the image of graph GF, is regarded as the binary image free from the half tone, even though the image so regarded is equivalent to the tonal image, and the latent-image formation is performed in the one-way scan mode, thereby decreasing the toner consumption effectively.

Twelfth Embodiment

Figure 34:
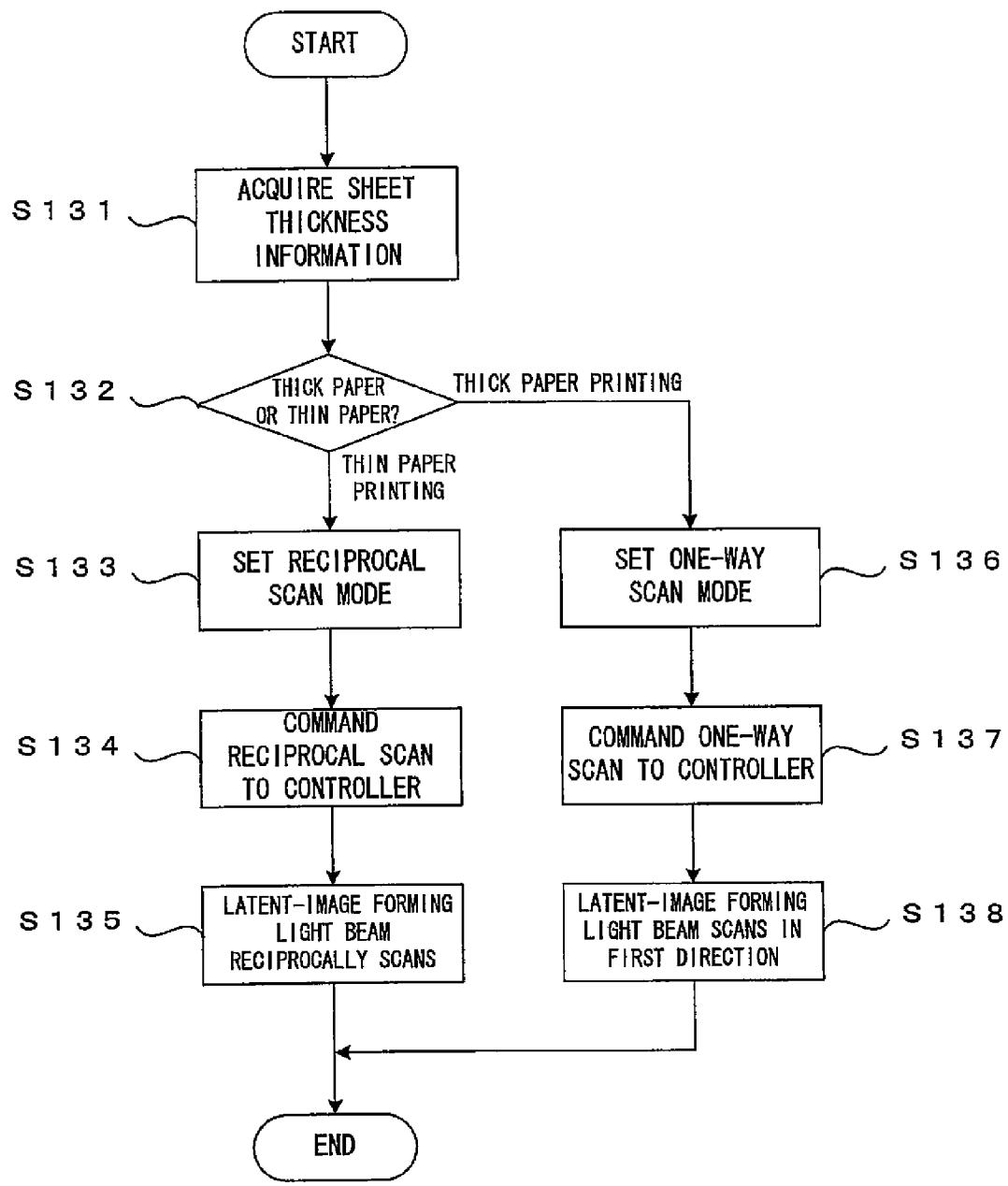
FIG. 34 is a flow chart showing an operation of the image forming apparatus of the twelfth embodiment.
Figure 35:
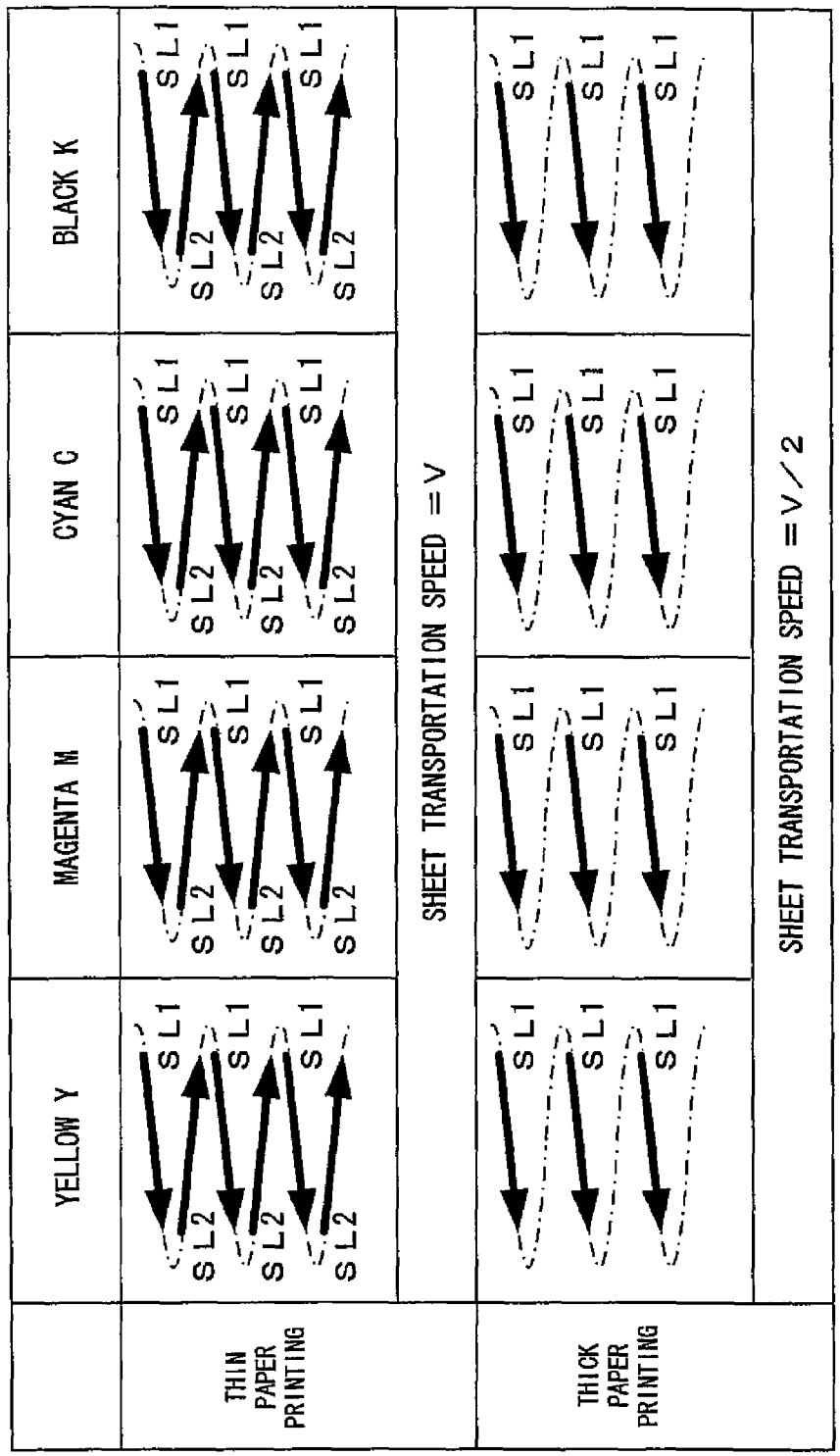
FIG. 35 is a diagram showing latent images formed by the latent-image forming operation of the embodiment.

In the image forming apparatuses, there has been cases, heretofore, that two print modes (thin paper printing and thick paper printing) are switched according to the thickness of the recording medium (sheet S). The thin paper printing is to print on a recording medium having a thickness of not more than a predetermined value, such as plain paper. The thick paper printing, on the other hand, is to print on a recording medium having a thickness of more than the predetermined value, such as cardboard. The reason for switching the print modes in this manner is that the thick paper printing gives consideration to a fact that the sheet S (cardboard) as the recording medium has a greater thermal capacity than plain paper. In the thick paper printing, the sheet S is transported at a lower speed than in the thin paper printing so that the sheet S may take longer time to pass through the fixing unit 9 thereby allowing the toner to be fully fused to the sheet. Thus, the apparatus may be able to perform both the thin paper printing and the thick paper printing in optimum manners by performing the respective scan modes suited for the thin paper printing and the thick paper printing. Referring to FIGS. 34 and 35, a detailed description will be made as below on an operation of the apparatus switching between the thin paper printing and the thick paper printing.

FIG. 34 is a flow chart showing an operation of the image forming apparatus of the twelfth embodiment. FIG. 35 is a diagram showing latent images formed by the latent-image forming operation of the embodiment. In the twelfth embodiment, when the print command is inputted from the external apparatus such as the host computer 100, the latent images are formed on the individual photosensitive members according to the flow chart of FIG. 34, and then, the color image is formed based on the latent images. That is, in Step S131, sheet thickness information included in the print command is acquired as the "information related to print mode" of the invention (information acquisition step). Then, based on the sheet thickness information, determination is made as to whether the print command dictates the thin paper printing or the thick paper printing (Step S132).

If it is determined in Step S132 that the command dictates the "thin paper printing", Steps S133 through S135 are performed to form the latent images in the reciprocal scan mode. Then, the toner images formed by developing the latent images are mutually superimposed on the intermediate transfer belt 71 so as to form the color image. Subsequently, the color image is transferred onto the sheet S as the "recording medium" of the invention and then, is fixed thereto to terminate the printing process. Since the operations of Steps S133 through S135 are the same as those of the high-resolution printing of the eighth embodiment, the description thereof is dispensed with.

On the other hand, if it is determined in Step S132 that the command dictates the "thick paper printing", Steps S136 through S138 are performed in which the sheet transportation speed is set to a half of the speed V for the thin paper printing and the image is formed in the one-way scan mode. The resultant image is transferred onto the sheet S and is fixed thereto, so as to terminate the printing process. Firstly, in Step S136, the apparatus is set for the one-way scan mode (scan mode determination step). Next, in a case where the first direction (+X) is set as the scanning direction of the latent-image forming light beam, the direction switching section 116C reads out the tone data from the forward line buffer 116D at a proper timing and in an order of forward direction (that is, the order of the tone data DT1, DT2, . . . , DTn), and the latent-image forming light beam SL1 scanning in the first direction (+X) is optically modulated based on the respective tone data and scans on the photosensitive member 2 so as to form the linear latent images LI(+X) thereon (Step S138). If on the other hand, the second direction (−X) is set as the scanning direction of the latent-image forming light beam, the direction switching section 116C does not read out the tone data from the backward line buffer 116E and the latent-image forming light beam SL2 is inhibited from scanning on the photosensitive member 2, so that the formation of latent images is not performed. That is, the latent image which consists only of the linear latent images LI(+X) which is formed by the light beam scanning on the photosensitive member 2 in the first direction (+X) is formed. Just as in the thin paper printing, the latent images thus formed are developed with the toner to form the toner images of the four colors, which are mutually superimposed on the intermediate transfer belt 71 to form the color image. Thereafter, the resultant color image is transferred onto the sheet S.

As described above, according to the twelfth embodiment, the scan mode is selectively switched to the reciprocal scan mode (Steps S133 through S135) or to the one-way scan mode (Steps S136 through S138) based on the sheet thickness information, thereby switching the operation between the thin paper printing and the thick paper printing. In this manner, the thin paper printing or the thick paper printing may be selectively performed by merely switching the scan mode of the latent-image forming light beam without varying the oscillating operation of the deflection mirror surface 651. Therefore, it is possible to quickly switch from the thin paper printing to the thick paper printing or vice versa.

Thirteenth Embodiment

By the way, in the reciprocal scan mode of the image forming apparatus, the two-dimensional latent image is formed by making the light beam reciprocally scan in the main scanning direction X while rotating the photosensitive member 2 in the sub scanning direction Y. Depending upon the image types, therefore, there may be a case where the image density differs between an image portion formed along a forward path in the main scanning direction X and an image portion formed along a backward path in the main scanning direction X. Let us consider a case where repeated patterns of 2-line-ON and 2-line-OFF are formed as shown in FIG. 36, for example.

In this apparatus, the scanning light beam scans in the forward path and the backward path to form two lines of latent images and thereafter, the laser light source 62 is turned off for two scanning lines. Thus is formed a latent image of the 2-line-ON and 2-line-OFF pattern. Thus, desired repetition pattern (two-dimensional latent image) is formed by repeating this latent-image forming operation. Such a process encounters a problem about the density difference with respect to the main scanning direction X. Since the two-dimensional latent image is formed by making the scanning light beam SL reciprocally scan in the main scanning direction X while rotating the photosensitive member 2 in the sub scanning direction Y which is approximately orthogonal to the main scanning direction X, a latent image area formed along the (+X) direction differs from a latent image area formed along the (−X) direction. Hence, a difference of the image density occurs in the main scanning direction X. In the case of the printing of normal text images, such a density difference does not pose a particular problem, and hence, printing is usually performed as is (normal quality printing). Therefore, it is desirable to adopt the reciprocal scan mode in the normal quality printing when preference is given to printing resolution or speed.

Figure 37:
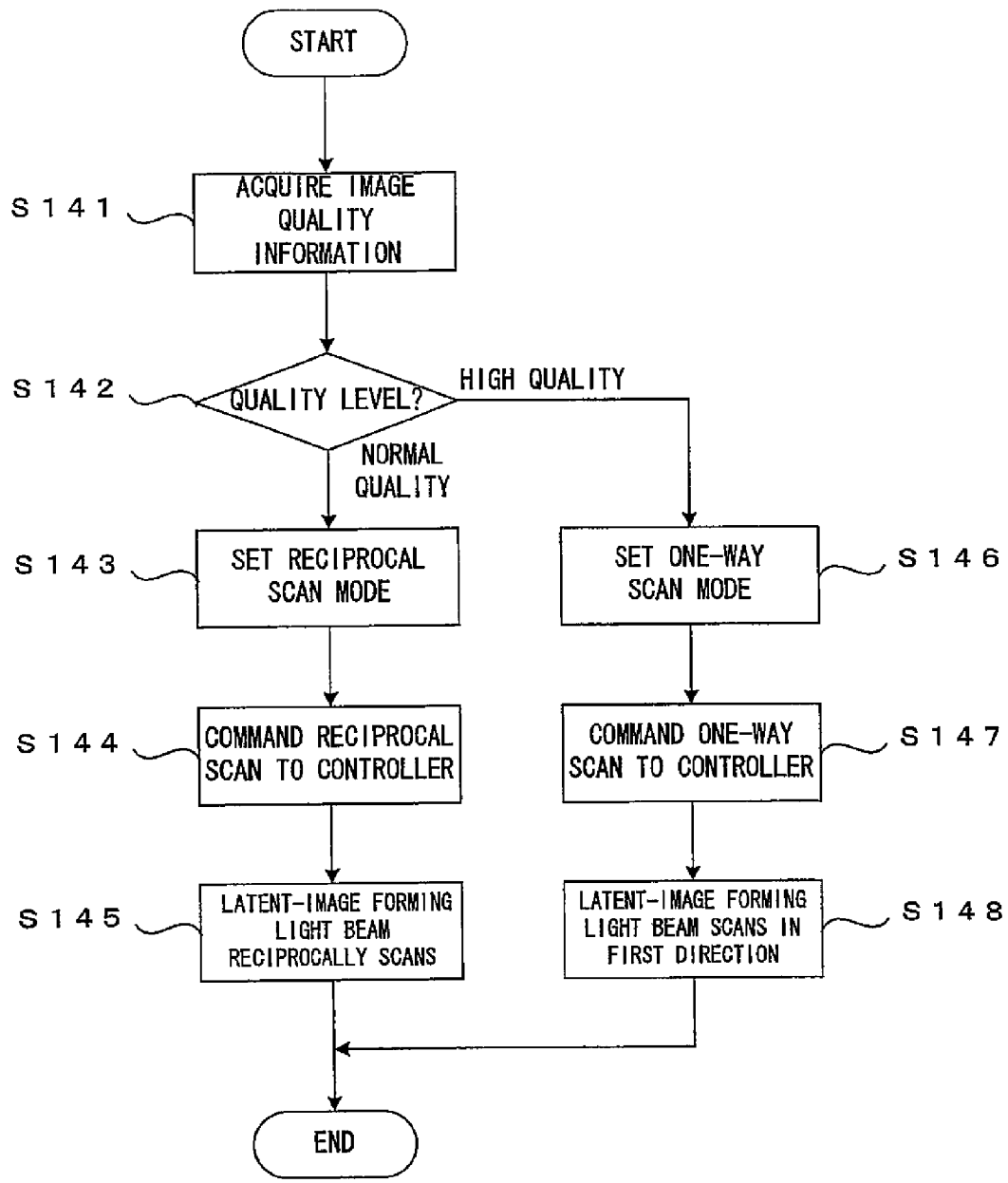
FIG. 37 is a flow chart showing an operation of the image forming apparatus of the thirteenth embodiment.
Figure 38:
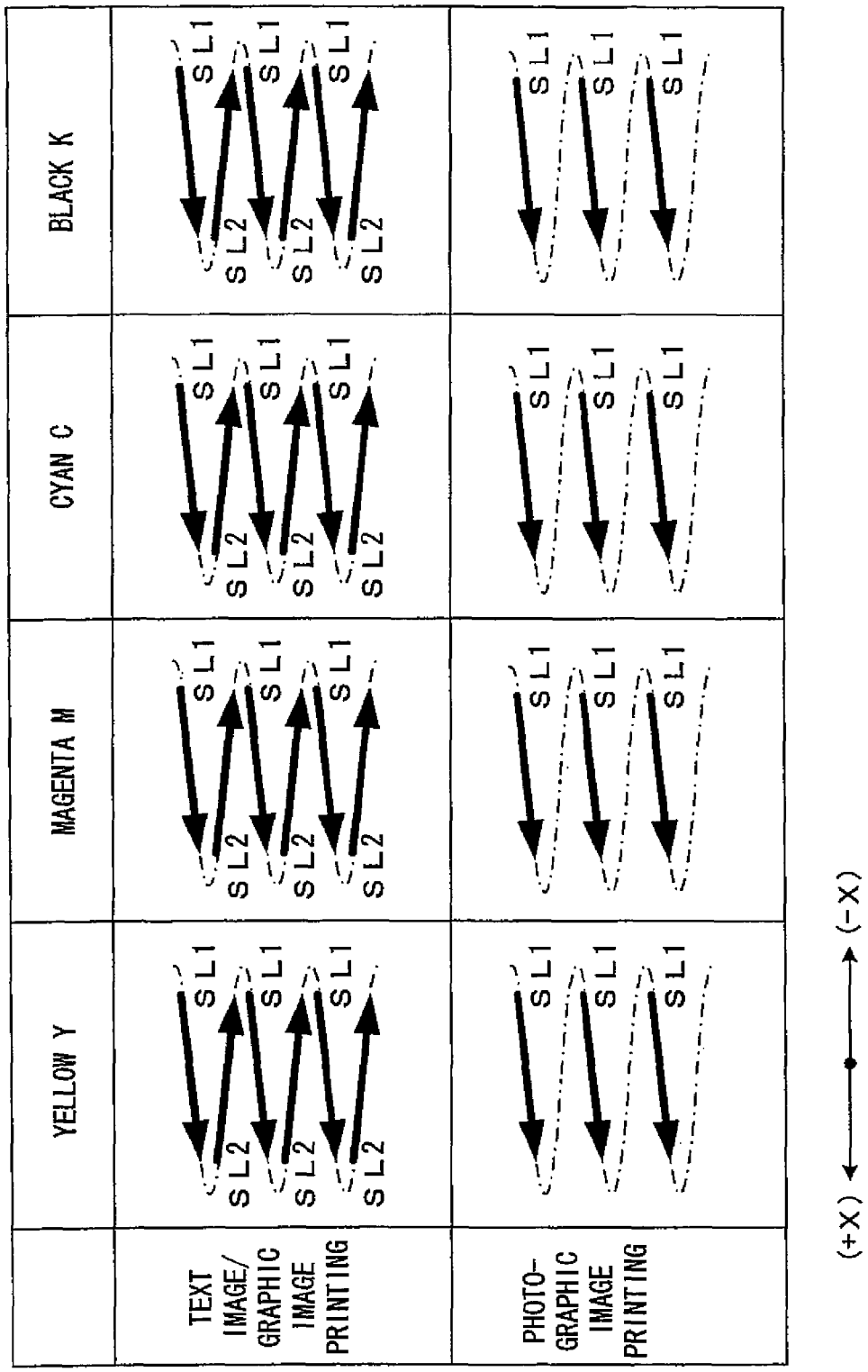
FIG. 38 is a diagram showing latent images formed by the latent-image forming operation of the embodiment.

In contrast, some type of image may even regard such a degree of density difference to be a problem (high quality printing). A typical example of the high quality printing is a photographic image. That is, because the photographic image is demanded of a relatively higher quality, and because even a minor density difference between the (+X) direction side and the (−X) direction side of the image results in a different effect and a different color tone of the overall photography. This problem may be eliminated by forming the image in the one-way scan mode, and accordingly, the one-way scan mode may be said to be suited for the high quality printing. Hence, in the thirteenth embodiment, both the normal quality printing and the high quality printing are executed favorably by carrying out the scan modes respectively suited to the normal quality printing and the high quality printing. Referring to FIGS. 36 through 38, a detailed description is made as below on an operation of the apparatus switching between the normal quality printing and the high quality printing.

Figure 36:
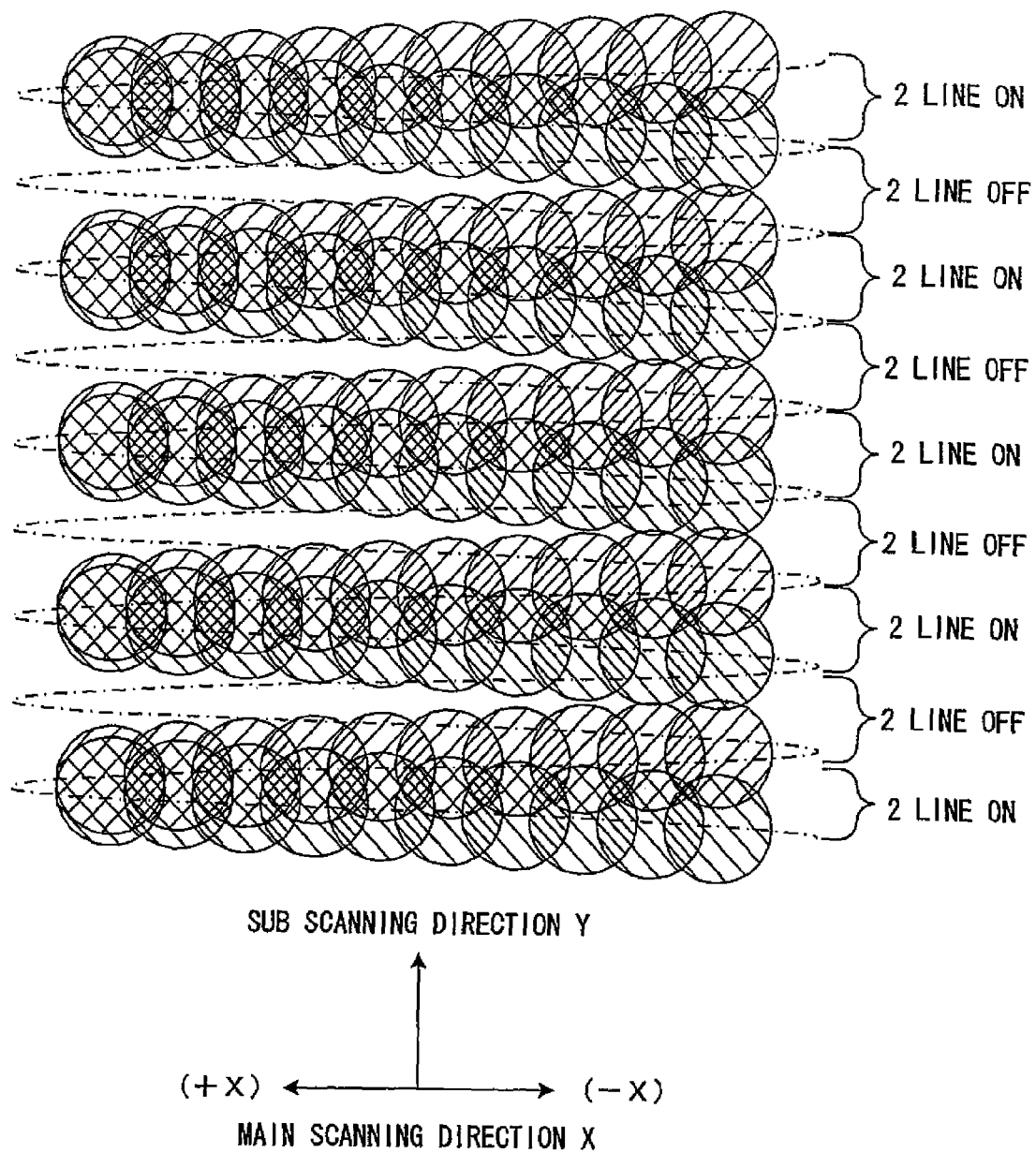
FIG. 36 is a diagram showing latent images when a specific pattern is formed in the reciprocal scan mode.

FIG. 36 is a diagram showing latent images when a specific pattern is formed in the reciprocal scan mode. FIG. 37 is a flow chart showing an operation of the image forming apparatus of the thirteenth embodiment. FIG. 38 is a diagram showing latent images formed by the latent-image forming operation of the embodiment. In the thirteenth embodiment, when the print command is inputted from the external apparatus such as the host computer 100, the latent images are formed on the individual photosensitive members according to the flow chart of FIG. 37 and the color image is formed based on the latent images. In Step S141, image quality information included in the print command is acquired as the "information related to print mode" of the invention (information acquisition step). Based on the image quality information, determination is made as to whether the print command dictates the normal quality printing or the high quality printing (Step S142). It is noted here that a constitution for the sake of the determination in Step S142 may be made such that the print command includes information indicating whether the image to be formed is of the normal quality or the high quality. Alternatively, the determination in Step S142 may be made based on the type of the image to be formed. For instance, the normal quality printing may be selected in the case of the text image and the graphic image, whereas the high quality printing may be selected in the case of the photographic image.

If it is determined in Step S142 that the command dictates the "normal quality printing", Steps S143 through S145 are performed to form latent images in the reciprocal scan mode. Then, toner images formed by developing the latent images are mutually superimposed on the intermediate transfer belt 71 so as to form the color image. Subsequently, the color image is transferred onto the sheet S as the "recording medium" of the invention and then, is fixed thereto to terminate the printing process. Since the operations of Steps S143 through S145 are the same as those of the high-resolution printing of the eighth embodiment, the description thereof is dispensed with.

On the other hand, if it is determined in Step S142 that the command dictates the "high quality printing", Steps S146 through S148 are performed to form the image in the one-way scan mode. Subsequently, the resultant image is transferred onto the sheet S and is fixed thereto, to terminate the printing process. Firstly in Step S146, the apparatus is set for the one-way scan mode (scan mode determination step). Next, in a case where the first direction (+X) is set as the scanning direction of the latent-image forming light beam, the direction switching section 116C reads out the tone data from the forward line buffer 116D at a proper timing and in an order of forward direction (that is, the order of the tone data DT1, DT2, . . . , DTn), and the latent-image forming light beam SL1 scanning in the first direction (+X) is optically modulated based on the respective tone data and scans on the photosensitive member 2 so as to form the linear latent images LI(+X) thereon (Step S148). If, on the other hand, the second direction (−X) is set as the scanning direction of the latent-image forming light beam, the direction switching section 116C does not read out the tone data from the backward line buffer 116E and the latent-image forming light beam SL2 is inhibited from scanning on the photosensitive member 2, so that the formation of latent images is not performed. That is, the latent image which consists only of the linear latent images LI(+X) which is formed by the light beam scanning on the photosensitive member 2 in the first direction (+X) is formed. Just as in the normal quality printing, the latent images thus formed are developed with the toner to form the toner images of the four colors, which are mutually superimposed on the intermediate transfer belt 71 to form the color image. Thereafter, the resultant color image is transferred onto the sheet S.

As described above, according to the thirteenth embodiment, the scan mode is selectively switched to the reciprocal scan mode (Steps S143 through S145) or to the one-way scan mode (Steps S146 through S148) based on the image quality information, thereby switching the operation between the normal quality printing and the high quality printing. In this manner, either the normal quality printing or the high quality printing may be selectively performed by merely switching the scan mode of the latent-image forming light beam without varying the oscillating operation of the deflection mirror surface 651. Therefore, it is possible to quickly switch from the normal quality printing to the high quality printing or vice versa.

It is to be noted that in the thirteenth embodiment, when the high quality printing is performed, the sheet transportation speed may be set to a half of the speed V for the normal quality printing just as in the case of the thick paper printing of the twelfth embodiment. Thus is increased the resolution in the sub scanning direction Y, so that the image of still higher quality may be formed.

Fourteenth Embodiment

Figure 39:
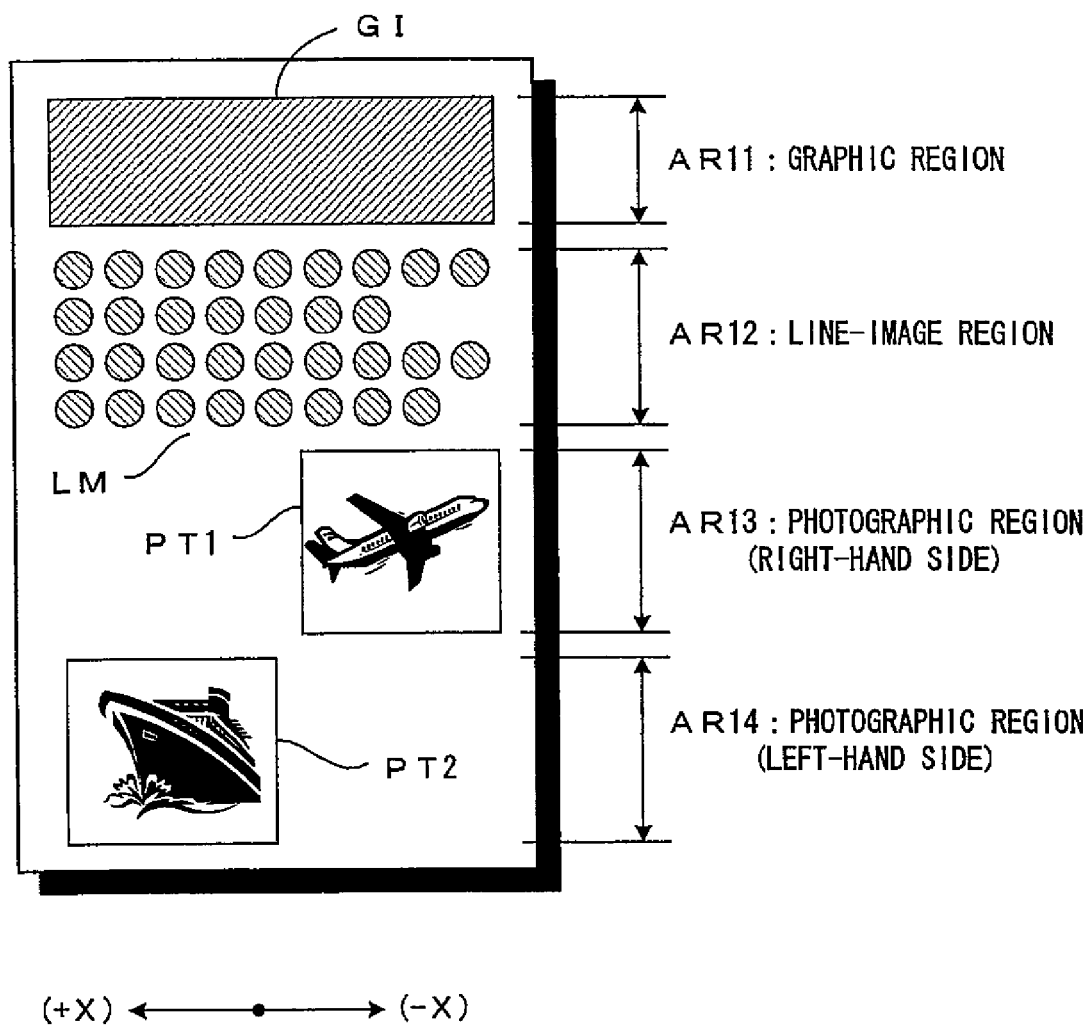
FIG. 39 is a diagram for describing an image forming apparatus according to a fourteenth embodiment of the invention.

FIG. 39 is a diagram for describing an image forming apparatus according to a fourteenth embodiment of the invention. FIGS. 40A through 40D are diagrams each showing linear latent images formed by the image forming apparatus of the fourteenth embodiment. There are cases that the image to be formed by the image forming apparatus may contain plural types of images such as line image, graphic image and photographic image, as shown in FIG. 39 for example. On the sheet S shown in FIG. 39, a graphic image GI, a line image LM such as of text, and photographic images PT1 and PT2 are printed in a mixed state. Where the graphic image GI and the line image LM are compared with the photographic images PT1 and PT2, the demanded image quality may differ from one another, as described above. It is therefore desired to perform the printing process in the respective scan modes corresponding to the individual image qualities even when one sheet S is printed. Hence, in the fourteenth embodiment, the scan mode is switched during printing on one sheet.

A graphic region AR11 where the graphic image GI is formed, a line-image region AR12 where the line image LM such as of text is formed, and two photographic regions AR13 and AR14 are shown in FIG. 39. Therefore, the latent-image forming operation for the regions AR11 and AR12 are performed in the reciprocal scan mode to form latent images shown in FIGS. 40A and 40B. When the latent-image forming operation proceeds to the region AR13, the scan mode is switched to the one-way scan mode which is continued till the end of the latent-image forming operation for the final region AR14. Thus, the latent images may be formed in the scan modes suited to the respective regions.

Further, in this embodiment, the photographic image PT1 is placed on the right-hand side or in (−X) direction in the photographic region AR13. In order to form a high-quality image, therefore, the latent-image forming light beam SL1 which scans in the (+X) direction may be used thereby to form the photographic image PT1 using the light beam of the initial stage of scanning. Furthermore, the starting positions of writing are registered so that the photographic image PT1 may be formed more favorably. On the other hand, the photographic image PT2 is placed on the left-hand side or in (+X) direction in the photographic region AR14. Hence, it is desirable to perform the opposite operation to that for the photographic region AR13.

As described above, according to the fourteenth embodiment, the normal quality printing or the high quality printing may be selectively performed by merely switching the scan mode of the latent-image forming light beam without varying the oscillating operation of the deflection mirror surface 651. Hence, the scan mode may be changed even when one sheet S is subjected to the printing operation. Thus, it is possible to respond flexibly and in high quality to a special print request to print the images of different qualities on a single sheet S. It is to be noted that in the fourteenth embodiment, the case where the images of different printing qualities are formed on a single sheet S is described. However, it goes without saying that the invention is also applicable to a case where images of different resolutions or toner usages are formed on a single sheet S.

<Other Features>

It is noted that the invention is not limited to the foregoing embodiments and various changes and modifications other than the above may be made thereto unless such changes and modifications depart from the scope of the invention.

For instance, in the first embodiment, the (+X) direction is defined as the "first direction" of the invention in which the light beam SL scans to form the latent images, but as a matter of course, the latent images may be formed by the light beam SL which scans in the (−X) direction.

Further, in the first embodiment, the deflection mirror surface 651 which oscillates is formed using the micromachining technique. However, the method of fabricating the deflection mirror surface is not limited to this. The invention may be applied to the all types of image forming apparatuses of the so-called tandem system in which the deflection mirror surface which oscillates is used to deflect the light beam to scan on the latent image carrier.

Further, in the first to fourteenth embodiments, the invention is applied to the image forming apparatus wherein the color image is temporarily formed on the intermediate transfer medium such as the intermediate transfer belt and then, the color image is transferred onto the sheet S. However, the invention is also applicable to an apparatus wherein the color image is formed by mutually superimposing the individual toner images directly on the sheet. In this case, the sheet is equivalent to a "transfer medium" of the invention.

Figure 41:
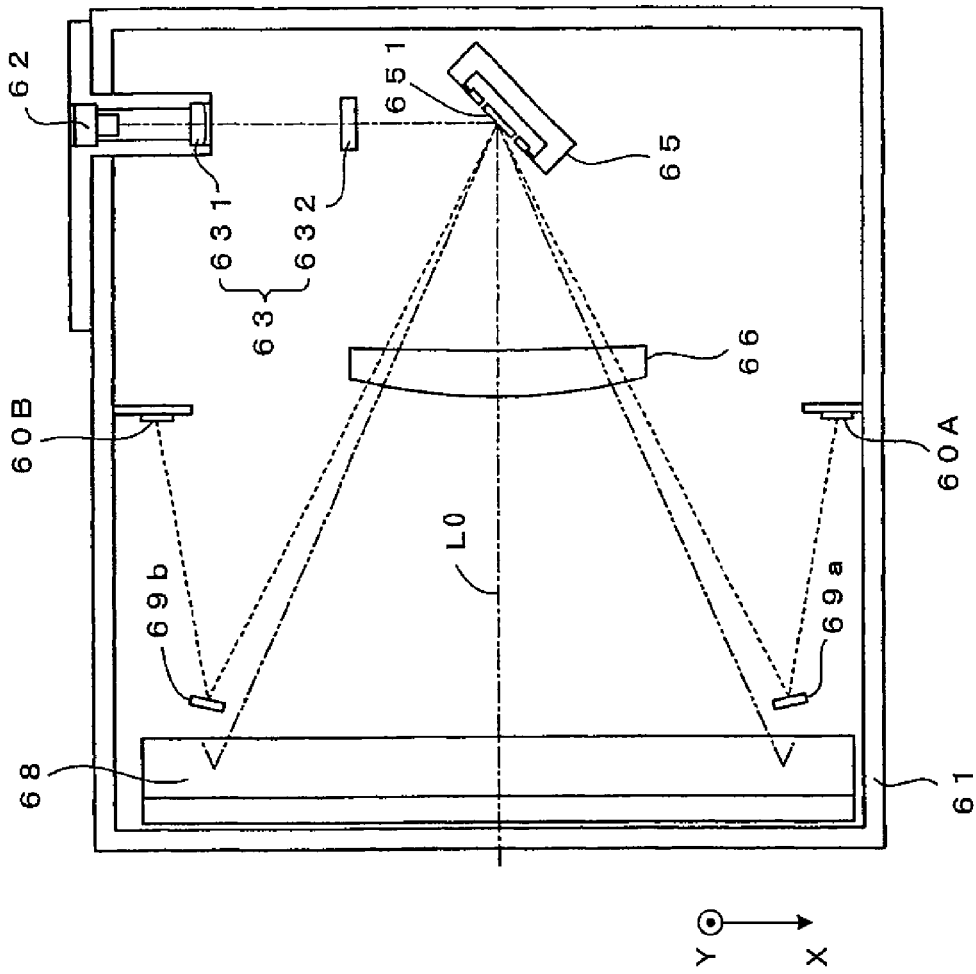
FIG. 41 is a main scanning cross sectional view showing a variation of a structure of an exposure unit.
Figure 42:
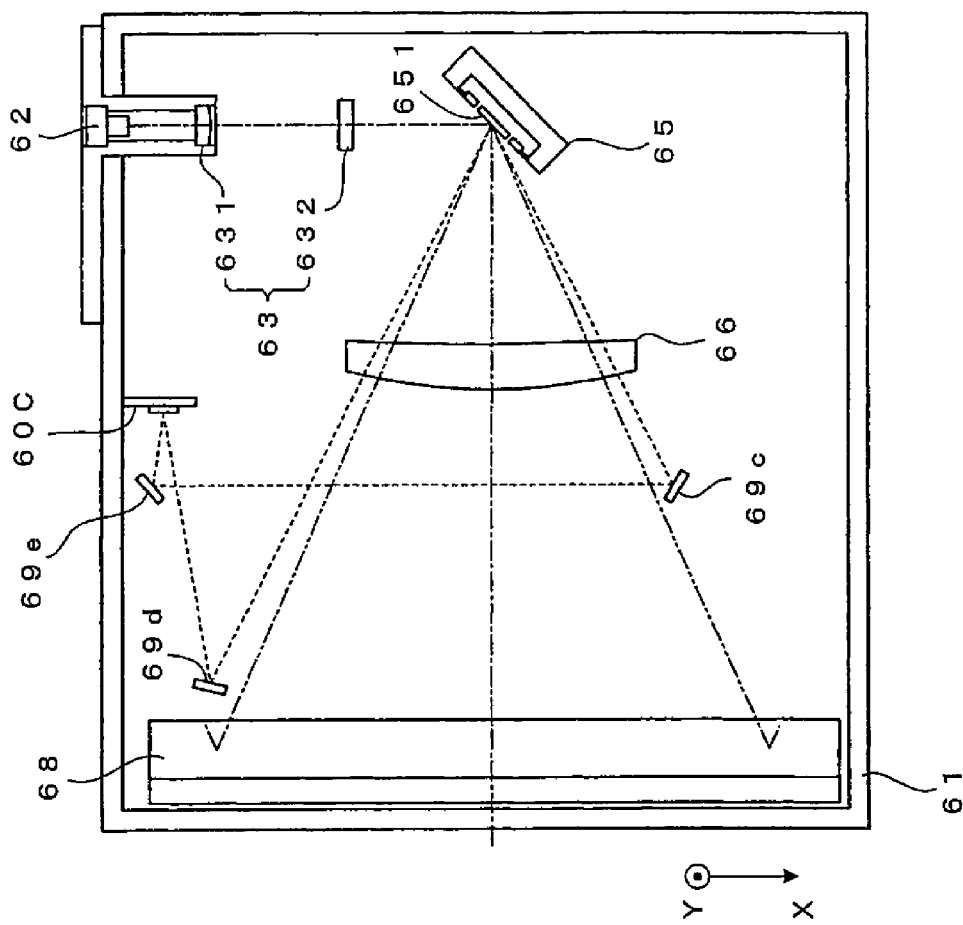
FIG. 42 is a main scanning cross sectional view showing another variation of a structure of an exposure unit.

Further, in the second to fourteenth embodiments, the latent-image forming operation is controlled based on the horizontal synchronizing signal detected on the opposite side from the driving motor MT with respect to the main scanning direction X. However, the number or location of the sensor is not limited to this. As shown in FIG. 41, for example, a structure may be made wherein return mirrors 69a and 69b are disposed at the both ends of the scan path of the scanning light beam, such as to guide the light beam to horizontal synchronization sensors 60A and 60B. In this apparatus, the signal is outputted from the horizontal synchronization sensors 60A and 60B at a time when the scanning light beam is detected by the horizontal synchronization sensors 60A and 60B at the time of passing the sensor positions (amplitude angle θs). Hence, the latent-image forming operation may be controlled based on the output signals from the sensors 60A and 60B. Since the detection signals may be obtained at the both positions in the main scanning direction X, the latent-image forming operation may be controlled based on the detection signal outputted from the sensor (detector) which is disposed on the upstream side in the scanning direction of the latent-image forming light beam. Alternatively, the scanning light beam may also be detected by means of a single horizontal synchronization sensor 60C and return mirrors 69c through 69e, as shown in FIG. 42.

Further, in the second to fourteenth embodiments, the deflection mirror surface 651 which oscillates is formed using the micromachining technique. However, the method of fabricating the deflection mirror surface is not limited to this. The invention may be applied to the all types of image forming apparatuses wherein the deflection mirror surface which oscillates is used to deflect the light beam to scan on the latent image carrier.

Further, in the eighth to thirteenth embodiments, only the light beam SL1 which scans in the (+X) direction is used in the one-way scan mode as the latent-image forming light beam. However, the light beam SL2 which scans in the (−X) direction may also be used. What is required is that the structure is made wherein the latent-image forming light beam scans in one-way, in the first direction (+X) or the second direction (−X) of the main scanning direction X.

Further, in the tenth embodiment, the tonal information is acquired (Step S129) in a case where the toner usage information is acquired (Step S121), and, at the determination of the print command (Step S122), it is determined to be the "toner saving printing". However, the mode of acquisition of the tonal information is not limited to this. In the information acquisition step of Step S121, for instance, both the toner usage information and the tonal information may be acquired. In this case, determination may be made in Step S122 as to whether the print command dictates both the toner saving printing and the binary printing or not. If the result of the determination is "NO", or specifically, the print command dictates either the normal toner amount printing, or the toner saving printing and the tonal printing, then Step S123 through S125 are performed to form the latent images in the reciprocal scan mode. If, on the other hand, the result of the determination is "YES", or specifically the print command dictates the toner saving printing and the binary printing, then Steps S126 through S128 are performed to form the latent images in the one-way scan mode. Such an operation may also provide the same effects as those of the tenth embodiment described above.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:
   a latent image carrier, on a surface of which is provided with an effective image region which has a predetermined width in a main scanning direction, and the surface of which is driven in a sub scanning direction which is approximately orthogonal to the main scanning direction;
   a latent image forming unit, which scans a first scan region corresponding to the effective image region with a light beam from a light source in the main scanning direction by means of a deflection mirror surface which oscillates, and which irradiates the effective image region with a latent-image forming light beam, thereby forming a linear latent image in the effective image region; and
   a direction controller which selectively switches a scanning direction of the latent-image forming light beam between a first direction in the main scanning direction and a second direction that is in the main scanning direction and opposite to the first direction based on information related to latent-image forming position on said latent image carrier, wherein
   said latent image forming unit irradiates the effective image region with a light beam which scans the first scan region in the scanning direction set by said direction controller as the latent-image forming light beam so as to form the linear latent image in the effective image region, thereby adjusting the forming position of the linear latent image on said latent image carrier.

2. The image forming apparatus of claim 1, wherein said direction controller switches the scanning direction of the latent-image forming light beam by controlling a light emitting timing of the light source of said latent image forming unit.

3. The image forming apparatus of claim 1, further comprising a storage section which stores, as the information, data indicating a relative positional relation between said latent image carrier and said latent image forming unit, wherein
   said direction controller switches the scanning direction of the latent-image forming light beam based on the data stored in said storage section.

4. The image forming apparatus of claim 3, wherein
   a linear latent image formed on said latent image carrier when the relative positional relation between said latent image carrier and said latent image forming unit is a predetermined reference positional relation is defined as a reference line, and
   the data indicates an amount of offset of the linear latent image relative to the reference line.

5. The image forming apparatus of claim 1, further comprising an information detector which detects an adjustment toner image which is formed for the purpose of adjusting the latent-image forming position and determines, as the information, an amount of offset of the linear latent image relative to a predetermined reference line, wherein
   said direction controller switches the scanning direction of the latent-image forming light beam based on the offset amount determined by the information detector.

6. The image forming apparatus of claim 1, further comprising:
   an input device which receives an input of the information; and
   a storage section which stores the information inputted via said input device, wherein
   said direction controller switches the scanning direction of the latent-image forming light beam based on the information stored in said storage section.

7. The image forming apparatus of claim 6, wherein an adjustment image for adjustment of the latent-image forming position is formed, and the adjustment image is transferred to a recording medium to permit the information to be visually examined.

8. The image forming apparatus of claim 1, comprising a plurality of image forming devices each of which includes said latent image carrier and said latent image forming unit and forms a toner image of a color different from each other, wherein the toner images formed by said individual image forming devices are mutually superimposed on a transfer medium to form a color image, wherein
   the information is set corresponding to each of said plurality of image forming devices, and
   said direction controller switches the scanning direction of the latent-image forming light beam in each of said plurality of image forming devices based on the information.

9. The image forming apparatus of claim 8, wherein the respective scanning directions of the latent-image forming light beams in said individual latent image forming units are set so that the respective linear latent images are registered to a reference line which is common to said plurality of image forming devices or skewed in the same direction relative to the reference line.

10. The image forming apparatus of claim 8, wherein a relative registration offset between the toner images formed by said plurality of image forming devices is defined as the information.

11. The image forming apparatus of claim 1, further comprising a plurality of developing devices which form toner images by developing the latent images on said latent image carrier using toners of colors different from each other, wherein
    a process to selectively position one of said plurality of developing devices at a development position according to the latent image formed on said latent image carrier and to transfer the toner image developed by the selected developing device onto the transfer medium, is repeated for the plural colors, thereby forming a color image with the plural toner images mutually superimposed on the transfer medium, a relative registration offset between the plural toner images is defined as the information, and said direction controller switches the scanning direction of the latent-image forming light beam for each color based on the information.

12. The image forming apparatus of claim 1, wherein an image which includes a line image region or a graphic image region is formed, a position which the line image region is formed is defined as the information, and said direction controller switches the scanning direction of the latent-image forming light beam for each linear latent image based on the information.

13. The image forming apparatus of claim 1, further comprising a driver which is mechanically connected to one end of the latent image carrier in the main scanning direction and which drives the surface of said latent image carrier in the sub scanning direction, wherein said latent image forming unit is structured that the light beam scans, in the main scanning direction, a second scan region which is broader than the first scan region, a synchronization detector is disposed at a place on an opposite side from said driver in the main scanning direction, which detects a scanning light beam which is moving inside the second scan region and outside the first scan region and outputs a signal, and an operation of forming the linear latent image is performed based on the detection signal outputted from the synchronization detector.

14. The image forming apparatus of claim 1, wherein said latent image forming unit is structured that the light beam scans, in the main scanning direction, a second scan region which is broader than the first scan region, synchronization detectors are disposed at places on both sides opposite in the main scanning direction, each of which detects a scanning light beam which is moving inside the second scan region and outside the first scan region and outputs a signal, and an operation of forming the linear latent image is performed based on the detection signals outputted from the synchronization detectors.

15. The image forming apparatus of claim 14, wherein the operation of forming the linear latent image is performed based on the detection signal outputted from the synchronization detector which is disposed on an upstream side in the scanning direction of the latent-image forming light beam.

16. An image forming method wherein a linear latent image is formed on a latent image carrier, on a surface of which is provided with an effective image region in a predetermined width in a main scanning direction, and the surface of which is driven in a sub scanning direction which is approximately orthogonal to the main scanning direction, the linear latent image formed in the effective image region by irradiating the effective image region with a latent-image forming light beam, said method comprising:

an information acquisition step of acquiring information related to latent-image forming position on the latent image carrier;

a direction determination step of selectively determining a scanning direction of the latent-image forming light beam to be a first direction in the main scanning direction or to be a second direction that is in the main scanning direction and opposite to the first direction, based on the information acquired in said information acquisition step; and an image forming step of forming the latent image in the effective image region by irradiating the effective image region on the latent image carrier with a light beam from a light source by means of a deflection mirror surface which oscillates in the scanning direction determined in said direction determination step, thereby adjusting the latent-image forming position on the latent image carrier, and of forming a toner image by developing the latent image.

* * * * *